United States Patent
Wakui

(10) Patent No.: US 6,896,078 B2
(45) Date of Patent: May 24, 2005

(54) MOVABLE ROBOT

(75) Inventor: Yoshiaki Wakui, Yokohama (JP)

(73) Assignee: Victor Company of Japan, LTD, Yokohama (JP)

( * ) Notice: Subject to any disclaimer, the term of this patent is extended or adjusted under 35 U.S.C. 154(b) by 0 days.

(21) Appl. No.: 10/765,925

(22) Filed: Jan. 29, 2004

(65) Prior Publication Data

US 2004/0182614 A1 Sep. 23, 2004

(30) Foreign Application Priority Data

Jan. 31, 2003 (JP) .......................................... 2003-023131
Dec. 24, 2003 (JP) .......................................... 2003-426449

(51) Int. Cl.⁷ .............................................. B62D 57/00
(52) U.S. Cl. ........................................ 180/7.1; 180/212
(58) Field of Search ......................... 180/7.1, 21, 210, 180/212; 901/1

(56) References Cited

U.S. PATENT DOCUMENTS 3,821,995 A * 7/1974 Aghnides .................... 180/6.2
4,519,466 A * 5/1985 Shiraishi ..................... 180/7.1
5,213,176 A * 5/1993 Oroku et al. ............... 180/168

FOREIGN PATENT DOCUMENTS

| DE | 198 00 210 A1 | 7/1999 |
| JP | 64-78789 | 3/1989 |
| JP | 6-31659 | 2/1994 |
| JP | 7-248823 | 9/1995 |
| JP | 09-254838 | 9/1997 |
| JP | 2000-142154 | 5/2000 |
| JP | 2000-218578 | 8/2000 |
| JP | 2001-300876 | 10/2001 |
| JP | 2001-322079 | 11/2001 |

* cited by examiner

Primary Examiner—Kevin Hurley
(74) Attorney, Agent, or Firm—Louis Woo

(57) ABSTRACT

A movable robot includes a main body unit, and at least three wheel units connected with the main body unit. The wheel units have respective contact portions for contact with a floor surface. The contact portions are rotatable about respective axes. The main body unit moves along the floor surface as the contact portions rotate. Lines projected onto the floor surface and originating from the axes of rotation of the contact portions are spaced at substantially equal angular intervals. At most two of the axes are on a common plane. Each of the wheel units includes a motor base, a rotation drive motor supported on the motor base, a casing being rotatable relative to the motor base about related one of the axes and having related one of the contact portions, and a device for transmitting a rotational force generated by the rotation drive motor to the casing.

8 Claims, 31 Drawing Sheets

MOVABLE ROBOT

BACKGROUND OF THE INVENTION

1. Field of the Invention

This invention generally relates to a movable robot of, for example, a self-moving type. This invention specifically relates to a wheeled robot having at least three rotation axes or axles.

2. Description of the Related Art

Japanese patent application publication number P2001-322079A discloses a humanoid robot or a bipedalism robot having a body equipped with various sensors. The robot body is divided into portions connected by joints which can be driven by actuators. The sensors include gyro sensors and acceleration sensors mounted on the robot body, and encoders located near the joint actuators. The gyro sensors, the acceleration sensors, and the encoders compose a body-posture sensing arrangement. An action/posture management section in the robot operates the joint actuators in response to the output signals of the gyro sensors, the acceleration sensors, and the encoders to properly control the posture of the robot body.

Japanese patent application publication number P2000-218578A discloses a globe-shaped movable robot which has a spherical shell and a main unit disposed in the spherical shell. The main unit includes a first wheel, a second wheel, a first motor for driving the first wheel, and a second motor for driving the second wheel. The first and second motors can be operated by a motor controller in the main unit. The first and second wheels are axially spaced from and parallel to each other. The outer circumferential surfaces of the first and second wheels are in contact with the inner surface of the spherical shell. In the case where the motor controller operates the first and second motors to rotate the first and second wheels at equal speeds in a same direction, the spherical shell moves forward while rotating in a direction opposite to the direction of rotation of the first and second wheels. In the case where the motor controller operates the first and second motors to rotate the first and second wheels at equal speeds in opposite directions respectively, the spherical shell spins about a vertical axis while the center of the shell remains substantially at a same point. In the case where the motor controller operates the first and second motors to rotate the first and second wheels at different speeds respectively in a same direction, the spherical shell turns along a curved path.

Japanese patent application publication number 9-254838/1997 discloses a globe-shaped movable body which includes a spherical shell and a square base disposed in the shell. The square base extends horizontally. Three driving wheels and a caster (an idler wheel) are provided on the four corners of the square base, respectively. The driving wheels and the caster are in contact with the inner surface of the spherical shell. The driving wheels can be actuated by motors, respectively. As first one of the driving wheels is rotated by the related motor, the spherical shell moves in a pitch direction. As second one of the driving wheels is rotated by the related motor, the spherical shell moves in a roll direction. As third one of the driving wheels is rotated by the related motor, the spherical shell moves in a yaw direction. When two of the driving wheels are simultaneously actuated, the spherical shell makes a composite movement.

The bipedalism robot in Japanese application P2001-322079A has an extremely complicated structure and a very large number of parts. The gyro sensors, the acceleration sensors, and the encoders in the bipedalism robot are expensive and large in size. Therefore, the bipedalism robot tends to be high in cost and great in size. Accordingly, the bipedalism robot is unsuited for home use. In the bipedalism robot, the body-posture control is based on a very complicated algorithm. Generally, such an algorithm necessitates the use of a special computer which can process data at a high rate. Since the size of a computer program for such an algorithm is large, a memory related to the computer needs to be huge in capacity. The special computer and the huge-capacity memory are expensive. The bipedalism robot has a considerable chance of falling down when meeting an obstacle.

The globe-shaped movable robot in Japanese application P2000-218578A and the globe-shaped movable body in Japanese application 9-254838 tend to be unable to maintain their correct postures and are liable to spontaneously move down when they are on a sloping floor. Since the spherical shells of the movable robot and body remain in contact with floors, the outer surfaces of the shells tend to become dirty and flawed as a result of long-term use. The movable robot and body can not make complicated movements and quick movements. Accordingly, the performances of the movable robot and body are insufficient for home use.

SUMMARY OF THE INVENTION

It is a first object of this invention to provide a movable robot having a relatively simple structure.

It is a second object of this invention to provide a movable robot composed of a relatively small number of parts.

It is a third object of this invention to provide an inexpensive movable robot.

It is a fourth object of this invention to provide a movable robot suited for home use.

It is a fifth object of this invention to provide a movable robot which dispenses with a special computer.

It is a sixth object of this invention to provide a movable robot which requires only an inexpensive memory.

It is a seventh object of this invention to provide a movable robot which hardly falls down.

It is an eighth object of this invention to provide a movable robot having outer surfaces which hardly become dirty and flawed.

A first aspect of this invention provides a movable robot comprising a main body unit; and at least three wheel units connected with the main body unit and having respective contact portions for contact with a floor surface, the contact portions being rotatable about respective axes. The main body unit moves along the floor surface as the contact portions rotate. Lines projected onto the floor surface and originating from the axes of rotation of the contact portions are spaced at substantially equal angular intervals, and at most two of the axes are on a common plane. Each of the wheel units comprises 1) a motor base; 2) a rotation drive motor supported on the motor base; 3) a casing being rotatable relative to the motor base about related one of the axes and having related one of the contact portions; and 4) a rotational force transmission device connected between the rotation drive motor and the casing for transmitting a rotational force generated by the rotation drive motor to the casing.

A second aspect of this invention is based on the first aspect thereof, and provides a movable robot wherein the rotational force transmission device comprises a first gear connected with an output shaft of the rotation drive motor, and a second gear meshing with the first gear and being integral with the casing.

A third aspect of this invention is based on the first aspect thereof, and provides a movable robot wherein each of the wheel units further comprises a wheel including the motor base and the casing, and a leg connecting the wheel and the main body unit and being expandible and contractible in a direction of related one of the axes.

A fourth aspect of this invention is based on the third aspect thereof, and provides a movable robot wherein each of the wheel units further comprises a leg drive motor supported on the motor base, and a motion converting device connected between the leg drive motor and the leg for converting a rotational force generated by the leg drive motor into a linear force and applying the linear force to the leg to expand and contract the leg.

A fifth aspect of this invention is based on the first aspect thereof, and provides a movable robot wherein the main body unit comprises an external condition sensor for detecting a condition of a region external with respect to the main body unit; an output device for outputting information to an external device; a memory storing a control program for implementing prescribed processing in response to the external condition detected by the external condition sensor; and a controller for deciding contents of information to be outputted from the output device and also contents of control of the rotation drive motor on the basis of the control program and the external condition detected by the external condition sensor, and for controlling the output device and the rotation drive motor in accordance with the decided contents of information to be outputted from the output device and also the decided contents of control of the rotation drive motor.

A sixth aspect of this invention is based on the fourth aspect thereof, and provides a movable robot wherein the main body unit comprises an external condition sensor for detecting a condition of a region external with respect to the main body unit; an output device for outputting information to an external device; a memory storing a control program for implementing prescribed processing in response to the external condition detected by the external condition sensor; and a controller for deciding contents of information to be outputted from the output device and also contents of control of the leg drive motor on the basis of the control program and the external condition detected by the external condition sensor, and for controlling the output device and the leg drive motor in accordance with the decided contents of information to be outputted from the output device and also the decided contents of control of the leg drive motor.

A seventh aspect of this invention provides a movable robot comprising a drive unit including at least three wheel units having respective contact portions for contact with a floor surface, the contact portions being rotatable about respective axes, the wheel units including drive devices for rotating the contact portions respectively; and a sub unit detachably connected with the drive unit and including at least one of 1) an external condition sensor for detecting a condition of a region external with respect to the sub unit, 2) an output device for outputting information to an external device, 3) a communication device for implementing communication with an external device, and 4) a controller for controlling the drive unit. The drive unit moves along the floor surface as the contact portions rotate. Lines projected onto the floor surface and originating from the axes of rotation of the contact portions are spaced at substantially equal angular intervals, and at most two of the axes are on a common plane.

An eighth aspect of this invention is based on the seventh aspect thereof, and provides a movable robot wherein each of the wheel units comprises a casing, a wheel having related one of the contact portions and being rotatable about related one of the axes, a leg connecting the casing and the wheel and being expandible and contractible in a direction of related one of the axes, and a drive device for expanding and contracting the leg.

A ninth aspect of this invention is based on the fifth aspect thereof, and provides a movable robot wherein the controller comprises a first sub controller for deciding contents of control of the rotation drive motor on the basis of the control program and the external condition detected by the external condition sensor, and a second sub controller for controlling the rotation drive motor in accordance with the decided contents of control of the rotation drive motor.

DETAILED DESCRIPTION OF THE INVENTION

First Embodiment

Figure 1:
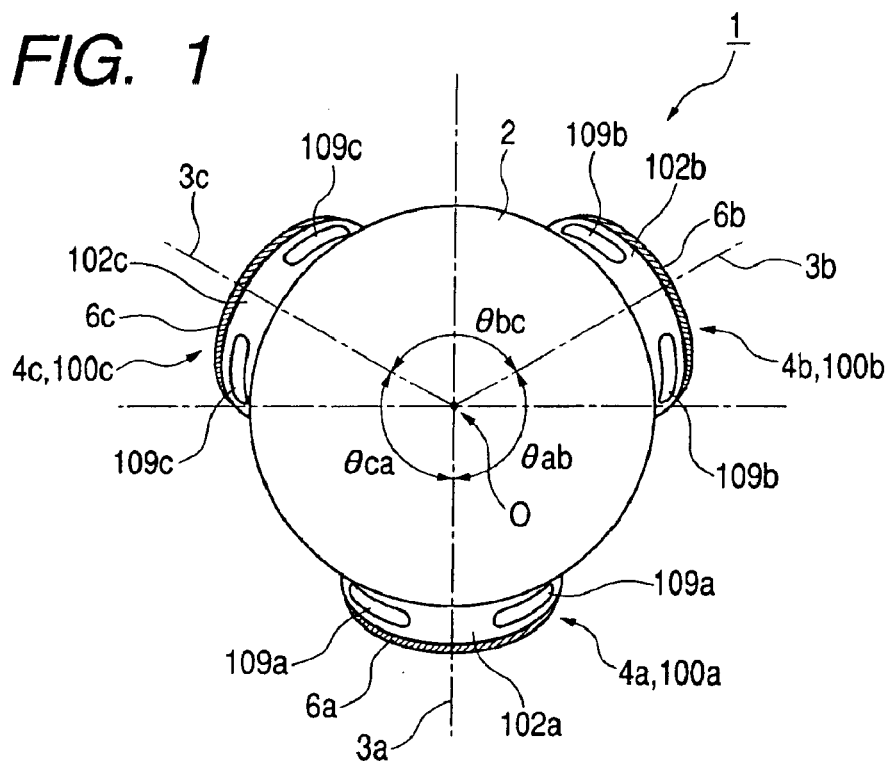
FIG. 1 is a top view of a movable robot according to a first embodiment of this invention.
Figure 2:
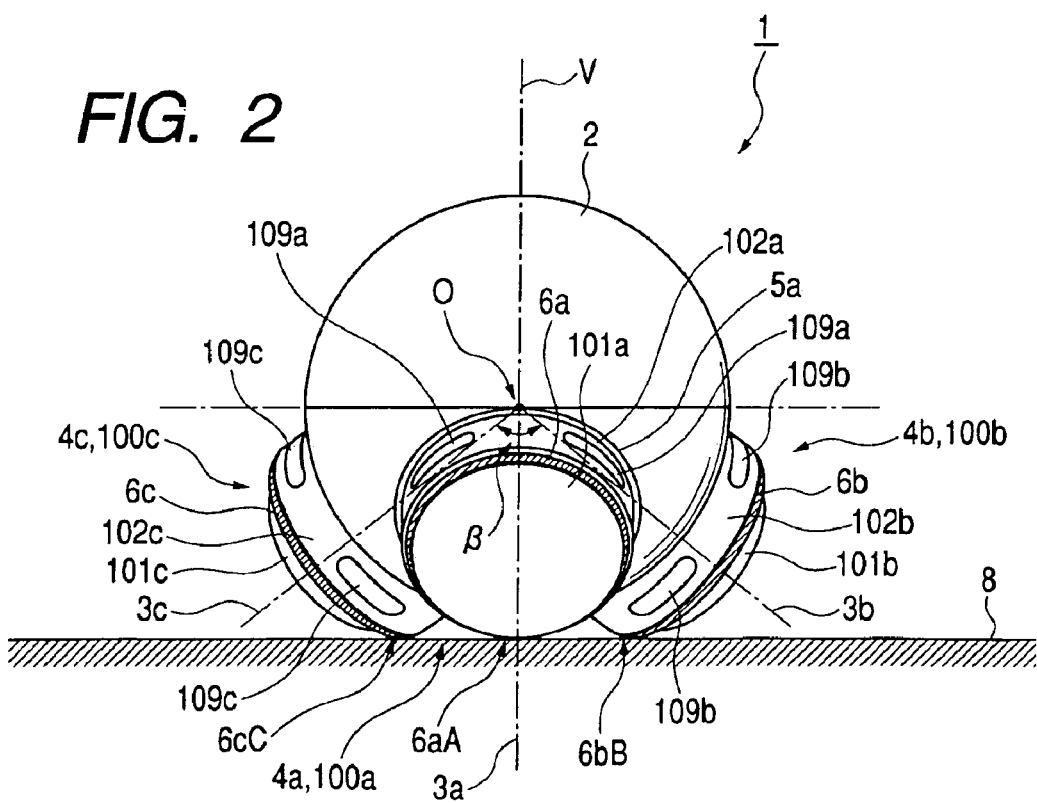
FIG. 2 is a front view of the movable robot in FIG. 1.
Figure 3:
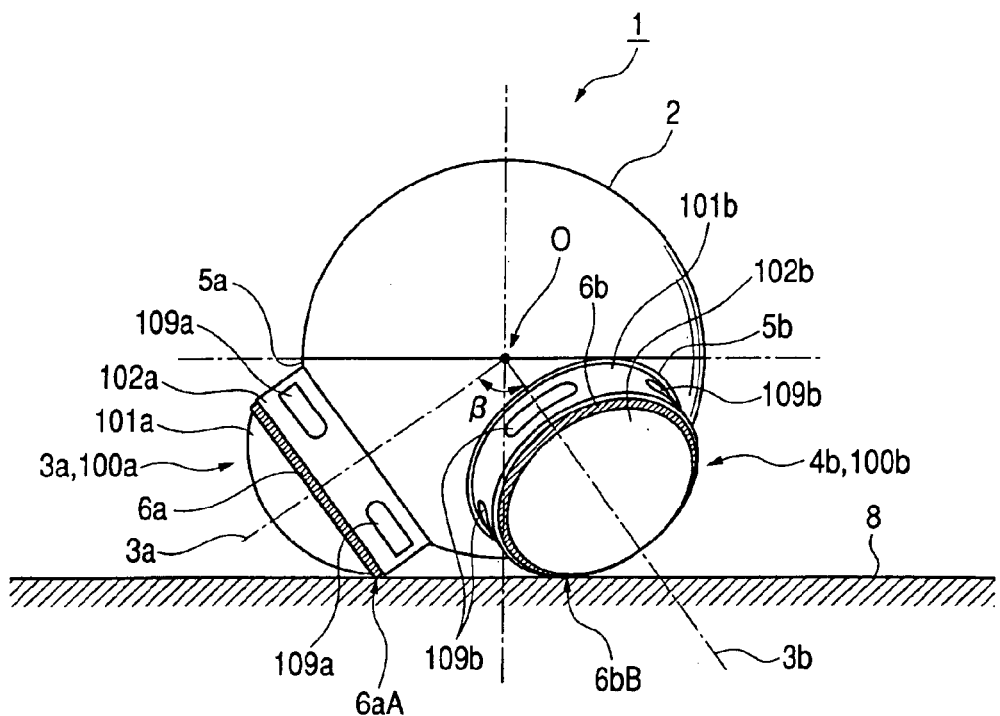
FIG. 3 is a right-hand side view of the movable robot in FIG. 1.

FIGS. 1, 2, and 3 show a movable robot 1 according to a first embodiment of this invention. With reference to FIGS. 1, 2, and 3, the robot 1 includes a main body unit 2 and three wheel units 4a, 4b, and 4c rotatably connected with the main body unit 2. The main unit 2 has an approximately spherical casing or shell. The wheel units 4a, 4b, and 4c are of equal structures.

The casing in the main body unit 2 is formed with openings 5a, 5b, and 5c which correspond to rotation axes 3a, 3b, and 3c respectively. The rotation axes 3a, 3b, and 3c will be mentioned later. The wheel units 4a, 4b, and 4c extend through the openings 5a, 5b, and 5c, respectively. Portions of the wheel units 4a, 4b, and 4c project outward from the openings 5a, 5b, and 5c. The wheel units 4a, 4b, and 4c include wheels 100a, 100b, and 100c, respectively.

The wheel 100a is basically composed of a shell portion 101a, a cylindrical portion 102a, and an annular contact portion 6a connected with each other. The cylindrical portion 102a extends through the opening 5a in the casing of the main body unit 2. The cylindrical portion 102a is coaxial with respect to the rotation axis 3a. The cylindrical portion 102a has an outer end formed with an opening closed by the shell portion 101a. The shell portion 101a has an outer convex surface exactly or approximately extending along a part of a sphere, the center of which is on the rotation axis 3a. The contact portion 6a is provided between the shell portion 101a and the cylindrical portion 102a. The contact portion 6a forms a ridge where the shell portion 101a and the cylindrical portion 102a are connected.

Similarly, the wheel 100b includes a shell portion 101b, a cylindrical portion 102b, and an annular contact portion 6b. Also, the wheel 100c includes a shell portion 101c, a cylindrical portion 102c, and an annular contact portion 6c.

The wheels 100a, 100b, and 100c have interiors in which light emitting devices (not shown in FIGS. 1–3) are provided respectively. The outer circumferential surfaces of the cylindrical portions 102a, 102b, and 102c of the wheels 100a, 100b, and 100c have transparent or semitransparent windows 109a, 109b, and 109c which extend outward of the casing in the main body unit 2. The windows 109a, 109b, and 109c allow light generated by the light emitting devices to be seen or monitored from a region external with respect to the robot 1.

Normally, the contact portions 6a, 6b, and 6c are in contact with a floor surface 8, thereby supporting the main body unit 2 with respect to the floor surface 8 in a manner such that the main body unit 2 is spaced upward from the floor surface 8.

The contact portions 6a, 6b, and 6c are made of rigid material or resilient material such as rubber. In the case where the contact portions 6a, 6b, and 6c and the floor surface 8 are rigid, the contacts between them are of a point type. On the other hand, in the case where the floor surface 8 is formed by a carpet and is hence soft, the contacts are of a surface type. In the case where the contact portions 6a, 6b, and 6c are resilient, the contacts are of a surface type even when the floor surface 8 is rigid.

The central axes of the wheels 100a, 100b, and 100c coincide with the rotation axes 3a, 3b, and 3c, respectively. The rotation axes 3a, 3b, and 3c mean axes about which the wheels 100a, 100b, and 100c rotate. The rotation axes 3a, 3b, and 3c intersect at the center O of the approximately spherical casing of the main body unit 2. A movement plane is defined as one determined by the points 6aA, 6bB, and 6cC at which the contact portions 6a, 6b, and 6c of the wheels 100a, 100b, and 100c touch the floor surface 8. Provided that the floor surface 8 is rigid and plane, the movement plane coincides with the floor surface 8. As shown in FIG. 1, lines projected onto the movement plane (the floor surface 8) and originating from the rotation axes 3a, 3b, and 3c are spaced at exactly or substantially equal angular intervals. Thus, in FIG. 1, the projectional angle θab between the rotation axes 3a and 3b, the projectional angle θbc between the rotation axes 3b and 3c, and the projectional angle θca between the rotation axes 3c and 3a are exactly or substantially equal to each other.

An example of preferably setting of angles among the rotation axes 3a, 3b, and 3c is as follows. With reference to FIGS. 2 and 3, the true angle between the rotation axes 3a and 3b, the true angle between the rotation axes 3b and 3c, and the true angle between the rotation axes 3c and 3a are equal to a predetermined value "β", for example, 90 degrees. On the other hand, the angles between the lines projected onto the movement plane (the floor surface 8) and originating from the rotation axes 3a, 3b, and 3c are equal to 120 degrees. Two among the rotation axes 3a, 3b, and 3c are on a common plane.

Figure 4:
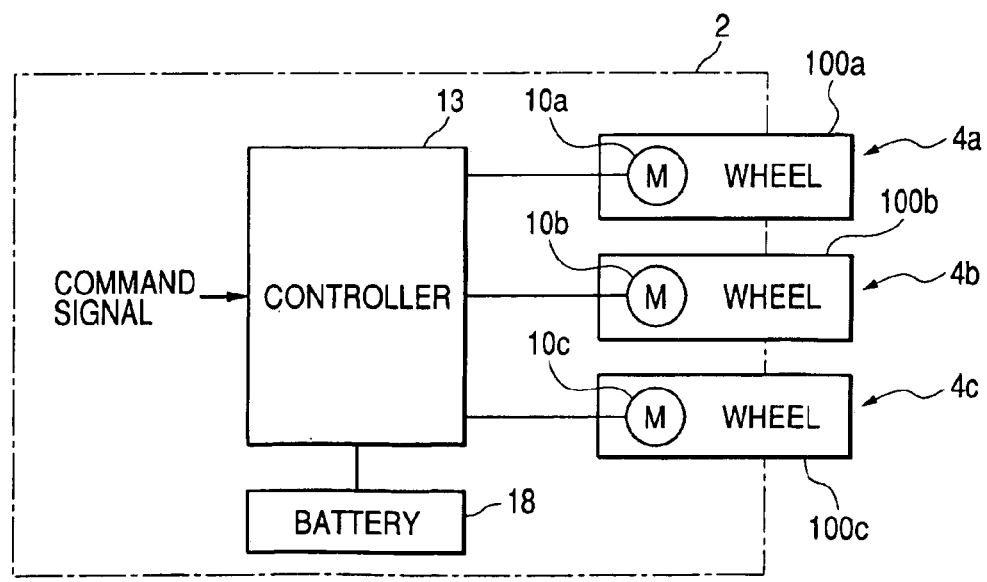
FIG. 4 is a diagram of a control system in the movable robot of FIG. 1.

As shown in FIG. 4, the wheels 100a, 100b, and 100c contain rotation drive motors 10a, 10b, and 10c, respectively. The wheels 100a, 100b, and 100c have input members (for example, input gears) coupled with the output shafts of the rotation drive motors 10a, 10b, and 10c, respectively. The wheels 100a, 100b, and 100c can be independently actuated by the rotation drive motors 10a, 10b, and 10c. The wheels 100a, 100b, and 100c rotate about the rotation axes 3a, 3b, and 3c respectively when being actuated. Preferably, the rotation drive motors 10a, 10b, and 10c include DC motors.

The main body unit 2 contains a controller 13 and a battery 18. The rotation drive motors 10a, 10b, and 10c are electrically connected via the controller 13 with the battery 18. The controller 13 adjusts power feed from the battery 18 to the rotation drive motors 10a, 10b, and 10c, thereby independently controlling the directions and speeds of rotation of the output shafts of the motors 10a, 10b, and 10c, that is, the directions and speeds of rotation of the wheels 100a, 100b, and 100c. The controller 13 can respond to a command signal indicating a desired movement of the robot 1. The controller 13 implements the control of the directions and speeds of rotation of the wheels 100a, 100b, and 100c in response to the command signal so that the robot 1 can actually make the desired movement indicated by the command signal. The command signal can also indicate a request for stop of the robot 1. The controller 13 deactivates the rotation drive motors 10a, 10b, and 10c to stop the robot 1 when the command signal indicates a stop request. The application of the command signal to the controller 13 may be on a radio communication basis or a wireless communication basis. The controller 13 includes a microcomputer or a similar device having a combination of an input/output circuit, a processor, a ROM, and a RAM. The controller 13 operates in accordance with a control program stored in the ROM or the RAM. The control program for the controller 13 is designed to enable the controller 13 to execute operation steps of controlling the rotation drive motors 10a, 10b, and 10c or the wheels 100a, 100b, and 100c.

The independent control of the directions and speeds of rotation of the wheels 100a, 100b, and 100c provides various movements of the robot 1 with the aid of the frictional forces between the contact portions 6a, 6b, and 6c and the floor surface 8.

The robot 1 can be operated in one selected among different modes which provide the following five robot movements 1), 2), 3), 4), and 5) respectively:
1) a rotation on its own axis with the robot center remaining at a same point;
2) a straight movement (a forward movement, a backward movement, or a sideward movement);
3) a curved movement;
4) a meandering movement; and
5) a straight or curved movement with a rotation on its own axis.

The robot movements 1), 2), 3), 4), and 5) will be explained below.

Figure 5:
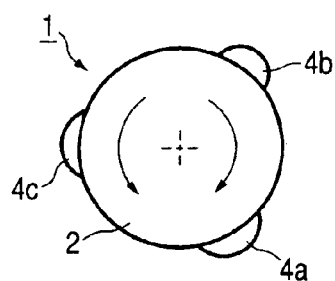
FIG. 5 is a top view of the movable robot in FIG. 1 which is making a rotation on its own axis with a robot center remaining at a same point.
Figure 6:
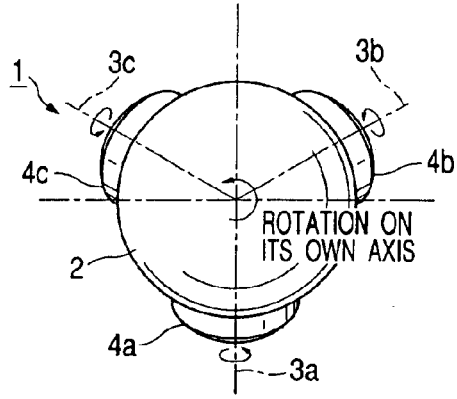
FIG. 6 is a top view of the movable robot in FIG. 1 which is making a rotation on its own axis with the robot center remaining at a same point.

The robot movement 1), that is, the rotation on its own axis with the robot center remaining at a same point, is provided by a robot operation mode 1A) which is the most basic. During operation of the robot 1 in the mode 1A), the wheels 100a, 100b, and 100c are rotated at equal speeds in equal directions, and the robot 1 rotates on its own axis while the center of the robot 1 remains at a same point. With reference to FIGS. 5 and 6, in the case where the wheels 100a, 100b, and 100c are rotated clockwise at equal speeds as viewed from outside, the robot 1 rotates counterclockwise on its own axis while the center of the robot 1 remains at a same point as viewed from above. In the case where the wheels 100a, 100b, and 100c are rotated counterclockwise at equal speeds as viewed from outside, the robot 1 rotates clockwise on its own axis while the center of the robot 1 remains at a same point as viewed from above. The speed of rotation of the robot 1 on its own axis rises and drops in accordance with an increase and a decrease in the speed of rotation of the wheels 100a, 100b, and 100c, respectively.

The robot movement 2), that is, the straight movement, is provided by a robot operation mode 2A). During operation of the robot 1 in the mode 2A), arbitrary one among the wheels 100a, 100b, and 100c remains deactivated and stopped while the other wheels are rotated at equal speeds in opposite directions respectively. During operation of the robot 1 in the mode 2A), the robot 1 moves straight along a line projected onto the floor surface 8 and originating from the rotation axis of the deactivated wheel.

In the case where the directions and speeds of rotation of the activated wheels are set in one of prescribed relations, the robot 1 moves straight in a direction perpendicular to the line projected onto the floor surface 8 and originating from the rotation axis of the deactivated wheel.

Figure 7:
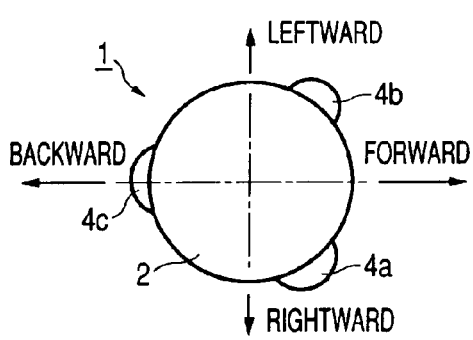
FIG. 7 is a top view of the movable robot in FIG. 1 which is making a straight movement.

With reference to FIG. 7, the wheel 100c remains deactivated and stopped while the wheels 100a and 100b are activated. The forward movement of the robot 1 is defined as a straight movement along a direction from the center of the robot 1 which passes through a robot outer surface point opposite to the deactivated wheel (the wheel 100c). The backward movement of the robot 1 is defined as a straight movement along a direction from the center of the robot 1 which passes through the center of the deactivated wheel (the wheel 100c). The leftward movement and the rightward movement of the robot 1, that is, the first sideward movement and the second sideward movement of the robot 1, are defined as straight movements along directions perpendicular to the forward and backward movements.

Figure 8:
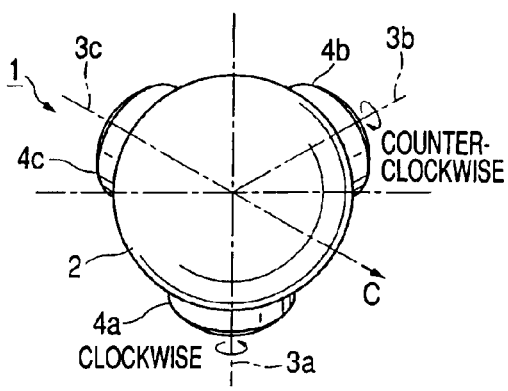
FIG. 8 is a top view of the movable robot in FIG. 1 which is making a forward movement.

The forward movement is as follows. With reference to FIG. 8, in the case where the wheel 100c remains deactivated and stopped while the wheels 100a and 100b are rotated clockwise and counterclockwise respectively at equal speeds, the robot 1 moves straight along a direction C from the center of the robot 1 which passes through a robot outer surface point opposite to the deactivated wheel 100c. The direction C is parallel to the line projected onto the floor surface 8 and originating from the rotation axis 3c of the deactivated wheel 100c. The speed of the forward movement rises and drops as the speed of rotation of the wheels 100a and 100b increases and decreases, respectively.

Figure 9:
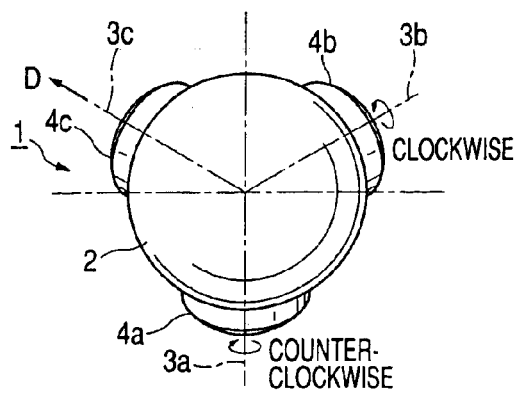
FIG. 9 is a top view of the movable robot in FIG. 1 which is making a backward movement.

The backward movement is as follows. With reference to FIG. 9, in the case where the wheel 100c remains deactivated and stopped while the wheels 100a and 100b are rotated counterclockwise and clockwise respectively at equal speeds, the robot 1 moves straight along a direction D from the center of the robot 1 which passes through the center of the deactivated wheel 100c. The direction D is parallel to the line projected onto the floor surface 8 and originating from the rotation axis 3c of the deactivated wheel 100c. The speed of the backward movement rises and drops as the speed of rotation of the wheels 100a and 100b increases and decreases, respectively.

Figure 10:
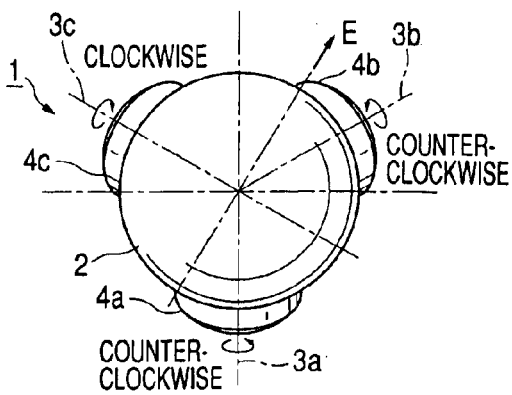
FIG. 10 is a top view of the movable robot in FIG. 1 which is making a leftward movement.

The leftward movement (the first sideward movement) is as follows. With reference to FIGS. 7 and 10, in the case where the wheels 100a and 100b are rotated clockwise at a constant speed N while the wheel 100c is rotated counter-clockwise at a speed 2N equal to twice the constant speed N, the robot 1 moves straight along a direction E from the center of the robot 1 which is perpendicular to the direction of the forward movement. The speed of the leftward movement rises and drops as the speeds of rotation of the wheels 100a, 100b, and 100c increase and decrease, respectively.

Figure 11:
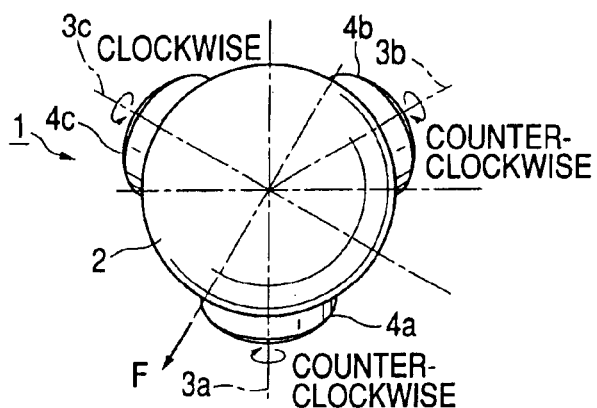
FIG. 11 is a top view of the movable robot in FIG. 1 which is making a rightward movement.

The rightward movement (the second sideward movement) is as follows. With reference to FIGS. 7 and 11, in the case where the wheels 100a and 100b are rotated counterclockwise at a constant speed N while the wheel 100c is rotated clockwise at a speed 2N equal to twice the constant speed N, the robot 1 moves straight along a direction F from the center of the robot 1 which is perpendicular to the direction of the forward movement, and which is opposite to the direction E. The speed of the rightward movement rises and drops as the speeds of rotation of the wheels 100a, 100b, and 100c increase and decrease, respectively.

Figure 12:
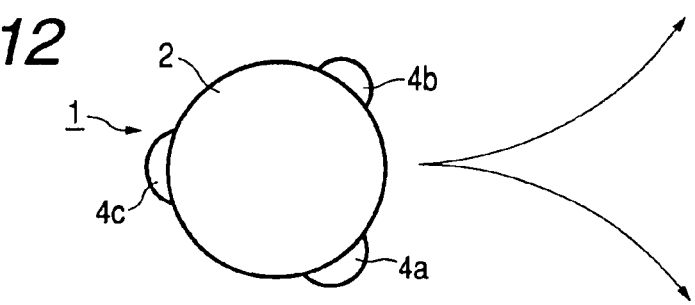
FIG. 12 is a top view of the movable robot in FIG. 1 which is making a curved movement.

The robot movement 3), that is, the curved movement, is provided by a robot operation mode 3A). The curved movement means a movement of the robot 1 along an arc of a circle. During operation of the robot 1 in the mode 3A), arbitrary two among the wheels 100a, 100b, and 100c are rotated at equal speeds in opposite directions respectively, and the other wheel (the special wheel) is rotated also. During operation of the robot 1 in the mode 3A), the robot 1 moves along an arc of a circle as shown in FIG. 12. The radius of the arc (the radius of the circle) is changed as the speed of rotation of the special wheel is varied. Specifically, the radius of the arc is decreased as the speed of rotation of the special wheel is increased. The speed of the curved movement rises and drops as the speed of rotation of the wheels different from the special wheel increases and decreases, respectively. Furthermore, the radius of the arc is changed as the speed of rotation of the wheels different from the special wheel is varied. Specifically, the radius of the arc is increased as the speed of rotation of the wheels different from the special wheel is raised.

The robot movement 3), that is, the curved movement, may be provided by a robot operation mode 3B). During operation of the robot 1 in the mode 3B), arbitrary one among the wheels 100a, 100b, and 100c remains deactivated and stopped while the other wheels are rotated at different speeds in opposite directions respectively. During operation of the robot 1 in the mode 3B), the robot 1 moves along an arc of a circle whose center is located in a slower-wheel side. The radius of the arc (the radius of the circle) is changed as the difference in rotational speed between the activated wheels is varied. Specifically, the radius of the arc is decreased as the speed difference is increased. The speed of the curved movement rises and drops as the speeds of rotation of the activated wheels increase and decrease, respectively.

The robot movement 4), that is, the meandering movement, is provided by a robot operation mode 4A).

Figure 13:
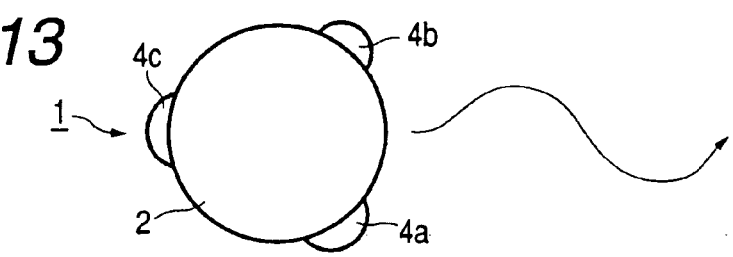
FIG. 13 is a top view of the movable robot in FIG. 1 which is making a meandering movement.

During operation of the robot 1 in the mode 4A), arbitrary two among the wheels 100a, 100b, and 100c are rotated at equal speeds in opposite directions respectively, and the other wheel (the special wheel) is rotated while the direction of rotation of the special wheel is alternately changed between the normal direction and the reverse direction. During operation of the robot 1 in the mode 4A), the robot 1 meanders while moving roughly along a straight line as shown in FIG. 13.

The robot movement 4), that is, the meandering movement, may be provided by a robot operation mode 4B). During operation of the robot 1 in the mode 4B), arbitrary one among the wheels 100a, 100b, and 100c remains deactivated and stopped while the other wheels are rotated at different speeds in opposite directions respectively and the speeds of rotation of the other wheels are repetitively alternated or exchanged. During operation of the robot 1 in the mode 4B), the robot 1 meanders.

Figure 14:
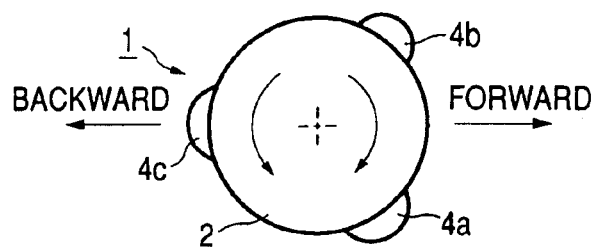
FIG. 14 is a top view of the movable robot in FIG. 1 which is making a straight or curved movement with a rotation on its own axis.

The robot movement 5), that is, the straight or curved movement with a rotation on its own axis, is provided by a robot operation mode 5A). During operation of the robot 1 in the mode 5A), the directions of rotation of the wheels 100a, 100b, and 100c are periodically and alternately changed between the normal directions and the reverse directions, and the speeds of rotation of the wheels 100a, 100b, and 100c are periodically varied along sinusoidal waveforms in time domain while given phase differences are provided among the directions and speeds of rotation of the wheels 100a, 100b, and 100c. During operation of the robot 1 in the mode 5A), the robot 1 moves straight or moves along a curved path while rotating on its own axis as shown in FIG. 14.

Figure 15:
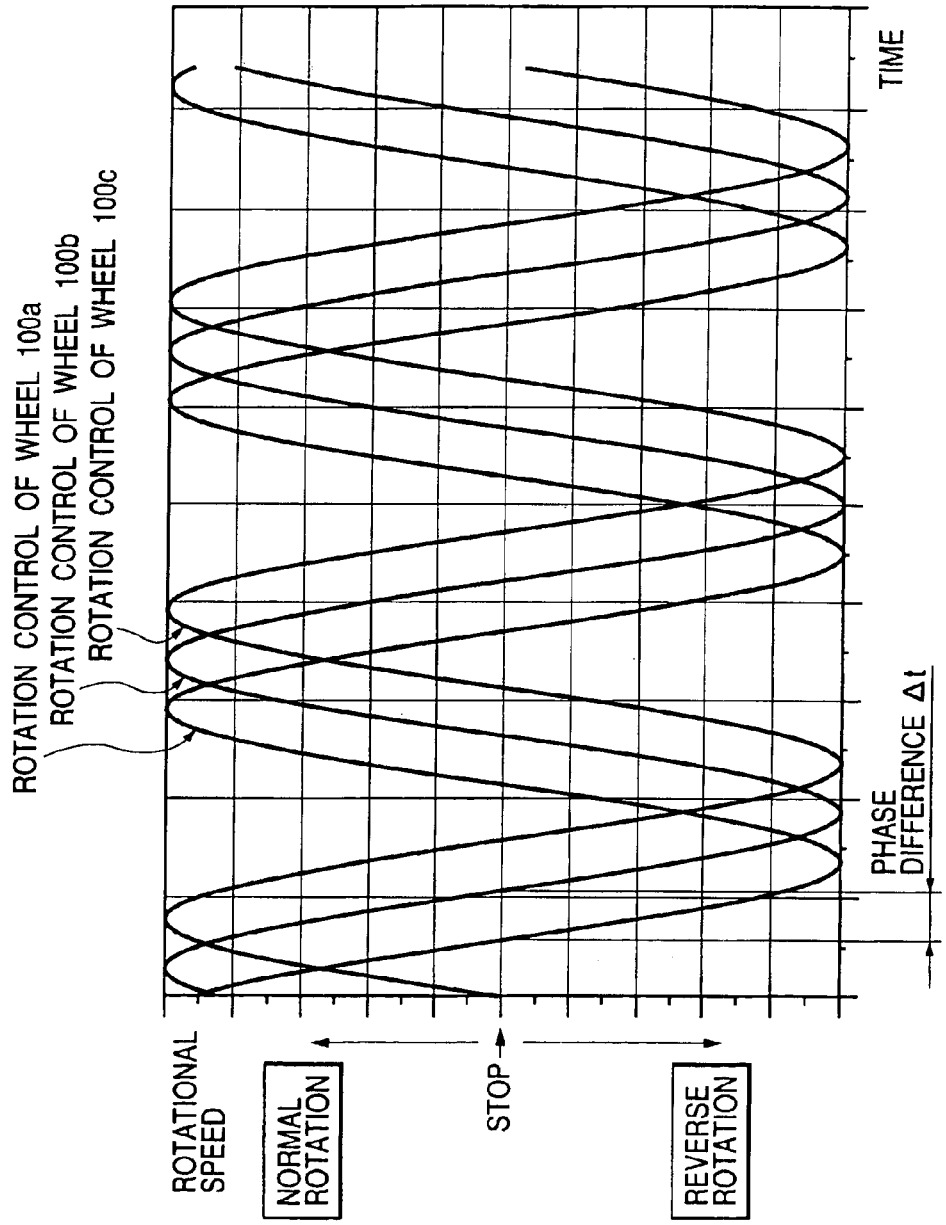
FIG. 15 is a time-domain diagram of the directions and speeds of rotation of wheels in the movable robot in FIG. 1 which occur while the robot is making a straight or curved movement with a rotation on its own axis.

FIG. 15 shows time-domain variations in the directions and speeds of rotation of the wheels 100a, 100b, and 100c which occur during the operation of the robot 1 in the mode 5A). In FIG. 15, the abscissa denotes time, and the ordinate denotes wheel speed. The upper half of the drawing corresponds to wheel rotation in the normal direction, whereas the lower half thereof corresponds to that in the reverse direction. As shown in FIG. 15, the wheels 100a, 100b, and 100c are rotated at speeds varying along sinusoidal waveforms between which given phase differences $\Delta t$ are provided. The speed of rotation of the robot 1 on its own axis, the speed of straight movement of the robot 1, and the speed and radius of curved movement of the robot 1 can be controlled by changing the amplitudes, the periods, and the phases of the above-mentioned waveforms. It should be noted that the waveforms may be changed from the sinusoidal type to another type which causes more complicated movements of the robot 1.

Preferably, the contact portions 6a, 6b, and 6c of the wheels 100a, 100b, and 100c are equal in diameters of cross sections perpendicular to the rotation axes 3a, 3b, and 3c.

The contact portions 6a, 6b, and 6c of the wheels 100a, 100b, and 100c may be different in diameters of cross sections perpendicular to the rotation axes 3a, 3b, and 3c. In this case, the robot movements 1), 2), 3), 4), and 5) can be made provided that the ratio among the speeds of rotation of the wheels 100a, 100b, and 100c is set according to the ratio among the diameters of the contact portions 6a, 6b, and 6c. In the case where the ratio among the diameters of the contact portions 6a, 6b, and 6c is Ma:Mb:Mc, the ratio among the speeds of rotation of the wheels 100a, 100b, and 100c is set as 1/Ma: 1/Mb: 1/Mc.

As previously mentioned, the directions and speeds of rotation of the wheels 100a, 100b, and 100c are independently controlled so that the robot 1 can make various movements. In addition, the robot 1 can quickly move. The robot 1 has performances suited for home use. Two or more different movements of the robot 1 may be combined. Thus, the robot 1 can make entertaining movements. In the case where the wheels 100a, 100b, and 100c are held stationary or stopped, the robot 1 maintains a same posture. In this case, the robot 1 is prevented from spontaneously moving down even when it is on a sloping floor.

Figure 16:
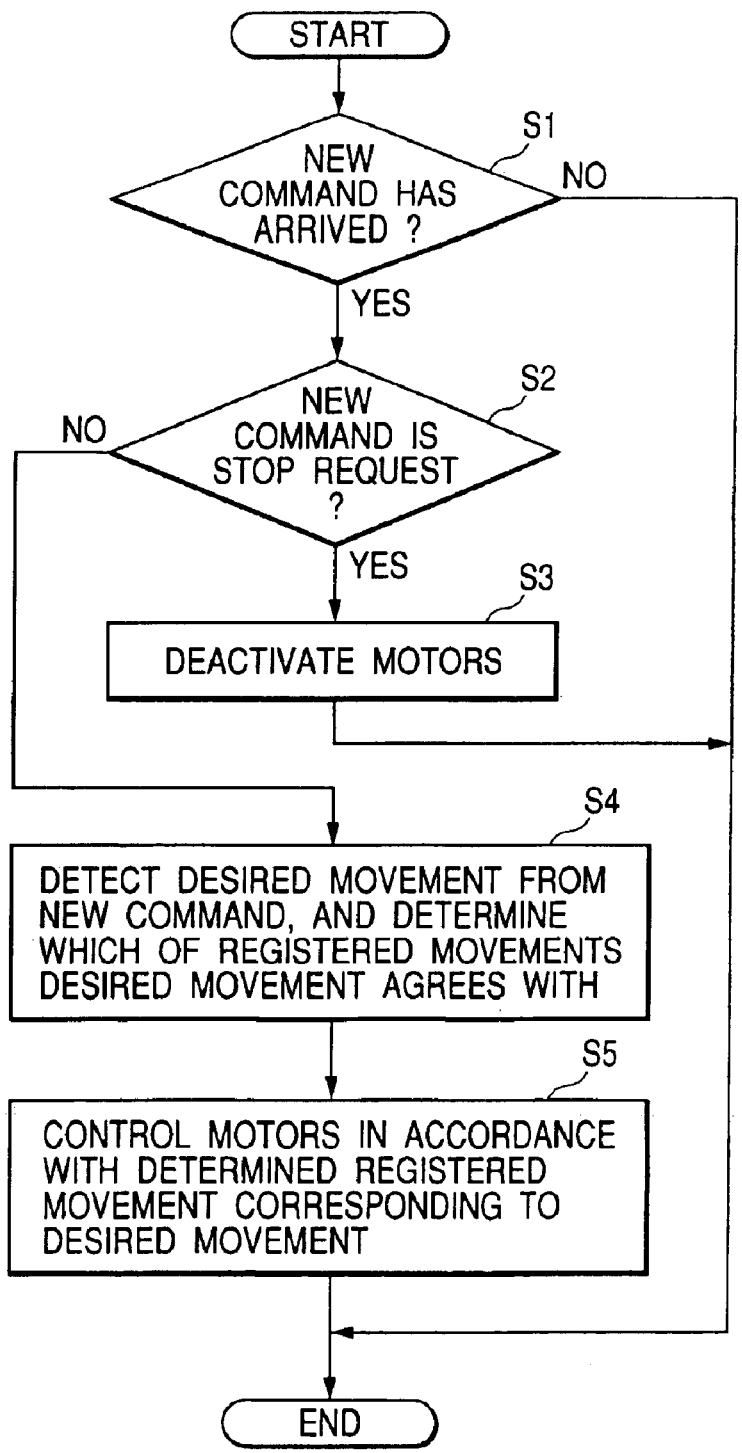
FIG. 16 is a flowchart of a segment of an example of a control program for a controller in FIG. 4.

As previously mentioned, the controller 13 operates in accordance with a control program. FIG. 16 is a flowchart of a segment of an example of the control program. The program segment in FIG. 16 is repetitively executed. As shown in FIG. 16, a first step S1 of the program segment decides whether or not a new command signal has arrived. When a new command signal has arrived, the program advances from the step S1 to a step S2. Otherwise, the program exits from the step S1, and then the current execution cycle of the program segment ends.

The step S2 decides whether or not the new command signal indicates a request for stop of the robot 1. When it is decided that the new command signal indicates a stop request, the program advances from the step S2 to a step S3. Otherwise, the program advances from the step S2 to a step S4.

The step S3 deactivates the rotation drive motors 10a, 10b, and 10c to stop the robot 1. After the step S3, the current execution cycle of the program segment ends.

The step S4 detects the desired robot movement from the command signal. The step S4 accesses previously-stored information in the ROM or the RAM of the controller 13 which represents registered robot movements including the previously-mentioned robot movements 1), 2), 3), 4), and 5). The step S4 collates the desired robot movement with the registered robot movements, and determines which of the registered robot movements the desired robot movement agrees with. The step S4 selects one among the registered robot movements with which the desired robot movement agrees.

A step S5 following the step S4 accesses previously-stored information in the ROM or the RAM of the controller 13 which represents a table of the relation among the registered robot movements and target conditions of the rotation drive motors 10a, 10b, and 10c. The step S5 refers to the table, and thereby determines target conditions of the rotation drive motors 10a, 10b, and 10c which correspond to the registered robot movement selected by the step S4. The step S5 controls the rotation drive motors 10a, 10b, and 10c into the conditions same as the determined target conditions. As a result, the desired robot movement is implemented. After the step S5, the current execution cycle of the program segment ends.

Second Embodiment

Figure 17:
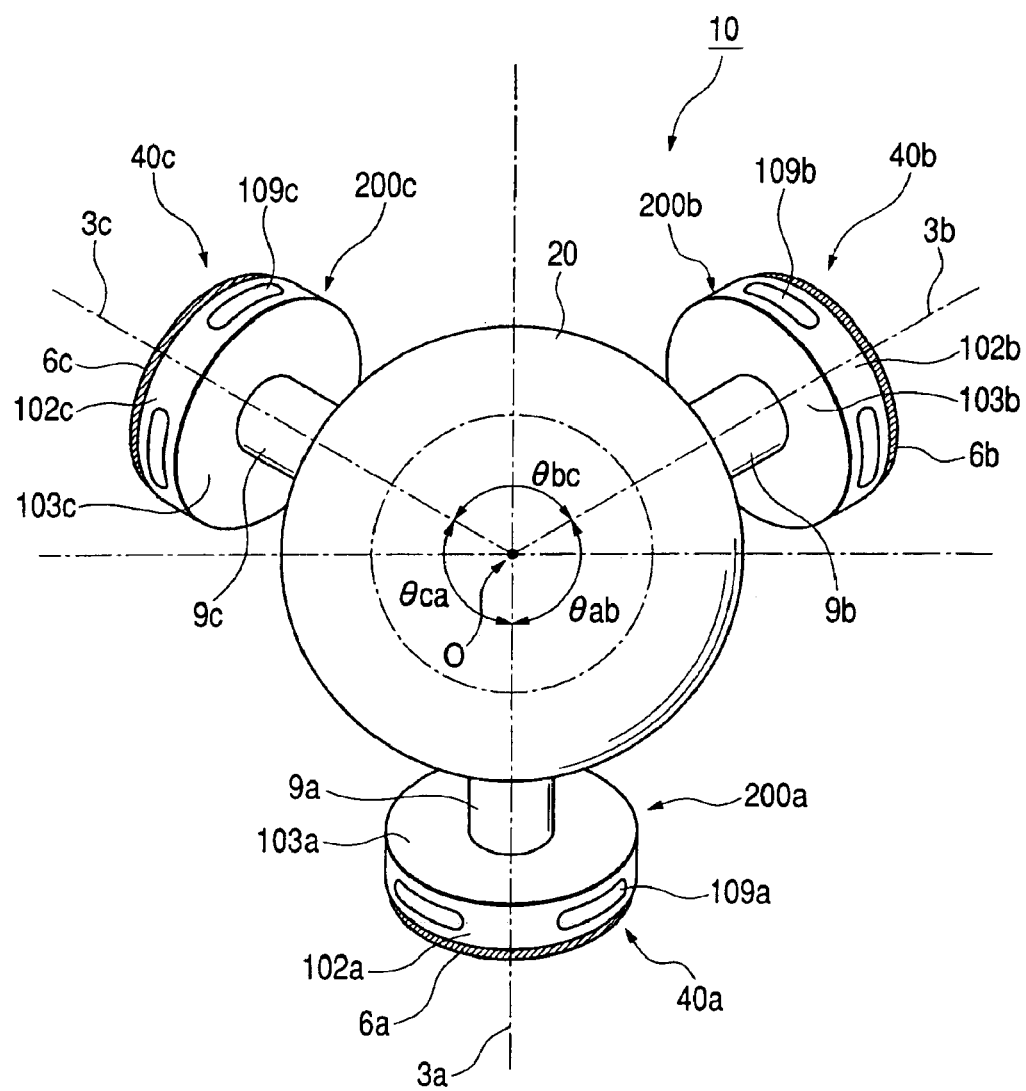
FIG. 17 is a top view of a movable robot according to a second embodiment of this invention.
Figure 18:
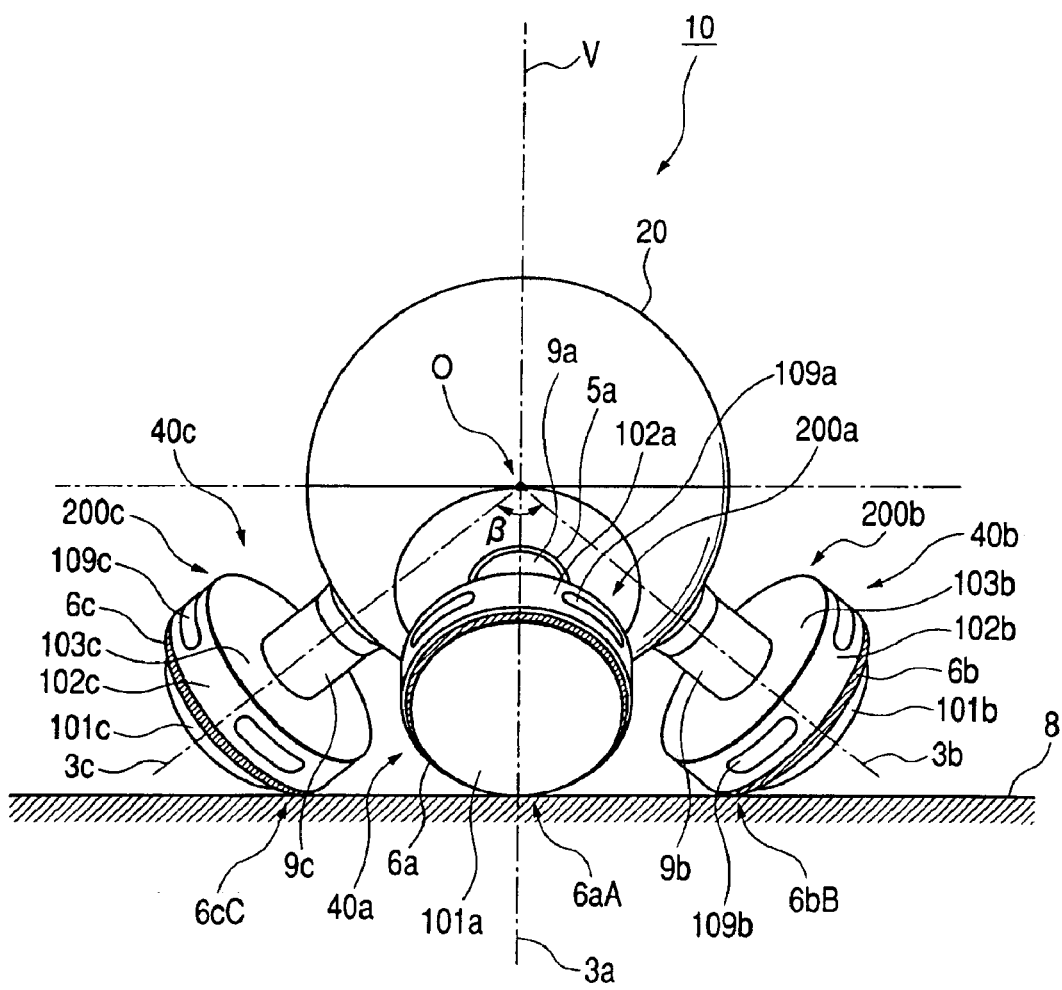
FIG. 18 is a front view of the movable robot in FIG. 17.
Figure 19:
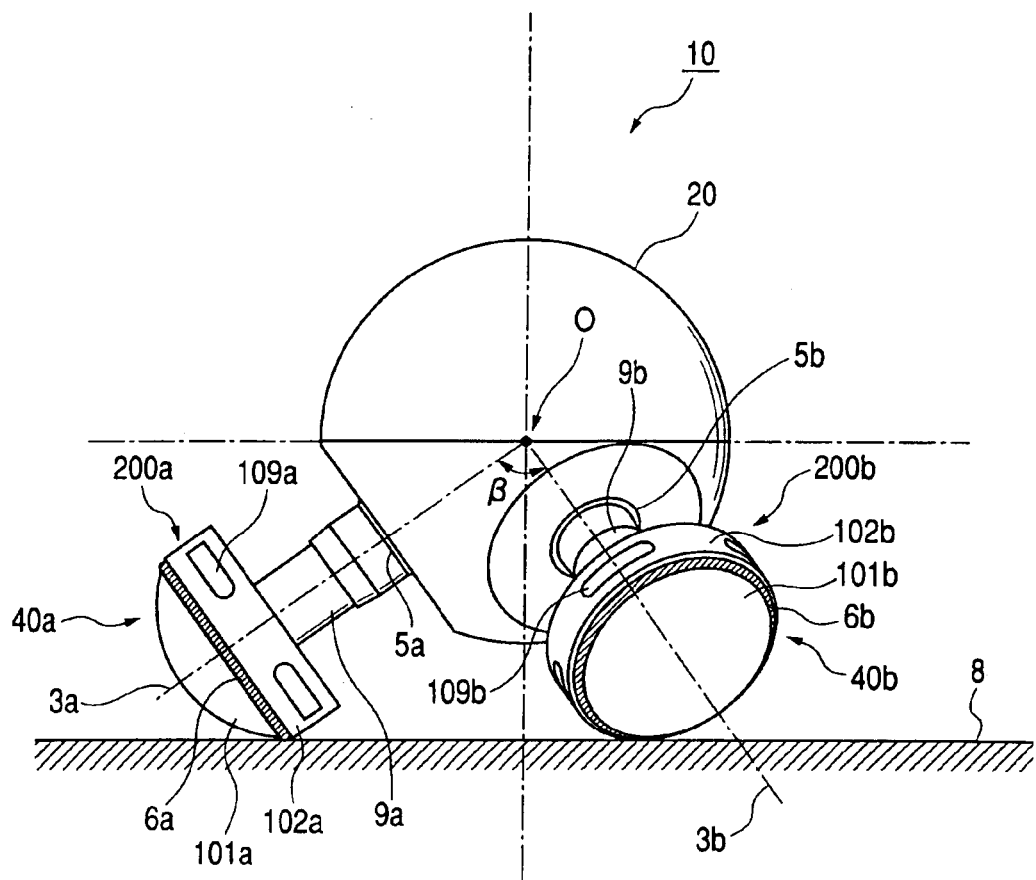
FIG. 19 is a right-hand side view of the movable robot in FIG. 17.

FIGS. 17, 18, and 19 show a movable robot 10 according to a second embodiment of this invention. The robot 10 is similar to the robot 1 (see FIGS. 1, 2, and 3) except for design changes mentioned later. With reference to FIGS. 17, 18, and 19, the robot 10 includes a main body unit 20 similar to the main body unit 2 (see FIGS. 1, 2, and 3). The robot 10 includes three wheel units 40a, 40b, and 40c which replace the wheel units 4a, 4b, and 4c (see FIGS. 1, 2, and 3) respectively. The wheel units 40a, 40b, and 40c are of equal structures.

The wheel unit 40a includes a cylindrical leg portion 9a and a wheel 200a. The leg portion 9a extends coaxially with respect to a rotation axis 3a. The leg portion 9a can expand and contract along the direction of the rotation axis 3a. The wheel 200a is connected with the main body unit 20 by the leg portion 9a. The wheel 200a is coaxial with respect to the rotation axis 3a. The wheel 200a can rotate about the rotation axis 3a. The leg portion 9a extends coaxially and inward from the wheel 200a. Thus, the wheel 200a is mounted on the outer end of the leg portion 9a. The leg portion 9a extends into the main body unit 20. The leg portion 9a is supported by the main body unit 20. As the leg portion 9a expands and contracts axially, the wheel 200a moves between an innermost position and an outermost position. The innermost position is defined as a normal position. Similarly, the wheel units 40b and 40c include cylindrical leg portions 9b and 9c, and wheels 200b and 200c. The wheels 200b and 200c are connected with the main body unit 20 by the leg portions 9b and 9c, respectively. The wheels 200b and 200c are similar to the wheel 200a. The wheel 200b and the leg portion 9b are coaxial with respect to a rotation axis 3b. The wheel 200c and the leg portion 9c are coaxial with respect to a rotation axis 3c. The leg portions 9b and 9c are similar to the leg portion 9a. As the leg portion 9b expands and contracts axially, the wheel 200b moves between an innermost position (a normal position) and an outermost position. As the leg portion 9c expands and contracts axially, the wheel 200c moves between an innermost position (a normal position) and an outermost position. The wheels 200a, 200b, and 200c can be moved independently. In FIGS. 17, 18, and 19, the wheels 200a, 200b, and 200c are in their outermost positions. The normal positions (innermost positions) of the wheels 200a, 200b, and 200c are similar to the positions of the wheel units 4a, 4b, and 4c in FIGS. 1, 2, and 3.

A casing in the main body unit 20 is formed with openings 5a, 5b, and 5c which correspond to the rotation axes 3a, 3b, and 3c respectively. The leg portions 9a, 9b, and 9c at least partially extend in the openings 5a, 5b, and 5c, respectively. The axes of the leg portions 9a, 9b, and 9c coincide with the rotation axes 3a, 3b, and 3c, respectively. When the wheels 200a, 200b, and 200c are in their normal positions (innermost positions), portions of the wheel units 40a, 40b, and 40c are accommodated in the openings 5a, 5b, and 5c respectively.

The wheel 200a is basically composed of a shell portion 101a, a cylindrical portion 102a, a circular plate 103a, and an annular contact portion 6a connected with each other. The cylindrical portion 102a and the circular plate 103a are coaxial with respect to the rotation axis 3a. The cylindrical portion 102a has an outer end formed with an opening closed by the shell portion 101a. The cylindrical portion 102a has an inner end formed with an opening closed by the circular plate 103a. The shell portion 101a has an outer convex surface exactly or approximately extending along a part of a sphere, the center of which is on the rotation axis 3a. The contact portion 6a is provided between the shell portion 101a and the cylindrical portion 102a. The contact portion 6a forms a ridge where the shell portion 101a and the cylindrical portion 102a are connected. The leg portion 9a coaxially extends from a central area of the circular plate 103a to the main body unit 20. The wheel 200a has a substantially airtight inner space.

Similarly, the wheel 200b includes a shell portion 101b, a cylindrical portion 102b, a circular plate 103b, and an annular contact portion 6b. The leg portion 9b coaxially extends from a central area of the circular plate 103b to the main body unit 20. Also, the wheel 200c includes a shell portion 10c, a cylindrical portion 102c, a circular plate 103c, and an annular contact portion 6c. The leg portion 9c coaxially extends from a central area of the circular plate 103c to the main body unit 20.

Light emitting devices (not shown in FIGS. 17–19) are provided in the inner spaces of the wheels 200a, 200b, and 200c, respectively. The light emitting devices will be mentioned later. The outer circumferential surfaces of the cylindrical portions 102a, 102b, and 102c of the wheels 200a, 200b, and 200c have transparent or semitransparent windows 109a, 109b, and 109c. The windows 109a, 109b, and 109c allow light generated by the light emitting devices to be seen or monitored from a region external with respect to the robot 10.

Normally, the contact portions 6a, 6b, and 6c are in contact with a floor surface 8, thereby supporting the main body unit 20 with respect to the floor surface 8 in a manner such that the main body unit 20 is spaced upward from the floor surface 8.

The contact portions 6a, 6b, and 6c are made of rigid material or resilient material such as rubber. In the case where the contact portions 6a, 6b, and 6c and the floor surface 8 are rigid, the contacts between them are of a point type. On the other hand, in the case where the floor surface 8 is formed by a carpet and is hence soft, the contacts are of a surface type. In the case where the contact portions 6a, 6b, and 6c are resilient, the contacts are of a surface type even when the floor surface 8 is rigid.

The central axes of the wheels 200a, 200b, and 200c coincide with the rotation axes 3a, 3b, and 3c, respectively. The rotation axes 3a, 3b, and 3c mean axes about which the wheels 200a, 200b, and 200c rotate. The rotation axes 3a, 3b, and 3c intersect at the center O of the approximately spherical casing of the main body unit 20. A movement plane is defined as one determined by the points 6aA, 6bB, and 6cC at which the contact portions 6a, 6b, and 6c of the wheels 200a, 200b, and 200c touch the floor surface 8. Provided that the floor surface 8 is rigid and plane, the movement plane coincides with the floor surface 8. As shown in FIG. 17, lines projected onto the movement plane (the floor surface 8) and originating from the rotation axes 3a, 3b, and 3c are spaced at exactly or substantially equal angular intervals. Thus, in FIG. 17, the projectional angle θab between the rotation axes 3a and 3b, the projectional angle θbc between the rotation axes 3b and 3c, and the projectional angle θca between the rotation axes 3c and 3a are exactly or substantially equal to each other.

An example of preferably setting of angles among the rotation axes 3a, 3b, and 3c is as follows. With reference to FIGS. 18 and 19, the true angle between the rotation axes 3a and 3b, the true angle between the rotation axes 3b and 3c, and the true angle between the rotation axes 3c and 3a are equal to a predetermined value "β", for example, 90 degrees. On the other hand, the angles between the lines projected onto the movement plane (the floor surface 8) and originating from the rotation axes 3a, 3b, and 3c are equal to 120 degrees. Two among the rotation axes 3a, 3b, and 3c are on a common plane.

Figure 20:
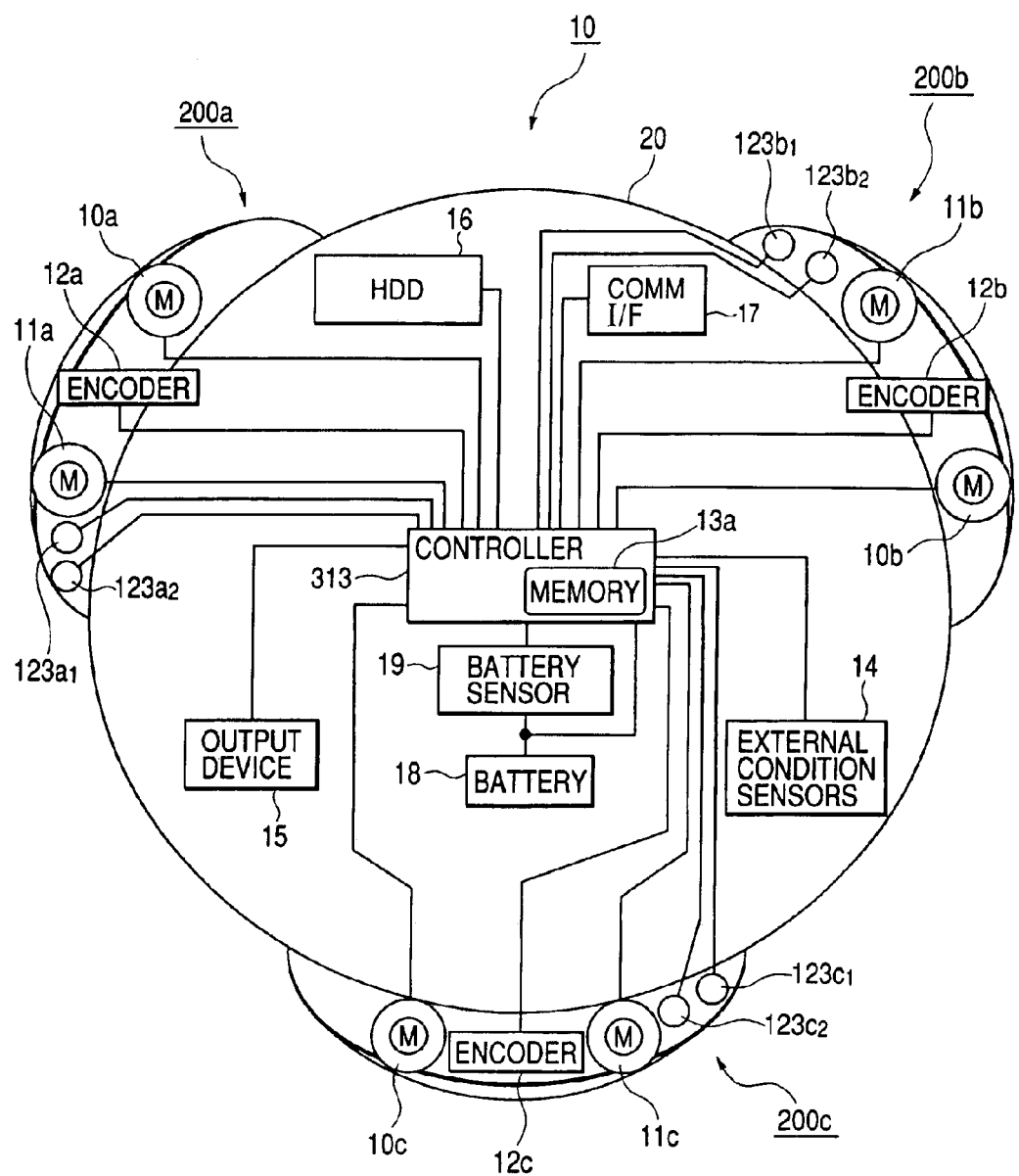
FIG. 20 is a diagram of a control system in the movable robot of FIG. 17.

As shown in FIG. 20, the wheel 200a contains a rotation drive motor 10a, a linear-movement drive motor 1 1a, an encoder 12a, and detection switches 123a1 and 123a2. The wheel 200b contains a rotation drive motor 10b, a linear-movement drive motor 11b, an encoder 12b, and detection switches 123b1 and 123b2. The wheel 200c contains a rotation drive motor 10c, a linear-movement drive motor 11c, an encoder 12c, and detection switches 123c1 and 123c2. The wheels 200a, 200b, and 200c have input members (for example, input gears) coupled with the output shafts of the rotation drive motors 10a, 10b, and 10c, respectively. The wheels 200a, 200b, and 200c can be independently actuated by the rotation drive motors 10a, 10b, and 10c. The wheels 200a, 200b, and 200c rotate about the rotation axes 3a, 3b, and 3c respectively when being actuated by the rotation drive motors 10a, 10b, and 10c. Preferably, the rotation drive motors 10a, 10b, and 10c include DC motors.

The leg portions 9a, 9b, and 9c are coupled with the output shafts of the linear-movement drive motors 11a, 11b, and 11c, respectively. The leg portions 9a, 9b, and 9c can be expanded and contracted along the rotation axes 3a, 3b, and 3c by the linear-movement drive motors 11a, 11b, and 11c, respectively. In other words, the axial lengths of the leg portions 9a, 9b, and 9c can be changed by the linear-movement drive motors 11a, 11b, and 11c, respectively. The wheels 200a, 200b, and 200c move axially as the respective leg portions 9a, 9b, and 9c expand and contract. Thus, the wheels 200a, 200b, and 200c can be independently actuated by the linear-movement drive motors 11a, 11b, and 11c. The wheels 200a, 200b, and 200c move along the rotation axes 3a, 3b, and 3c respectively when being actuated by the linear-movement drive motors 11a, 11b, and 11c.

Each of the linear-movement drive motors 11a, 11b, and 11c may include a rotary motor having a rotary output shaft, a pinion or a worm mounted on the motor shaft, and a rack meshing with the pinion (the worm) and mounted on the leg portion 9a, 9b, or 9c.

The encoders 12a, 12b, and 12c detect the axial lengths of the leg portions 9a, 9b, and 9c, respectively. The axial lengths of the leg portions 9a, 9b, and 9c can be subjected to servo control or feedback control responsive to the output signals from the encoders 12a, 12b, and 12c, respectively.

The detection switches 123a1 and 123a2 act as limit switches associated with the leg portion 9a. The detection switch 123a1 senses when the axial length of the leg portion 9a reaches a first predetermined value. The detection switch 123a2 senses when the axial length of the leg portion 9a reaches a second predetermined value different from the first predetermined value. The axial length of the leg portion 9a may be limited in response to the output signals from the detection switches 123a1 and 123a2. The detection switches 123b1 and 123b2 act as limit switches associated with the leg portion 9b. The detection switch 123b1 senses when the axial length of the leg portion 9b reaches a first predetermined value. The detection switch 123b2 senses when the axial length of the leg portion 9b reaches a second predetermined value different from the first predetermined value. The axial length of the leg portion 9b may be limited in response to the output signals from the detection switches 123b1 and 123b2. The detection switches 123c1 and 123c2 act as limit switches associated with the leg portion 9c. The detection switch 123c1 senses when the axial length of the leg portion 9c reaches a first predetermined value. The detection switch 123c2 senses when the axial length of the leg portion 9c reaches a second predetermined value different from the first predetermined value. The axial length of the leg portion 9c may be limited in response to the output signals from the detection switches 123c1 and 123c2.

Figure 21:
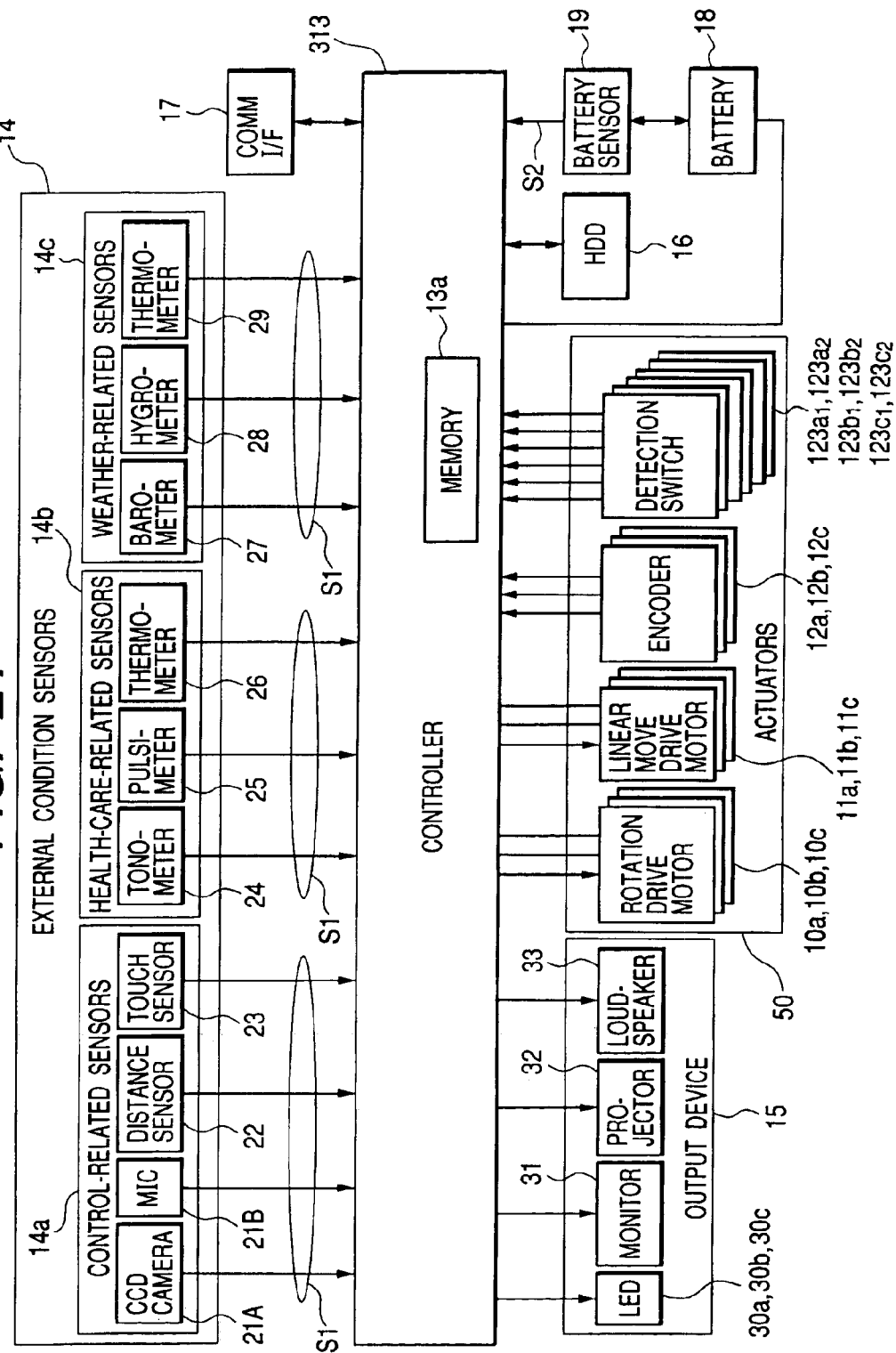
FIG. 21 is a block diagram of the control system in the movable robot of FIG. 17.

FIG. 21 shows a control system in the robot 10. In the control system of FIG. 21, the rotation drive motor 10a, the linear-movement drive motor 11a, the encoder 12a, and the detection switches 123a1 and 123a2 compose a first sub unit with respect to the wheel unit 40a. The rotation drive motor 10b, the linear-movement drive motor 11b, the encoder 12b, and the detection switches 123b1 and 123b2 compose a second sub unit with respect to the wheel unit 40b. The rotation drive motor 10c, the linear-movement drive motor 11c, the encoder 12c, and the detection switches 123c1 and 123c2 compose a third sub unit with respect to the wheel unit 40c. The first, second, and third sub units are referred to as actuators 50.

The wheels 200a, 200b, and 200c can be rotated by the rotation drive motors 10a, 10b, and 10c even when they are out of the normal positions (innermost positions). The directions and speeds of rotation of the wheels 200a, 200b, and 200c are independently controlled so that the robot 10 can make the previously-mentioned movements 1), 2), 3), 4), and 5).

As the wheels 200a, 200b, and 200c are moved from their innermost positions toward their outermost positions, the points 6aA, 6bB, and 6cC at which the contact portions 6a, 6b, and 6c of the wheels 200a, 200b, and 200c touch the floor surface 8 are more distant from each other so that the posture of the robot 10 is stabler. In the case where the posture of the robot 10 is sufficiently stable, the robot 10 can move over a small step on the floor surface 8. In the case where the wheels 200a, 200b, and 200c are in their outermost positions, the robot 10 can move over a small obstacle on the floor surface 8 or a small recess therein.

A ball can be moved by at least one of the wheels 200a, 200b, and 200c as the wheel is moved toward its outermost position at a high speed. A ball can be moved by the robot 10 while being held between two of the leg portions 9a, 9b, and 9c. Accordingly, the robot 10 can make entertaining movements with balls.

Preferably, the axial lengths of the leg portions 9a, 9b, and 9c are set to the same value. Alternatively, the axial lengths of the leg portions 9a, 9b, and 9c may be set to different values. For example, the axial lengths of the leg portions 9a, 9b, and 9c are set so that one of the wheels 200a, 200b, and 200c will be in its innermost position and the other wheels will be in their outermost positions or that one of the wheels 200a, 200b, and 200c will be in its outermost position and the other wheels will be in their innermost positions. The robot 10 may be moved while the leg portions 9a, 9b, and 9c are being axially expanded or contracted. Two or more different movements of the robot 10 may be combined to get a more complicated movement.

The robot 10 can quickly move. The robot 10 has performances suited for home use. Two or more different movements of the robot 10 may be combined. Thus, the robot 10 can make entertaining movements. In the case where the wheels 200a, 200b, and 200c are held stationary or stopped, the robot 10 maintains a same posture. In this case, the robot 10 is prevented from spontaneously moving down even when it is on a sloping floor.

The contact portions 6a, 6b, and 6c of the wheels 200a, 200b, and 200c may be different in diameters of cross sections perpendicular to the rotation axes 3a, 3b, and 3c. In this case, the robot movements 1), 2), 3), 4), and 5) can be made provided that the ratio among the speeds of rotation of the wheels 200a, 200b, and 200c is set according to the ratio among the diameters of the contact portions 6a, 6b, and 6c. In the case where the ratio among the diameters of the contact portions 6a, 6b, and 6c is Ma:Mb:Mc, the ratio among the speeds of rotation of the wheels 200a, 200b, and 200c is set as 1/Ma:1/Mb:1/Mc.

With reference back to FIGS. 20 and 21, the main body unit 20 contains a controller 313, external condition sensors 14, an output device 15, a recording and reproducing device 16, a communication interface 17, a battery 18, and a battery sensor 19. The controller 313 is connected with the rotation drive motors 10a, 10b, and 10c, the linear-movement drive motors 11a, 11b, and 11c, the encoders 12a, 12b, and 12c, the detection switches 123a1, 123a2, 123b1, 123b2, 123c1, and 123c2, the external condition sensors 14, the output device 15, the recording and reproducing device 16, the communication interface 17, the battery 18, and the battery sensor 19. The controller 313 is designed to implement general control of the robot 10. The controller 313 includes a microcomputer or a similar device having a combination of an input/output circuit, a processor, a ROM, and a RAM. The controller 313 operates in accordance with a control program stored in the ROM or the RAM. The control program for the controller 313 is designed to enable the controller 313 to execute operation steps for general control of the robot 10. The external condition sensors 14 detect conditions outside the robot 10. The output device 15 transmits information from the controller 313 to an external device. The recording and reproducing device 16 serves to record and reproduce information. The recording and reproducing device 16 includes, for example, a hard disk drive (HDD). The communication interface 17 serves to implement radio communications between the controller 313 and an external device. The battery 18 acts as a power source of the robot 10. The battery sensor 19 detects the amount of charges remaining in the battery 18.

The external condition sensors 14 are separated into a group of control-related sensors 14a, a group of health-care-related sensors 14b, and a group of weather-related sensors 14c. The control-related sensors 14a get information from outside of the main body unit 20, and detect a pressure externally applied to the main body unit 20. The control-related sensors 14a notify the controller 313 of the information and the applied pressure. The health-care-related sensors 14b measure the health conditions of a user of the robot 10. The health-care-related sensors 14b notify the controller 313 of the measured health conditions. The weather-related sensors 14c measure the weather conditions (for example, the temperature and humidity) of the surroundings of the robot 10. The weather-related sensors 14c notify the controller 313 of the measured weather conditions. The control program for the controller 313 has a segment for making a weather forecast in response to the measured weather conditions.

Specifically, the control-related sensors 14a include a CCD camera 21A, a microphone 21B, a distance sensor 22, and a touch sensor 23. The CCD camera 21A functions as an eye of the robot 10. There may be a plurality of CCD cameras 21A. The microphone 21B functions as an ear of the robot 10. There may be a plurality of microphones 21B. The distance sensor 22 acts to measure the distance between the robot 10 and an obstacle outside the robot 10. The touch sensor 23 detects that the robot 10 is stroked or struck.

The CCD camera 21A takes an image of the surroundings of the robot 10. The CCD camera 2 1A notifies the controller 313 of the taken image. The microphone 21B picks up user's voices to get voice information. The microphone 21B sends the voice information to the controller 313. As previously mentioned, the distance sensor 22 measures the distance between the robot 10 and an external obstacle. The distance sensor 22 notifies the controller 313 of the measured distance. The touch sensor 23 measures a pressure applied to the robot 10 which is caused when the user strokes or strikes the robot 10. The touch sensor 23 gets pressure information from the measured pressure. The touch sensor 23 sends the pressure information to the controller 313.

The health-care-related sensors 14b include a tonometer 24, a pulsimeter (a heartbeat meter) 25, and a thermometer 26. The tonometer 24 measures the blood pressure in the body of the user from, for example, user's finger to get blood-pressure information. The tonometer 24 sends the blood-pressure information to the controller 313. The pulsimeter 25 measures the pulse frequency in the body of the user to get pulse-frequency information. The pulsimeter 25 sends the pulse-frequency information to the controller 313. The thermometer 26 measures the bodily temperature in the user to get bodily-temperature information. The thermometer 26 sends the bodily-temperature information to the controller 313.

The weather-related sensors 14c measure the atmospheric temperature, the humidity, and the atmospheric pressure in the surroundings of the robot 10. The weather-related sensors 14c include a barometer 27, a hygrometer 28, and a thermometer 29. The barometer 27 measures the atmospheric pressure in the surroundings of the robot 10 to get atmospheric-pressure information. The barometer 27 sends the atmospheric-pressure information to the controller 313. The hygrometer 28 measures the humidity in the surroundings of the robot 10 to get humidity information. The hygrometer 28 sends the humidity information to the controller 313. The thermometer 29 measures the atmospheric temperature in the surroundings of the robot 10 to get atmospheric-temperature information. The thermometer 29 sends the atmospheric-temperature information to the controller 313.

The external condition sensors 14 use inexpensive general ones. The external condition sensors 14 measure and detect the conditions of the surroundings of the robot 10, the health-related conditions of the body of the user, and the weather conditions. The external condition sensors 14 generate detection information representing the measured and detected conditions. The external condition sensors 14 send the detection information to the controller 313 as sensor signals S1.

As previously mentioned, the battery sensor 19 detects the amount of charges remaining in the battery 18. The battery sensor 19 generates information representing the result of the detection. The battery sensor 19 sends the detection-result information to the controller 313 as a battery detection signal S2.

The controller 313 includes a memory 13a storing the control program. The controller 313 decides the conditions of the surroundings of the robot 10, the amount of charges remaining in the battery 18, commands from the user, and the presence and absence of an action of the user on the robot 10 in response to the sensor signals S1 and the battery detection signal S2. According to the control program, the controller 313 determines a desired movement of the robot 10 in response to the results of the above-mentioned decision. The controller 313 operates the rotation drive motors 10a, 10b, and 10c, and the linear-movement drive motors 11a, 11b, and 11c in accordance with the desired movement so that the robot 10 will actually make a movement equal to the desired one.

The output device 15 includes the light emitting devices 30a, 30b, and 30c which are provided in the wheels 200a, 200b, and 200c. The light emitting devices 30a, 30b, and 30c may be provided in the main body unit 20. The light emitting devices 30a, 30b, and 30c use, for example, light emitting diodes (LEDs). Preferably, the LEDs 30a, 30b, and 30c are different-color light emitters. The LEDs 30a, 30b, and 30c include at least red one and green one. The output device 15 further includes a monitor 31, a projector 32, and a loudspeaker 33. The monitor 31 and the projector 32 are displays. The controller 313 can instruct the output device 15 to output prescribed information. For example, the controller 313 can instruct the LEDs 30a, 30b, and 30c to continuously turn on or periodically turn on and off to indicate given information. Also, the controller 313 can instruct the monitor 31 and the projector 32 to indicate prescribed picture information. Furthermore, the controller 313 can instruct the loudspeaker 33 to generate various types of sound information. The control of the output device 15 by the controller 313 enables the robot 10 to show its feelings on a personification basis.

Information outputted from the output device 15 includes video information and audio information. Furthermore, the information outputted from the output device 15 includes video information generated by the external condition sensors 14, information generated by the external condition sensors 14 which represents the blood pressure, the pulse frequency, the humidity, and the atmospheric temperature, information received from outside of the robot 10 via the communication interface 17, and information reproduced by the recording and reproducing device 16.

As understood from the previous description, the controller 313 enables the robot 10 to autonomously operate in response to external information, commands from the user, and the presence and absence of an action of the user on the robot 10.

The controller 313 can instruct the monitor 31 to indicate the conditions (for example, the atmospheric temperature and the humidity) measured by the weather-related sensors 14c. The controller 313 determines the degree of comfortableness in response to the conditions measured by the weather-related sensors 14c. The controller 313 can instruct the output device 15 to show robot's feelings in accordance with the determined degree of comfortableness. For example, the controller 313 determines the degree of comfortableness in response to the atmospheric temperature and the humidity measured by the weather-related sensors 14c. Then, the controller 313 decides whether the determined degree of comfortableness is in an acceptable range or an unacceptable range. When the degree of comfortableness is in the unacceptable range, the controller 313 instructs red one of the LEDs 30a, 30b, and 30c to periodically turn on and off. On the other hand, when the degree of comfortableness is in the acceptable range, the controller 13B instructs green one of the LEDs 30a, 30b, and 30c to continuously turn on.

The controller 313 continuously monitors the atmospheric pressure measured by the barometer 27 in the weather-related sensors 14c, and detects a variation in the atmospheric pressure. The controller 313 makes a weather forecast in response to the detected variation in the atmospheric pressure. The controller 313 selects one among the LEDs 30a, 30b, and 30c which emits light having color corresponding to the contents of the weather forecast. The controller 313 activates the selected LED. Alternatively, the controller 313 may instruct the monitor 31 to indicate the contents of the weather forecast. The controller 313 may instruct the loudspeaker 33 to audibly report the contents of the weather forecast to the user.

The controller 313 detects from the output signal of the touch sensor 23 in the control-related sensors 14a that the robot 10 is stroked by the user. When it is detected that the robot 10 is stroked, the controller 13B instructs green one of the LEDs 30a, 30b, and 30c to turn on and simultaneously operates the rotation drive motors 10a, 10b, and 10c to rotate the robot 10 on its own axis to show robot's feeling of joy. In this case, the controller 313 may also activate the monitor 31, the projector 32, and the loudspeaker 33 to generate visual information and audible information. The controller 313 detects from the output signal of the touch sensor 23 in the control-related sensors 14a that the robot 10 is struck by the user. When it is detected that the robot 10 is struck, the controller 313 instructs red one of the LEDs 30a, 30b, and 30c to periodically turn on and off and simultaneously operates the rotation drive motors 10a, 10b, and 10c to rotate the robot 10 on its own axis alternately in the normal direction and the reverse direction to show robot's feeling of anger. In this case, the controller 313 may also activate the monitor 31, the projector 32, and the loudspeaker 33 to output visual information and audible information.

As understood from the previous description, the robot 10 can autonomously operate. In addition, the robot 10 can show its feelings on a personification basis. Thus, the user and the robot 10 can closely communicate with each other. The robot 10 can act as user's partner capable of giving pleasure and joy to the user.

The controller 313 can instruct the communication interface 17 to transmit, to an external device, information represented by the sensor signals S1 and information stored in the recording and reproducing device 16. The communication interface 17 can receive user's commands. The controller 313 can receive the user's commands from the communication interface 17. The controller 313 adjusts the rotation drive motors 10a, 10b, and 10c, and the linear-movement drive motors 11a, 11b, and 11c in response to the user's commands to operate the robot 10 on a non-autonomous basis. In this case, the robot 10 is under remote control.

Preferably, a remote controller unit located outside the robot 10 or a personal computer located outside the robot 10 and having a radio communication unit sends a radio signal representative of user's command toward the robot 10. The communication interface 17 in the robot 10 receives the radio signal, and extracts the user's command therefrom. The communication interface 17 feeds the user's command to the controller 313. The controller 313 operates the robot 10 in accordance with the user's command.

A personal computer or a mobile telephone device located outside the robot 10 can send information from its internal memory toward the robot 10. The communication interface 17 in the robot 10 receives the sent information. The communication interface 17 feeds the received information to the controller 313. The controller 313 instructs the output device 15 to visually or audibly indicate the received information. In this case, the robot 10 is under remote control.

As previously mentioned, the control-related sensors 14a generate video information and audio information. The controller 313 can transfer the video information and the audio information from the control-related sensors 14a to the communication interface 17. The controller 313 instructs the communication interface 17 to transmit the video information and the audio information to a remote site. In this case, the robot 10 can be used as a monitor camera with a microphone. Communications between the robot 10 and the remote site are of a two-way type. In this case, a person in the remote site can operate the robot 10 on a remote-control basis while monitoring images taken by the robot 10.

As previously mentioned, the health-care-related sensors 14b generate body-condition information representing the blood pressure, the pulse frequency, and the temperature in the body of the user. The controller 313 can transfer the body-condition information from the health-care-related sensors 14b to the communication interface 17 at regular intervals. The controller 313 instructs the communication interface 17 to regularly transmit the body-condition information to a remote site such as a hospital or a heal care center. In this case, the health conditions of the user of the robot 10 can be managed at the remote site. When communications between the robot 10 and the remote site are of the two-way type, a doctor in the remote site can inquire of the robot user about user's physical conditions.

Information representing normal ranges of the blood pressure, the pulse frequency, and the bodily temperature may be previously stored in the memory 13a. In this case, the control program for the controller 313 has a step of comparing the measured blood pressure, the measured pulse frequency, and the measured bodily temperature with the normal ranges, a step of deciding whether or not the user is sick on the basis of the results of the comparison, and a step of notifying a hospital via the communication interface 17 when the user is decided to be sick.

The recording and reproducing device 16 may use one different from the HDD. Preferably, the recording and reproducing device 16 is used to record information received via the communication interface 17 and reproduce the recorded information. The recording and reproducing device 16 may make up for the capacity of the memory 13a. The recording and reproducing device 16 may be used to record information generated by the external condition sensors 14 and reproduce the recorded information.

Generally, the control program for the controller 313 is relatively simple. Therefore, a relatively small capacity of the memory 13a suffices. Also, a relatively small capacity of the recording and reproducing device 16 suffices. As previously mentioned, the external condition sensors 14 use inexpensive general ones.

Third Embodiment

Figure 22:
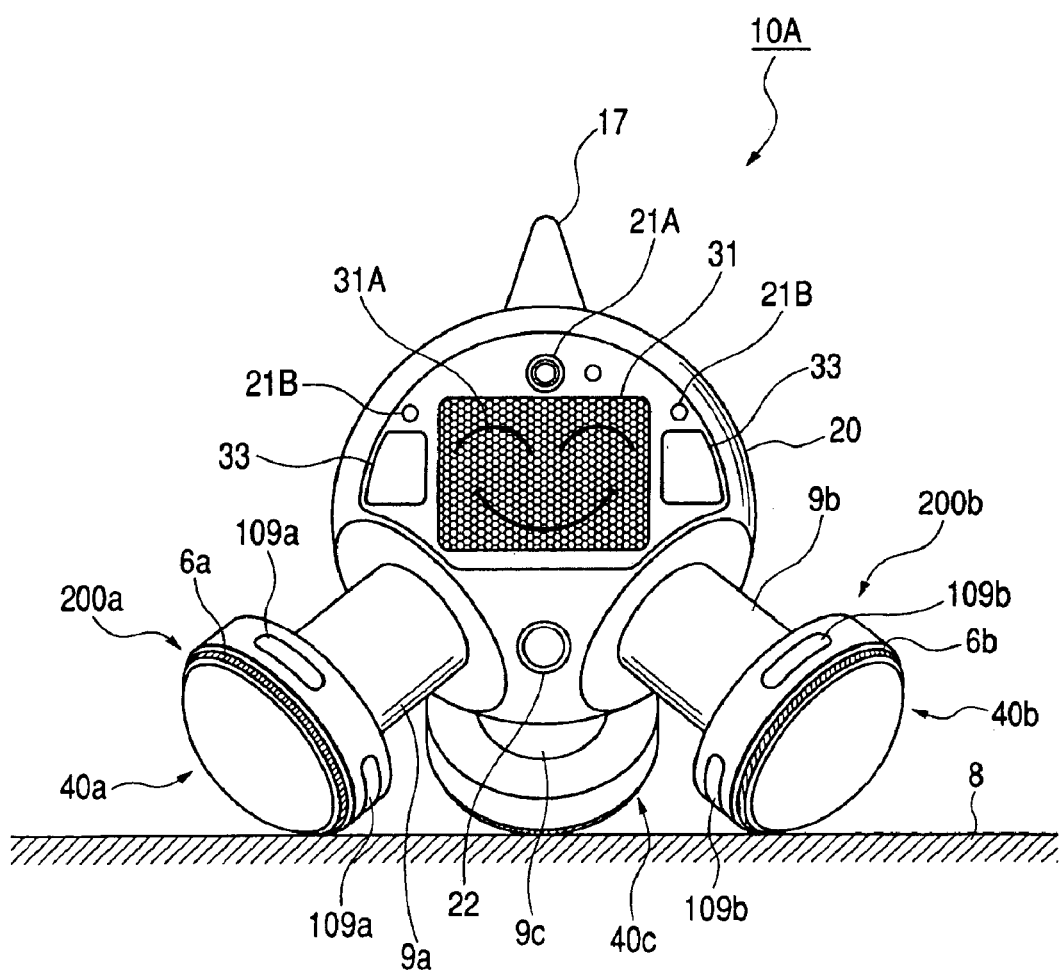
FIG. 22 is a front view of a movable robot according to a third embodiment of this invention.

FIG. 22 shows a movable robot 10A according to a third embodiment of this invention. The robot 10A is similar to the robot 10 (see FIGS. 17–21) except for design changes mentioned hereafter.

As shown in FIG. 22, the robot 10A includes a camera 21A, a pair of left-hand and right-hand microphones 21B, a monitor 31, and a pair of left-hand and right-hand loudspeakers 33 which are mounted on the outer surfaces of a main body unit 20. In addition, a communication interface 17 and a distance sensor 22 are mounted on the outer surfaces of the main body unit 20. The camera 21A, the microphones 21B, and the distance sensor 22 are control-related sensors. The monitor 31 and the loudspeakers 33 compose a portion of an output device.

The monitor 31 can be controlled by a controller 313 (see FIG. 21) to indicate a diagrammatic shape 31A which shows robot's feeling of joy, anger, or sorrow. Furthermore, the activation of light emitting devices 30a, 30b, and 30c in wheels 200a, 200b, and 200c can be controlled by the controller 313. The light generated by the light emitting devices 30a, 30b, and 30c can be seen or monitored through windows 109a, 109b, and 109c from a region outside of the robot 10A.

The state of the light generation by the light emitting devices 30a, 30b, and 30c may be used to notify a user of an action which the robot 10A will take next. For example, one is selected from the light emitting devices 30a, 30b, and 30c by the controller 313, and the selected light emitting device is periodically turned on and off by the controller 313 to notify the user of a direction along which the robot 10A will move next.

Preferably, each of the light emitting devices 30a, 30b, and 30c includes an array of elements for generating light of different colors respectively. In this case, the light emitting devices 30a, 30b, and 30c can be controlled by the controller 313 so that the color of the light generated by the light emitting devices 30a, 30b, and 30c will change in accordance with the lapse of time. Thereby, a color effect can be provided as an interior. The color of the light generated by the light emitting devices 30a, 30b, and 30c can be chosen by the controller 313 to calm the user.

As understood from the previous description, the robot 10A can autonomously operate. In addition, the robot 10A can show its feelings on a personification basis. Thus, the user and the robot 10A can closely communicate with each other. The robot 10A can act as user's partner capable of giving pleasure and joy to the user.

Fourth Embodiment

Figure 23:
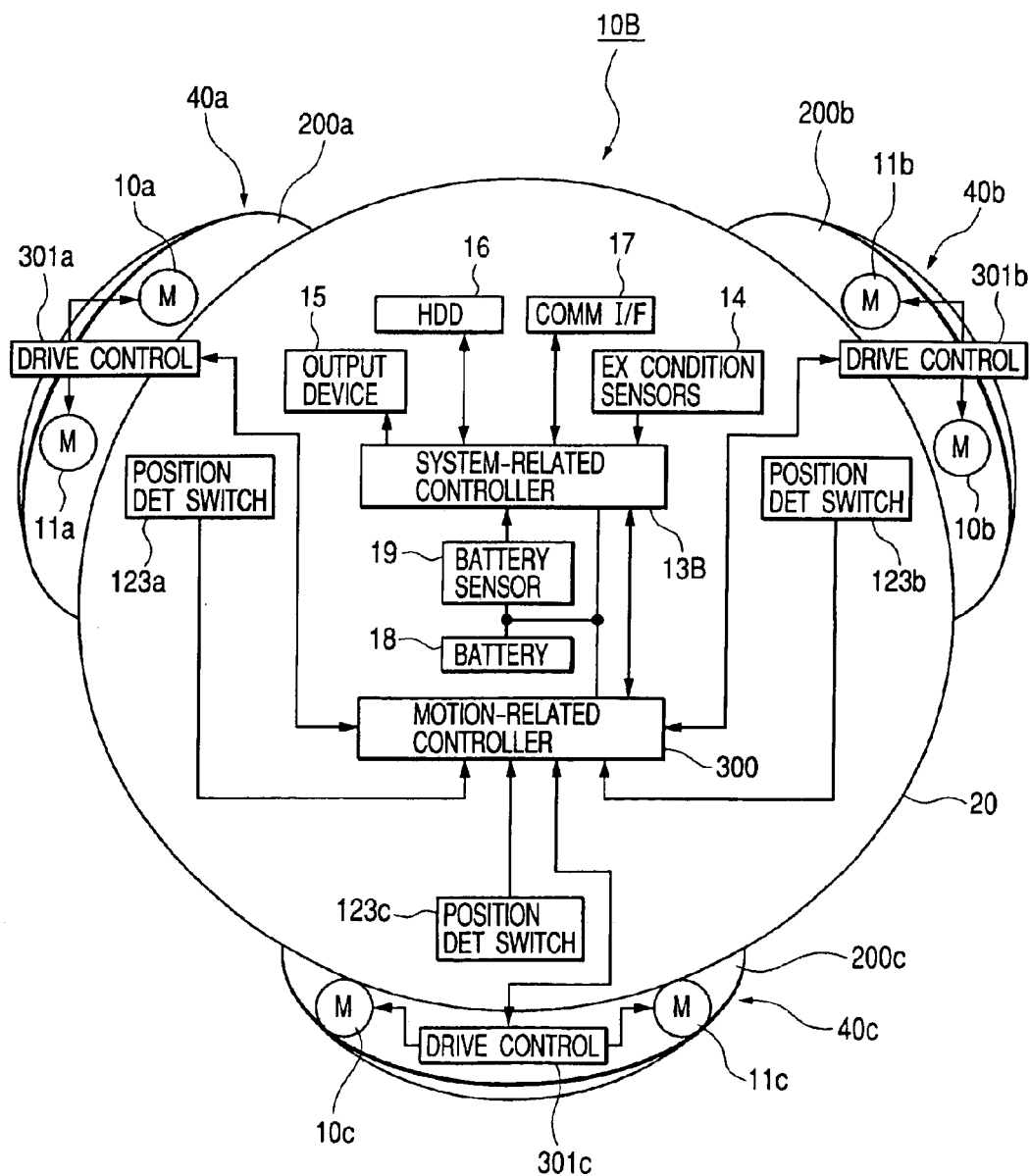
FIG. 23 is a diagram of a movable robot according to a fourth embodiment of this invention.
Figure 24:
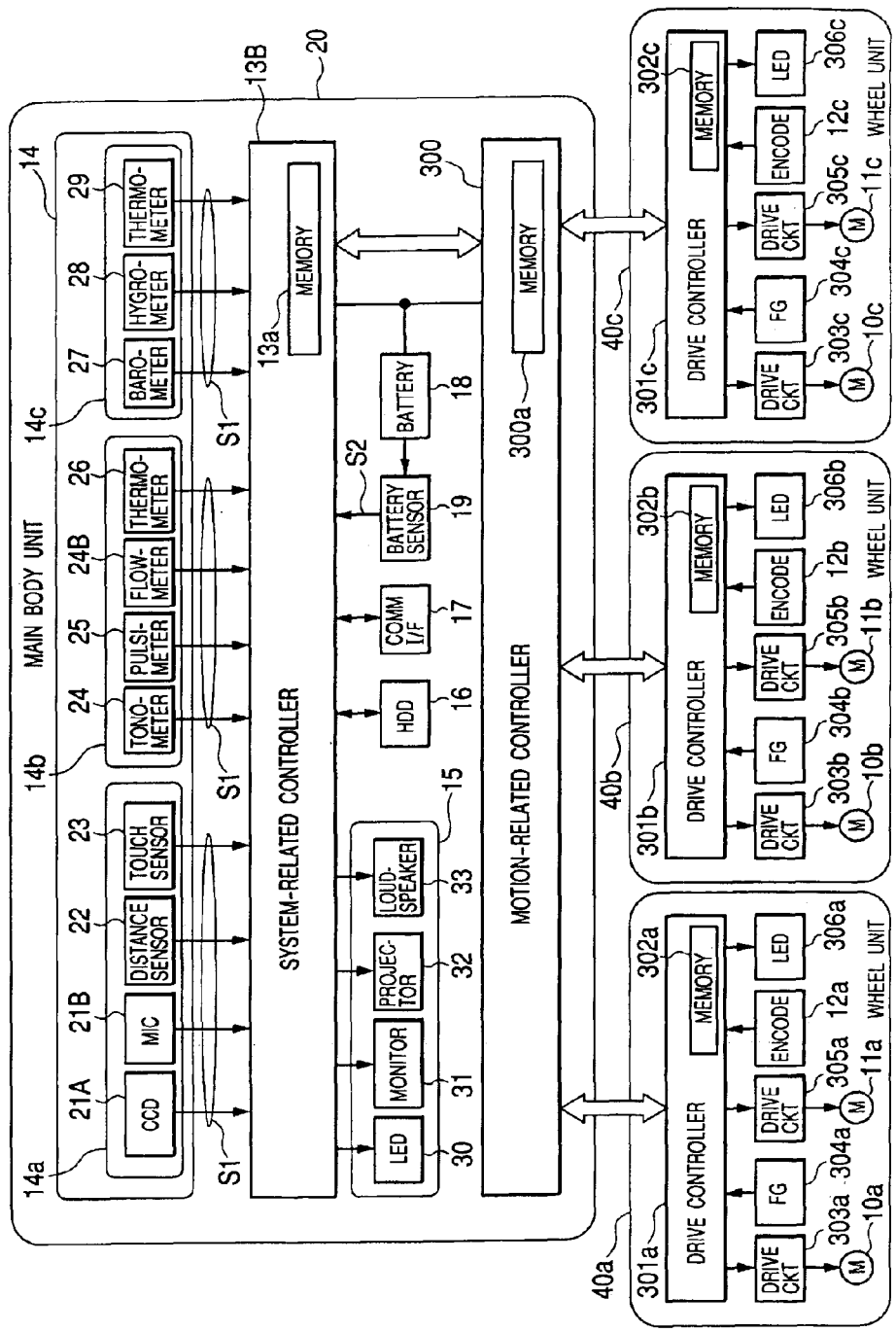
FIG. 24 is a block diagram of a control system in the movable robot of FIG. 23.

FIG. 23 shows a movable robot 10B according to a fourth embodiment of this invention. FIG. 24 shows a control system in the robot 10B. The robot 10B is similar to the robot 10 (see FIGS. 17–21) except for design changes mentioned hereafter. As shown in FIG. 23, the main body unit 20 of the robot 10B contains position detection switches 123a, 123b, and 123c associated with the wheel units 40a, 40b, and 40c (the wheels 200a, 200b, and 200c) respectively.

As shown in FIGS. 23 and 24, the wheel 200a contains a drive controller 301a, a rotation drive motor 10a, a linear-movement drive motor 11a, a drive circuit 303a, a frequency generator (FG) 304a, a drive circuit 305a, an encoder 12a, and a light emitting device (LED) 306a. The wheel 200b contains a drive controller 301b, a rotation drive motor 10b, a linear-movement drive motor 11b, a drive circuit 303b, a frequency generator (FG) 304b, a drive circuit 305b, an encoder 12b, and a light emitting device (LED) 306b. The wheel 200c contains a drive controller 301c, a rotation drive motor 10c, a linear-movement drive motor 11c, a drive circuit 303c, a frequency generator (FG) 304c, a drive circuit 305c, an encoder 12c, and a light emitting device (LED) 306c.

The main body unit 20 contains a system-related controller 13B and a motion-related controller 300. An output device 15 in the main body unit 20 includes a light emitting device (LED) 30 which can be controlled by the system-related controller 13B. The light emitting devices 306a, 306b, and 306c in the wheels 200a, 200b, and 200c can be controlled independently of the light emitting device 30. The position detection switches 123a, 123b, and 123c are electrically connected with the motion-related controller 300.

The system-related controller 13B, the motion-related controller 300, and the drive controllers 301a, 301b, and 301c are electrically connected so that they can communicate with each other. The combination of the system-related controller 13B, the motion-related controller 300, and the drive controllers 301a, 301b, and 301c corresponds to the controller 313 (see FIG. 21).

The system-related controller 13B is electrically connected with the output device 15. In addition, the system-related controller 13B is electrically connected with external condition sensors 14, a recording and reproducing device 16, a communication interface 17, a battery 18, and a battery sensor 19. Health-care-related sensors 14b in the external condition sensors 14 include a tonometer 24, a blood flow meter 24B, a pulsimeter (a heartbeat meter) 25, and a thermometer 26. The system-related controller 13B includes a microcomputer or a similar device having a combination of an input/output circuit, a processor, a ROM, and a RAM. At least one of the ROM and the RAM is provided in a memory 13a within the system-related controller 13B. The system-related controller 13B operates in accordance with a control program stored in the memory 13a. The control program for the system-related controller 13B is designed to implement general control of the robot 10B.

The motion-related controller 300 is electrically connected with the system-related controller 13B and the drive controllers 301a, 301b, and 301c. The drive controller 301a is electrically connected with the encoder 12a, the frequency generator 304a, and the light emitting device 306a. The drive controller 301a is electrically connected with the rotation drive motor 10a via the drive circuit 303a. The drive controller 301a is electrically connected with the linear-movement drive motor 11a via the drive circuit 305a. The drive controller 301b is electrically connected with the encoder 12b, the frequency generator 304b, and the light emitting device 306b. The drive controller 301 b is electrically connected with the rotation drive motor 10b via the drive circuit 303b. The drive controller 301b is electrically connected with the linear-movement drive motor 11b via the drive circuit 305b. The drive controller 301c is electrically connected with the encoder 12c, the frequency generator 304c, and the light emitting device 306c. The drive controller 301c is electrically connected with the rotation drive motor 10c via the drive circuit 303c. The drive controller 301c is electrically connected with the linear-movement drive motor 11c via the drive circuit 305c.

The rotation drive motor 10a and the linear-movement drive motor 11a can be controlled by the drive controller 301a via the drive circuits 303a and 305a. The rotation drive motor 10b and the linear-movement drive motor 11b can be controlled by the drive controller 301b via the drive circuits 303b and 305b. The rotation drive motor 10c and the linear-movement drive motor 11c can be controlled by the drive controller 301c via the drive circuits 303c and 305c.

The motion-related controller 300 includes a microcomputer or a similar device having a combination of an input/output circuit, a processor, a ROM, and a RAM. At least one of the ROM and the RAM is provided in a memory 300a within the motion-related controller 300. The motion-related controller 300 operates in accordance with a control program stored in the memory 300a.

The drive controller 301a includes a microcomputer or a similar device having a combination of an input/output circuit, a processor, a ROM, and a RAM. At least one of the ROM and the RAM is provided in a memory 302a within the drive controller 301a. The drive controller 301a operates in accordance with a control program stored in the memory 302a.

The drive controller 301b includes a microcomputer or a similar device having a combination of an input/output circuit, a processor, a ROM, and a RAM. At least one of the ROM and the RAM is provided in a memory 302b within the drive controller 301b. The drive controller 301b operates in accordance with a control program stored in the memory 302b.

The drive controller 301c includes a microcomputer or a similar device having a combination of an input/output circuit, a processor, a ROM, and a RAM. At least one of the ROM and the RAM is provided in a memory 302c within the drive controller 301c. The drive controller 301c operates in accordance with a control program stored in the memory 302c.

The control programs for the motion-related controller 300 and the drive controllers 301a, 301b, and 301c are designed to implement control of the motion of the robot 10B and also control of the axial lengths of leg portions 9a, 9b, and 9c. Information about control of the rotation drive motors 10a, 10b, and 10c and the linear-movement drive motors 11a, 11b, and 11c can be transmitted from the system-related controller 13B to the drive controllers 301a, 301b, and 301c via the motion-related controller 300.

The system-related controller 13B receives sensor signals S1 from the external condition sensors 14. The system-related controller 13B receives a battery detection signal S2 from the battery sensor 19. The system-related controller 13B decides the conditions of the surroundings of the robot 10B, the amount of charges remaining in the battery 18, commands from the user, and the presence and absence of an action of the user on the robot 10B in response to the sensor signals S1 and the battery detection signal S2. According to the control program stored in the memory 13a, the system-related controller 13B determines a desired action or a desired movement of the robot 10B in response to the results of the above-mentioned decision. The system-related controller 13B sends information representative of the result of the determination about the desired action (the desired movement) of the robot 10B to the motion-related controller 300 as a command signal.

The motion-related controller 300 receives the command signal from the system-related controller 13B which represents the desired action of the robot 10B. According to the control program stored in the memory 300a, the motion-related controller 300 analyzes the contents of the received command signal, and decides desired control of the wheel units 40a, 40b, and 40c in response to the analyzed contents of the command signal. The motion-related controller 300 sends information representative of the result of the decision about the desired control of the wheel units 40a, 40b, and 40c to the drive controllers 301a, 301b, and 301c as command signals.

The drive controllers 301a, 301b, and 301c receive the command signals from the motion-related controller 300. According to the control programs stored in the memories 302a, 302b, and 302c, the drive controllers 301a, 301b, and 301c analyze the received command signals, and generate control signals in response to the results of the analyzation. The drive controllers 301a, 301b, and 301c output the generated control signals to the drive circuits 303a, 303b, 303c, 305a, 305b, and 305c. The drive circuits 303a, 303b, 303c, 305a, 305b, and 305c control the rotation drive motors 10a, 10b, and 10c, and the linear-movement drive motors 11a, 11b, and 11c in response to the control signals outputted from the drive controllers 301a, 301b, and 301c. Thereby, the robot 10B can implement the previously-mentioned robot movements 1), 2), 3), 4), and 5), and a more complicated movement corresponding to a combination of selected ones among the previously-mentioned robot movements 1), 2), 3), 4), and 5). Furthermore, each of the leg portions 9a, 9b, and 9c can implement an axial expansion or contraction.

The drive controller 301a, 301b, and 301c also generate control signals for the light emitting devices 306a, 306b, and 306c in response to the results of the analyzation. The drive controller 301a, 301b, and 301c output the generated control signals to the light emitting devices 306a, 306b, and 306c. Therefore, the light emitting devices 306a, 306b, and 306c are activated or deactivated in response to the control signals. Accordingly, the light emitting devices 306a, 306b, and 306c can be used to show robot's feelings and provide communications between the robot 10B and the user.

The frequency generator 304a detects the rotational speed of the rotation drive motor 10a. The frequency generator 304a feeds the drive controller 301a with a signal representing the detected rotational speed of the rotation drive motor 10a. The frequency generator 304b detects the rotational speed of the rotation drive motor 10b. The frequency generator 304b feeds the drive controller 301b with a signal representing the detected rotational speed of the rotation drive motor 10b. The frequency generator 304c detects the rotational speed of the rotation drive motor 10c. The frequency generator 304c feeds the drive controller 301c with a signal representing the detected rotational speed of the rotation drive motor 10c.

The encoder 12a feeds the drive controller 301a with a signal representing a detected axial length of the leg portion 9a. The encoder 12b feeds the drive controller 301b with a signal representing a detected axial length of the leg portion 9b. The encoder 12c feeds the drive controller 301c with a signal representing a detected axial length of the leg portion 9c.

According to the control program, the drive controller 301a decides whether or not the rotation drive motor 10a falls into one of predetermined wrong states by referring to the signal fed from the frequency generator 304a. The predetermined wrong states include a state where the rotational speed of the rotation drive motor 10a goes out of a normal range, and a state where the rotation drive motor 10a fails to rotate. When the rotation drive motor 10a falls into one of the predetermined wrong states, the drive controller 301a sends an abnormality indication signal representative of the present wrong state to the motion-related controller 300.

Similarly, the drive controller 301b decides whether or not the rotation drive motor 10b falls into one of predetermined wrong states by referring to the signal fed from the frequency generator 304b. When the rotation drive motor 10b falls into one of the predetermined wrong states, the drive controller 301b sends an abnormality indication signal representative of the present wrong state to the motion-related controller 300. In addition, the drive controller 301c decides whether or not the rotation drive motor 10c falls into one of predetermined wrong states by referring to the signal fed from the frequency generator 304c. When the rotation drive motor 10c falls into one of the predetermined wrong states, the drive controller 301c sends an abnormality indication signal representative of the present wrong state to the motion-related controller 300.

According to the control program, the drive controller 301a decides whether or not the linear-movement drive motor 11a falls into one of predetermined wrong states by referring to the signal fed from the encoder 12a. The predetermined wrong states include a state where the linear-movement drive motor 11a fails to move. When the linear-movement drive motor 11a falls into one of the predetermined wrong states, the drive controller 301a sends an abnormality indication signal representative of the present wrong state to the motion-related controller 300.

Similarly, the drive controller 301b decides whether or not the linear-movement drive motor 11b falls into one of predetermined wrong states by referring to the signal fed from the encoder 12b. When the linear-movement drive motor 11b falls into one of the predetermined wrong states, the drive controller 301b sends an abnormality indication signal representative of the present wrong state to the motion-related controller 300. In addition, the drive controller 301c decides whether or not the linear-movement drive motor 11c falls into one of predetermined wrong states by referring to the signal fed from the encoder 12c. When the linear-movement drive motor 11c falls into one of the predetermined wrong states, the drive controller 301c sends an abnormality indication signal representative of the present wrong state to the motion-related controller 300.

The motion-related controller 300 receives the abnormality indication signals from the drive controllers 301a, 301b, and 301c. According to the control program, the motion-related controller 300 analyzes the contents of the abnormality indication signals, and generates anti-abnormality signals in response to the analyzed contents of the abnormality indication signals. The motion-related controller 300 outputs the anti-abnormality signals to the drive controllers 301a, 301b, and 301c.

The drive controllers 301a, 301b, and 301c access wrong ones of the rotation drive motors 10a, 10b, and 10c and the linear-movement drive motors 11a, 11b, and 11c and take actions to remove the abnormalities in response to the anti-abnormality signals. When the abnormalities are removed, the abnormality indication signals sent from the drive controllers 301a, 301b, and 301c to the motion-related controller 300 disappear. Otherwise, at least one of the abnormality indication signals continues to be sent to the motion-related controller 300.

In the event that at least one of the abnormality indication signals continues to occur after the anti-abnormality signals are outputted to the drive controllers 301a, 301b, and 301c, the motion-related controller 300 sends an abnormality occurrence signal to the system-related controller 13B according to the control program. Upon the reception of the abnormality occurrence signal, the system-related controller 13B infers a cause of the present abnormality from the detected conditions of the surroundings of the robot 10B according to the control program. Then, the system-related controller 13B decides an action which the robot 10B will take next in response to the inferred cause of the present abnormality. The system-related controller 13B generates a command signal in accordance with the result of the decision. The system-related controller 13B sends the generated command signal to the motion-related controller 300. In response to the command signal sent from the system-related controller 13B, the motion-related controller 300 and the drive controllers 301a, 301b, and 301c operate to remove the present abnormality.

In the event that the present abnormality is not removed in response to the command signal outputted from the system-related controller 13B, the abnormality occurrence signal continues to be sent to the system-related controller 13B. In this case, the system-related controller 13B sends a stopping signal to the motion-related controller 300 according to the control program. In response to the stopping signal, the motion-related controller 300 and the drive controllers 301a, 301b, and 301c operate to deactivate the rotation drive motors 10a, 10b, and 10c and the linear-movement drive motors 11a, 11b, and 11c and halt the movement of the robot 10B. At the same time, the system-related controller 13B instructs the output device 15 and the communication interface 17 to notify the user that the abnormality occurs and the robot's movement is halted.

The system-related controller 13B, the motion-related controller 300, and the drive controllers 301a, 301b, and 301c enable the robot 10B to autonomously operate in response to the detected conditions of the surroundings of the robot 10B, commands from the user, the presence and absence of an action of the user on the robot 10, and the degree of the action. As understood from the previous description, the robot 10B implements a self diagnosis. In the event that an abnormality occurs, the robot 10B can take a countermeasure against the abnormality according to the self diagnosis.

The system-related controller 13B, the motion-related controller 300, and the drive controllers 301a, 301b, and 301c play different roles respectively regarding the control of the robot 10B.

The system-related controller 13B implements the general control of the robot 10B. The system-related controller 13B always monitors the conditions of the surroundings of the robot 10B and user's inquiries and requests, and decides how the robot 10B should act in response to the contents of the monitored factors. Then, the system-related controller 13B notifies the motion-related controller 300 of the result of the decision about the desired action of the robot 10B.

The motion-related controller 300 determines how the wheel units 40a, 40b, and 40c should be driven on the basis of the decision result notified by the system-related controller 13B. The motion-related controller 300 generates command signals in accordance with the results of the determination about the drive of the wheel units 40a, 40b, and 40c. Then, the motion-related controller 300 sends the generated command signals to the drive controllers 301a, 301b, and 301c.

The drive controllers 301a, 301b, and 301c control the rotation drive motors 10a, 10b, and 10c, and the linear-movement drive motors 11a, 11b, and 11c via the drive circuits 303a, 303b, 303c, 305a, 305b, and 305c in response to the command signals sent from the motion-related controller 300. Furthermore, the drive controllers 301a, 301b, and 301c control the light emitting devices 306a, 306b, and 306c in response to the command signals.

In this way, the various processes implemented by the robot 10B are allotted among the system-related controller 13B, the motion-related controller 300, and the drive controllers 301a, 301b, and 301c. Therefore, the efficiency of the implementation of the processes is relatively high. Furthermore, the robot 10B can quickly respond to a change in the conditions of the surroundings thereof.

In additions, the robot 10B can simultaneously and stably implement a plurality of different actions on a parallel basis. For example, the robot 10B makes a complicated movement while monitoring the information obtained by the external condition sensors 14 and outputting signals to the output device 15.

Figure 25:
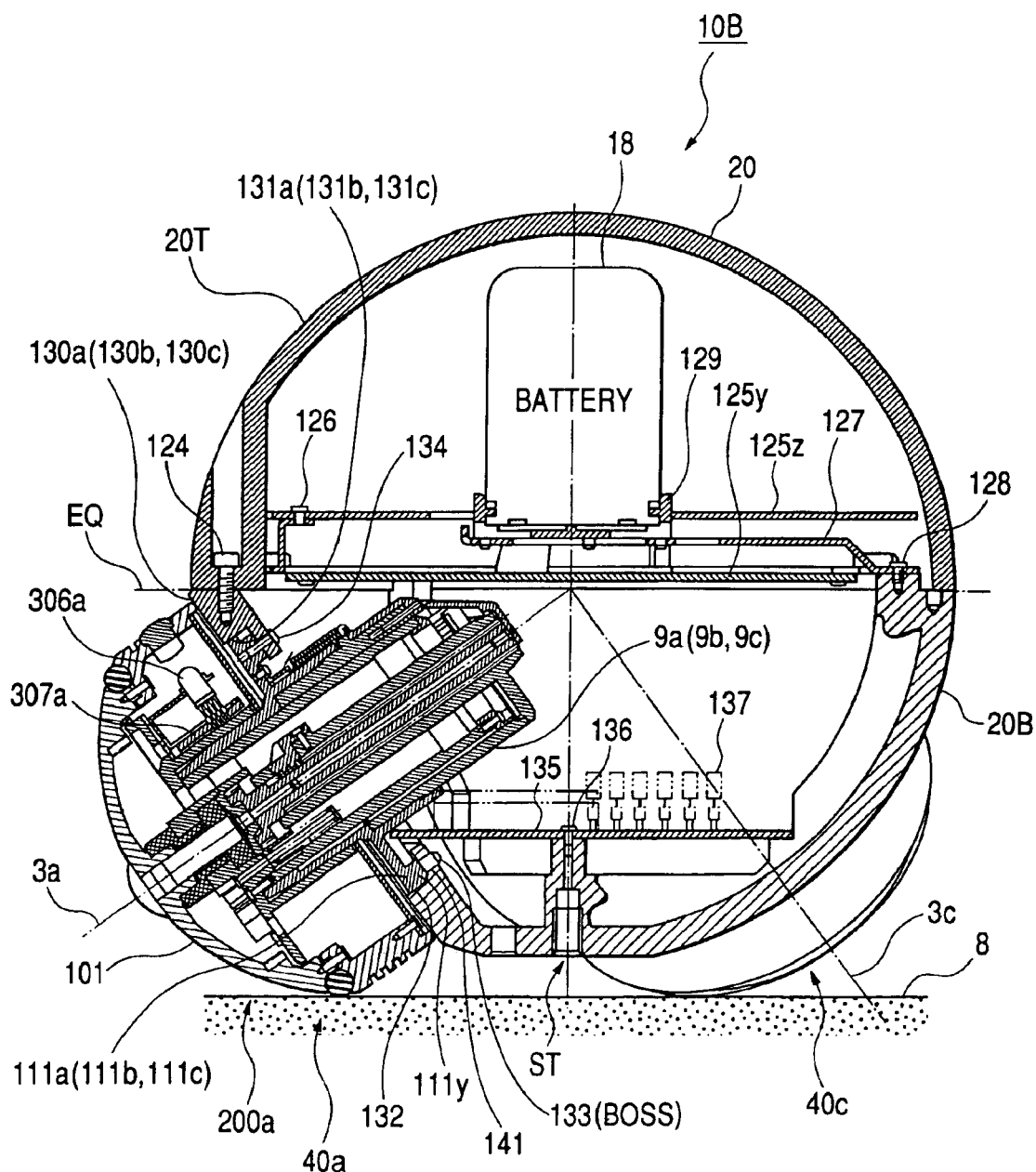
FIG. 25 is a sectional view of the movable robot in the fourth embodiment of this invention.
Figure 26:
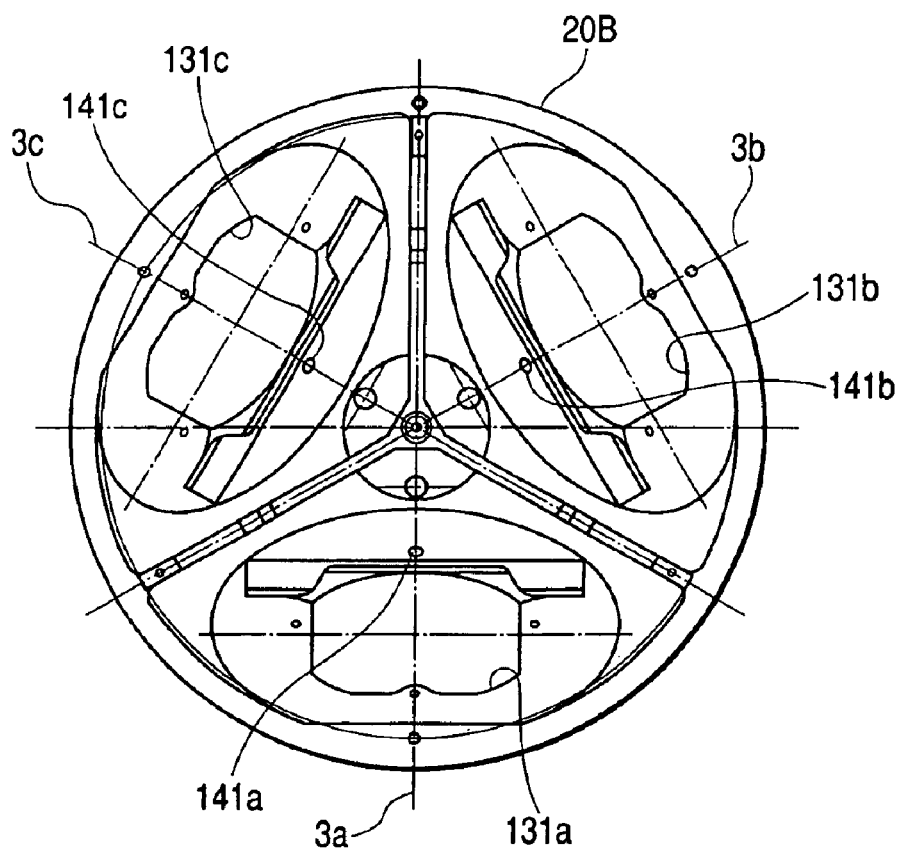
FIG. 26 is a top view of a bottom cover in FIG. 25.
Figure 27:
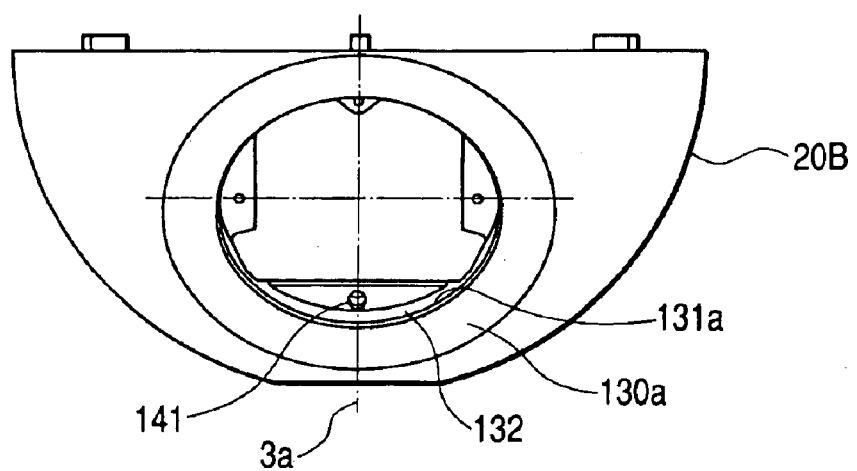
FIG. 27 is a front view of the bottom cover in FIG. 25.
Figure 28:
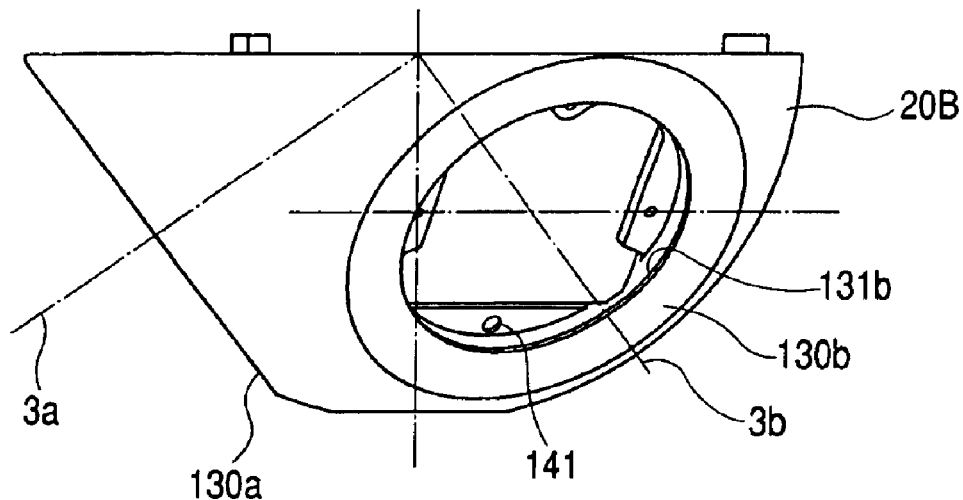
FIG. 28 is a right-hand side view of the bottom cover in FIG. 25.
Figure 29:
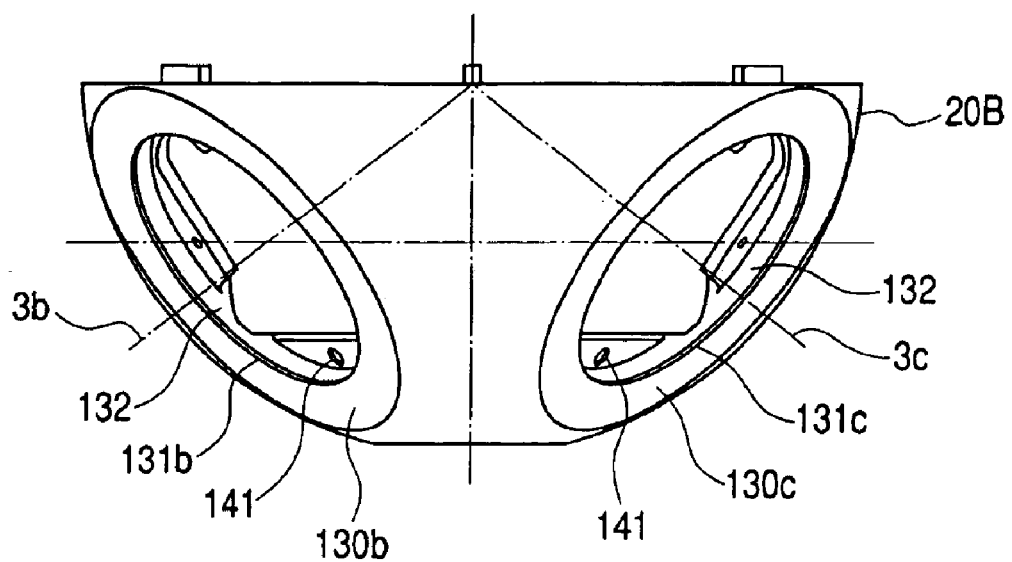
FIG. 29 is a rear view of the bottom cover in FIG. 25.

With reference to FIG. 25, the main body unit 20 includes an approximately spherical or global shell composed of halves referred to as a top cover 20T and a bottom cover 20B respectively. The boundary between the top cover 20T and the bottom cover 20B corresponds to the equator EQ of the globe (the global shell). The lowermost part of the bottom cover 20B corresponds to the South Pole ST of the globe. The top cover 20T and the bottom cover 20B are fixed together by screws 124.

The battery 18 and system control boards 125y and 125z are securely disposed in the top cover T. The battery sensor 19, the system-related controller 13B, the external condition sensors 14, the output device 15, the recording and reproducing device 16, and the communication interface 17 are provided on or connected with the system control boards 125y and 125z. A frame 127 extending in the top cover 20T is fixed to an upper end surface of the bottom cover 20B by screws 128. The system control boards 125y and 125z are fixed to the frame 127 by screws 126. Thus, the system control boards 125y and 125z are attached to the bottom cover 20B.

The system control boards 125y and 125z may be attached to the walls of the top cover 20T. In this case, the robot 10 can be composed of units for different functions respectively.

The battery 18 is detachably retained by a battery holder 129 secured to the frame 127. Preferably, the battery 18 is centered at the main body unit 20 as viewed from the top. In this case, the centroid of the robot 10 substantially coincides with its center as viewed from the top, and the posture and operation of the robot 10 can be stabler.

The battery 18 may be located at a central part of the interior of the main body unit 20. The centroid of the robot 10 may exist approximately at the center of the main body unit.

With reference to FIGS. 26, 27, 28, and 29, the bottom cover 20B is approximately hemispherical. The bottom cover 20B has flat portions 130a, 130b, and 130c extending along planes perpendicular to the rotation axes 3a, 3b, and 3c respectively. The flat portions 130a, 130b, and 130c are formed with circular openings 131a, 131b, and 131c coaxial with respect to the rotation axes 3a, 3b, and 3c, respectively.

The wheel units 40a, 40b, and 40c have mounts 111a, 111b, and 111c (see FIG. 25) which can fit in the openings 131a, 131b, and 131c, respectively. The walls of the bottom cover 20B have annular flanges inwardly extending into the openings 131a, 131b, and 131c respectively. The flanges of the bottom cover 20B are formed with engagement holes 141. The mounts 111a, 111b, and 111c of the wheel units 40a, 40b, and 40c have bosses 133 fitting into the engagement holes 141 respectively. Thereby, the wheel units 40a, 40b, and 40c are properly located relative to the main body unit 20 in the circumferential directions. The mounts 111a, 111b, and 111c of the wheel units 40a, 40b, and 40c are fixed to the flanges of the bottom cover 20B by screws 134. Therefore, the wheel units 40a, 40b, and 40c are supported by the bottom cover 20B.

As shown in FIG. 25, an in-body drive control device 135 extending in a lower area of the interior of the bottom cover 20B is fixed to the walls of the bottom cover 20B by a screw 136. The in-body drive control device 135 includes the motion-related controller 300 and its peripheral circuits 137. The in-body drive control device 135 is electrically connected with the system control boards 125y and 125z, and in-wheel drive control devices 307a, 307b, and 307c by cables or flexible boards (not shown). Control signals, command signals, and other signals can be transmitted among the in-body drive control device 135, the system control boards 125y and 125z, and the in-wheel drive control devices 307a, 307b, and 307c on a two-way communication basis.

The in-wheel drive control devices 307a, 307b, and 307c are provided in the wheels 200a, 200b, and 200c, respectively. The in-wheel drive control device 307a includes the drive controller 301a, the drive circuits 303a and 305a, the light emitting device 306a, and their peripheral circuits. The in-wheel drive control device 307b includes the drive controller 301b, the drive circuits 303b and 305b, the light emitting device 306b, and their peripheral circuits. The in-wheel drive control device 307c includes the drive controller 301c, the drive circuits 303c and 305c, the light emitting device 306c, and their peripheral circuits.

The in-wheel drive control device 307a is electrically connected with the rotation drive motor 10a and the linear-movement drive motor 11a by cables or flexible boards (not shown). The in-wheel drive control device 307b is electrically connected with the rotation drive motor 10b and the linear-movement drive motor 11b by cables or flexible boards (not shown). The in-wheel drive control device 307c is electrically connected with the rotation drive motor 10c and the linear-movement drive motor 11c by cables or flexible boards (not shown). Drive control signals can be applied from the in-wheel drive control devices 307a, 307b, and 307c to the rotation drive motors 10a, 10b, and 10c, and the linear-movement drive motors 11a, 11b, and 11c. The rotation drive motors 10a, 10b, and 10c, and the linear-movement drive motors 11a, 11b, and 11c implement control of the rotation of the wheels 200a, 200b, and 200c, and control of the axial lengths of the leg portions 9a, 9b, and 9c in accordance with the applied drive control signals.

The mount 111a of the wheel unit 40a is provided with first and second detection switches which correspond to the detection switches 123a1 and 123a2 in FIGS. 20 and 21. The in-wheel drive control device 307a is electrically connected with the first and second detection switches by cables or flexible boards (not shown). The in-wheel drive control device 307a implements control of the axial length of the leg portion 9a in response to the output signals from the first and second detection switches.

The mount 111b of the wheel unit 40b is provided with first and second detection switches which correspond to the detection switches 123b1 and 123b2 in FIGS. 20 and 21. The in-wheel drive control device 307b is electrically connected with the first and second detection switches by cables or flexible boards (not shown). The in-wheel drive control device 307b implements control of the axial length of the leg portion 9b in response to the output signals from the first and second detection switches.

The mount 111c of the wheel unit 40c is provided with first and second detection switches which correspond to the detection switches 123c1 and 123c2 in FIGS. 20 and 21. The in-wheel drive control device 307c is electrically connected with the first and second detection switches by cables or flexible boards (not shown). The in-wheel drive control device 307c implements control of the axial length of the leg portion 9c in response to the output signals from the first and second detection switches.

Figure 30:
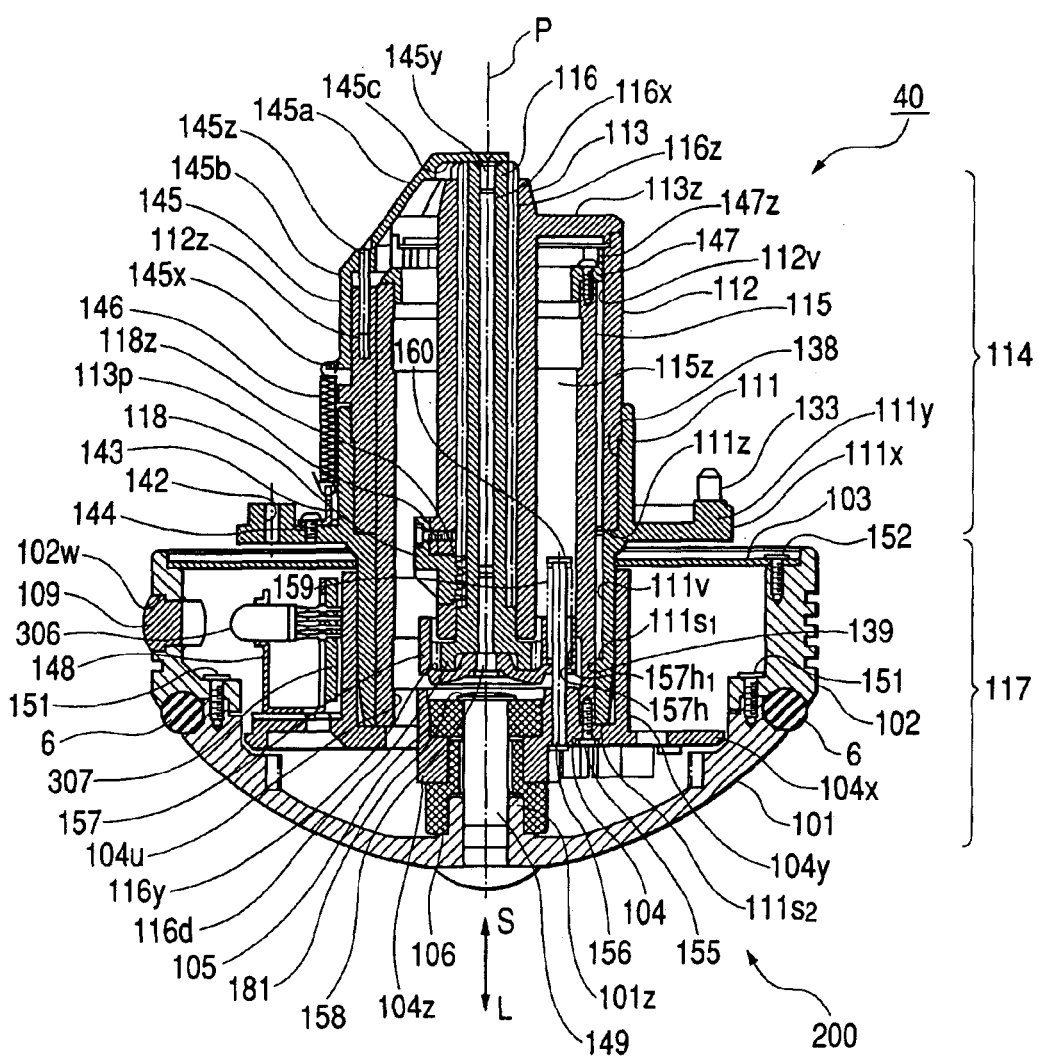
FIG. 30 is a sectional view of a wheel unit in the fourth embodiment of this invention which is in a first state.

FIG. 30 shows a wheel unit 40 which is used as each of the wheel units 40a, 40b, and 40c. The wheel unit 40 is an assembly unit formed by combining a plurality of parts. The wheel unit 40 includes a mount 111 as a base. The mount 111 corresponds to the mount 111a, 111b, or 111c. The wheel unit 40 also includes a wheel 200 corresponding to the wheel 200a, 200b, or 200c.

The mount 111 is approximately a cylinder having an axial bore and two open ends. An intermediate part of the mount 111 has an annular flange 111y extending radially outward. The central axis of the mount 111 coincides with the axis P about which the wheel 200 rotates. The axis P corresponds to the rotation axis 3a, 3b, or 3c.

The inner surfaces of the mount 111 form a first fitting portion 138 and a second fitting portion 139 which are successively arranged along the axial direction. In FIG. 30, the first fitting portion 138 extends above the second fitting portion 139. The inner surfaces of the mount 111 have an annular step 111z defined between the first fitting portion 138 and the second fitting portion 139. The diameter of the second fitting portion 139 is smaller than that of the first fitting portion 138.

An outer sleeve 112 having an approximately cylindrical shape coaxially fits into the first fitting portion 138. An inner sleeve 115 having an approximately cylindrical shape coaxially fits into the second fitting portion 139. Both the outer sleeve 112 and the inner sleeve 115 can slide relative to the mount 111 along the axis P.

A worm guide 113 is coaxially disposed in the inner sleeve 115. The worm guide 113 has an approximately cylindrical shape. The worm guide 113 is coaxial with respect to the axis P. An upper end of the worm guide 113 has a flange 113z extending radially outward. The flange 113z is fixed to the upper end of the outer sleeve 112 so that the worm guide 113 and the outer sleeve 112 are bonded together. The flange 113z closes the opening in the upper end of the outer sleeve 112.

Figure 31:
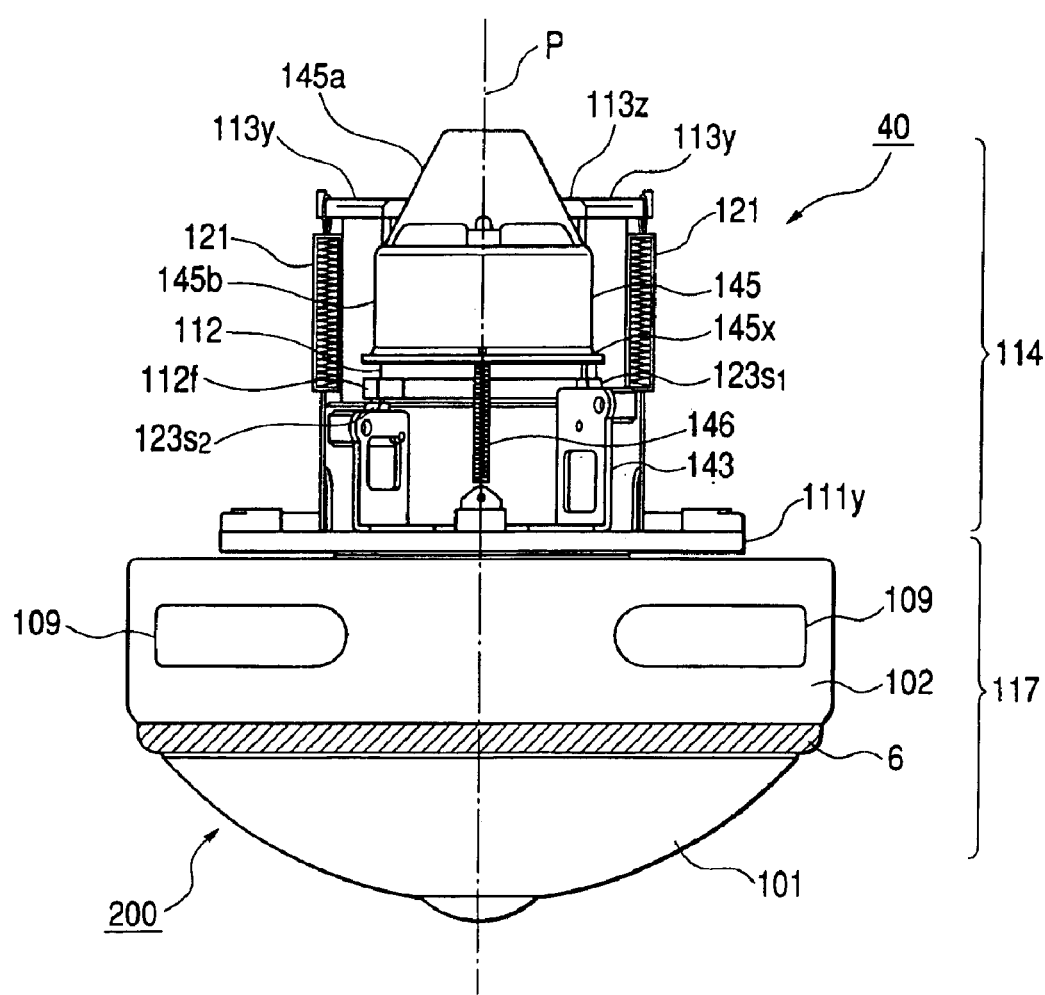
FIG. 31 is a side view of the wheel unit in FIG. 30.
Figure 32:
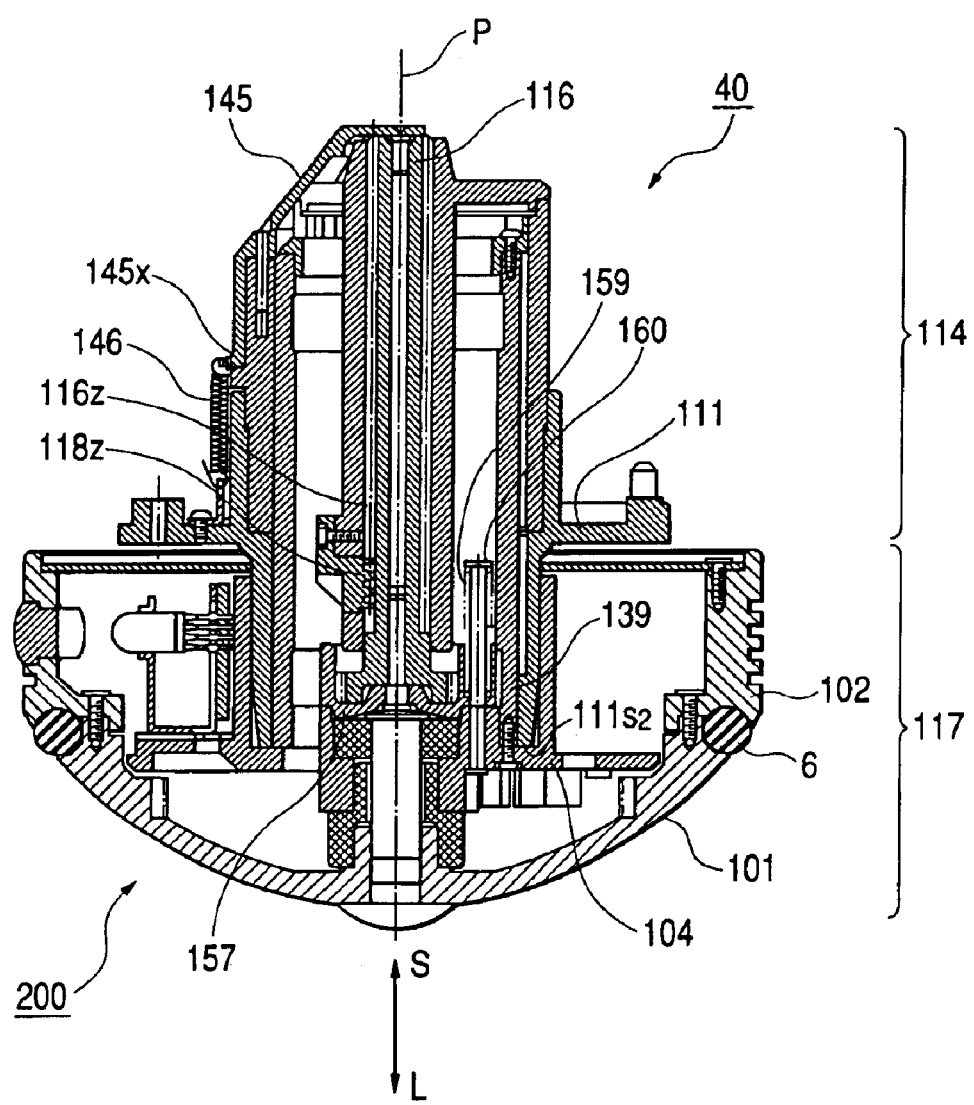
FIG. 32 is a sectional view of the wheel unit in the fourth embodiment of this invention which is in a second state.
Figure 33:
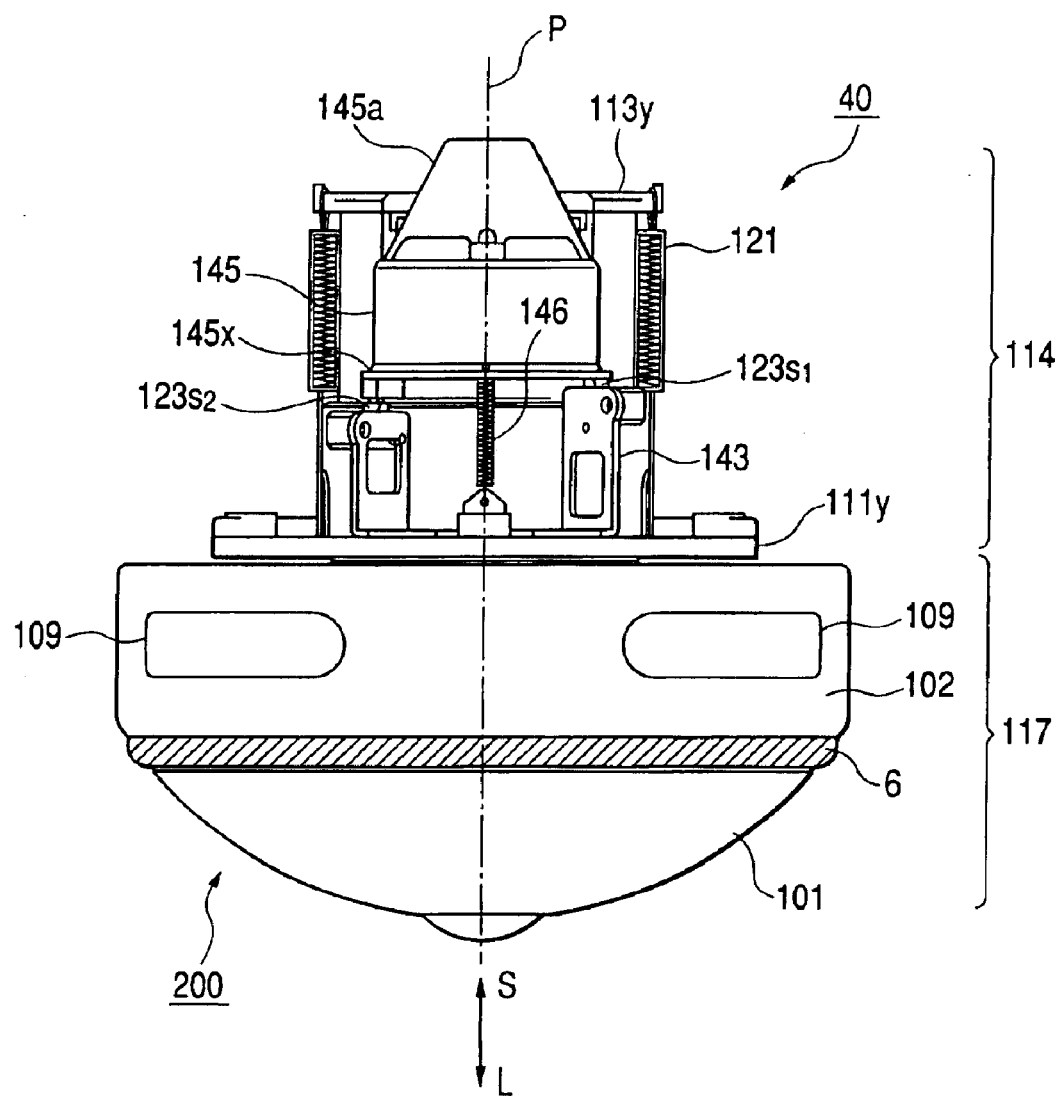
FIG. 33 is a side view of the wheel unit in FIG. 32.

As shown in FIG. 31, the flange 113z of the worm guide 113 has a pair of arm-like hooks 113y extending radially outward to a region outside the outer sleeve 112. The hooks 113y are diametrically opposed to each other with respect to the axis P. The mount 111 has hooks (not shown) corresponding in circumferential position to the hooks 113y. Tension springs 121 are provided between the hooks 113y of the worm guide 113 and the hooks of the mount 111 so that the outer sleeve 112 is urged toward the mount 111 into engagement with the step 111z on the mount 111 (see FIG. 30).

A worm 116 is coaxially disposed in the worm guide 113. The worm 116 is approximately an elongated cylinder having an axial hole 116x extending through the walls thereof. The axial hole 116x is also referred to as the guide hole 116x. The outer circumferential surfaces of the worm 116 have worm gear teeth 116z. A lower end of the worm 116 has a flange 116d extending radially outward. The outer circumferential surfaces of the flange 116d have spur gear teeth 116y. The effective diameter of the spur gear teeth 116y is greater than that of the worm gear teeth 116z. The worm gear teeth 116z can smoothly slide on the inner surfaces of the worm guide 113.

A side of a lower part of the worm guide 113 has an opening 113p. A helical rack 118 fits into the opening 113p. The helical rack 118 is secured to the worm guide 113. The helical rack 118 has helical rack gear teeth 118z in mesh with the worm gear teeth 116z on the worm 116. The worm 116 and the helical rack 118 move axially relative to each other as the worm 116 rotates circumferentially relative to the helical rack 118. Thus, the worm 116 and the helical rack 118 compose a motion converting device.

As shown in FIG. 25, the flange 111y of the mount 111 (111a, 111b, or 111c) fits in the opening 131a, 131b, or 131c of the bottom cover 20B. The walls of the bottom cover 20B have inner circumferential surfaces 132 defining the openings 131a, 131b, and 131c. The flange 111y of the mount 111 has an outer circumferential surface 111x in contact with the corresponding inner circumferential surface 132 of the bottom cover 20B. Thereby, the axis P of the wheel unit 40 is properly located relative to the bottom cover 20B. A boss 133 provided on the mount 111 fits into the corresponding engagement hole 141 in the walls of the bottom cover 20B. Thereby, the wheel unit 40 is properly located relative to the bottom cover 20B in the direction of rotation thereof.

As shown in FIG. 30, the flange 111y of the mount 111 has a threaded hole 142. As shown in FIG. 25, the screw 134 extends into the threaded hole 142. The screw 134 engages both the bottom cover 20B and the flange 111y of the mount 111, thereby fixing the mount 111 of the wheel unit 40 to the bottom cover 20B. Accordingly, the wheel unit 40 is accurately located at a prescribed position relative to the bottom cover 20B.

With reference to FIGS. 30 and 31, a switch bracket 143 is fixed to the flange 111y of the mount 111 by screws 144.

The switch bracket 143 has an approximately U shape having two sides different in vertical length. A body of a first detection switch 123s1 is attached to the longer side of the switch bracket 143. A body of a second detection switch 123s2 is attached to the shorter side of the switch bracket 143. The first and second detection switches 123s1 and 123s2 correspond to the position detection switch 123a, 123b, or 123c in FIG. 23 which is electrically connected with the motion-related controller 300. The first and second detection switches 123s1 and 123s2 correspond to the first and second detection switches 123a1 and 123a2, 123b1 and 123b2, or 123c1 and 123c2 in FIGS. 20 and 21. The first and second detection switches 123s1 and 123s2 are electrically connected with the in-body drive control device 135.

The first detection switch 123s1 senses when the corresponding leg portion 9a, 9b, or 9c falls into an axially shortest state (or a first state). The second detection switch 123s2 senses when the corresponding leg portion 9a, 9b, or 9c falls into an axially longest state (or a third state).

An intermediate part of the outer sleeve 112 has a flange 112 extending radially outward. The second detection switch 123s2 has a control arm which can meet the flange 112f on the outer sleeve 112. The second detection switch 123s2 is actuated when the flange 112f on the outer sleeve 112 meets the control arm of the second detection switch 123s2. The second detection switch 123s2 senses the position of the outer sleeve 112 in the direction along the axis P.

With reference to FIGS. 30, 31, 32, 33, and 35, a slide bracket 145 is movably mounted on the outer sleeve 112. The slide bracket 145 has an open end (a lower end) formed with a flange 145x. The first detection switch 123s1 has a control arm which can meet the flange 145x on the slide bracket 145. The first detection switch 123s1 is actuated when the flange 145x on the slide bracket 145 meets the control arm of the first detection switch 123s1. The first detection switch 123s1 senses the position of the slide bracket 145 in the direction along the axis P.

Figure 38:
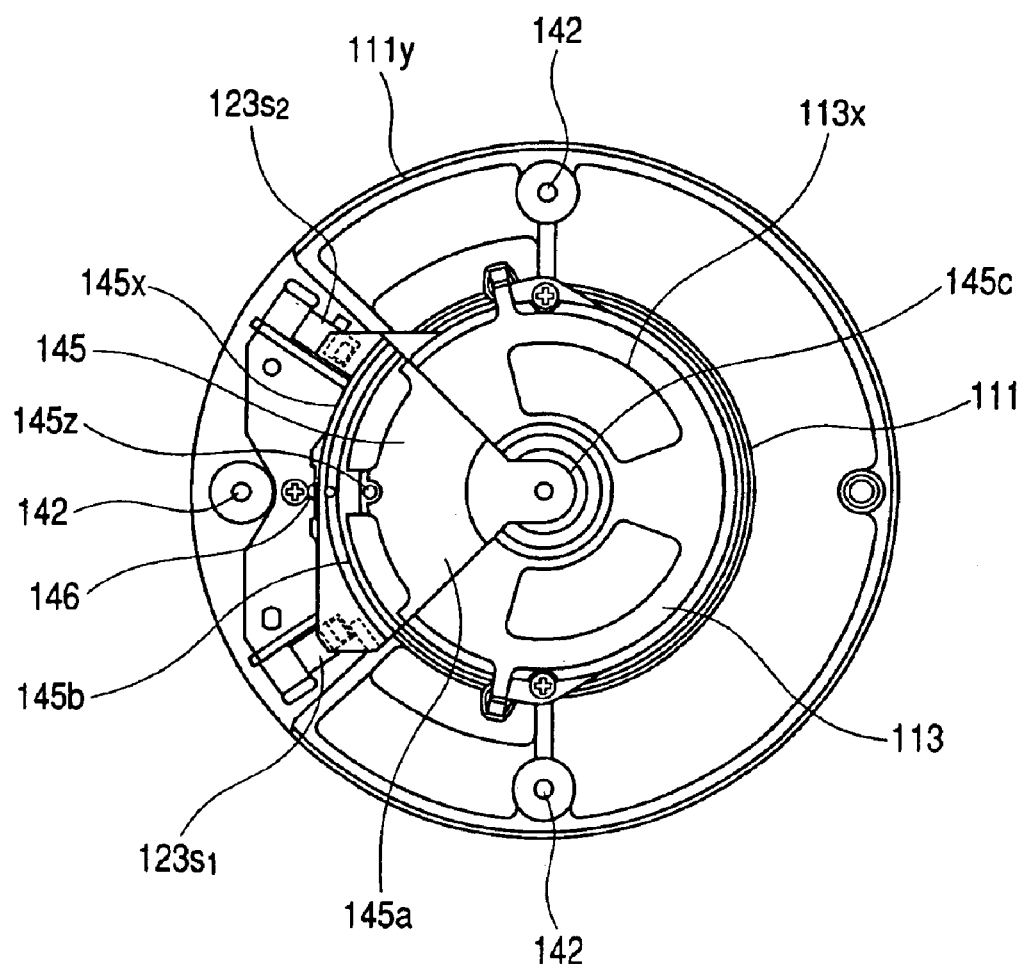
FIG. 38 is a top view of the wheel unit in the fourth embodiment of this invention.

As shown in FIGS. 30, 31, and 38, the slide bracket 145 has a shape corresponding to a quarter of an inverted cup having an inclined wall 145a, a side wall 145b, and a bottom wall 145c. The side wall 145b axially extends from one edge of the inclined wall 145a. The bottom wall 145c radially extends from the other edge of the inclined wall 145a. The slide bracket 145 engages the upper end of the outer sleeve 112.

A guide shaft 145z extending parallel to the direction of the axis P is secured to the slide bracket 145. The guide shaft 145z projects from an inner surface of the slide bracket 145 at a position where the inclined wall 145a and the side wall 145b are connected. The walls of the upper end of the outer sleeve 112 have an axially-extending guide hole 112z into which the guide shaft 145z slidably fits. Thus, the guide shaft 145z and the outer sleeve 112 can move axially relative to each other.

A guide pin 145y coaxial with respect to the axis P is secured to the bottom wall 145c (the upper wall in FIG. 30). The guide pin 145y can fit into the guide hole 116x of the worm 116. The slide bracket 145 covers the upper end of the worm 116.

In FIGS. 30 and 31, the flange 145x integrally extends from the lower end of the slide bracket 145. A tension spring 146 is provided between the switch bracket 143 and the flange 145x on the slide bracket 145 so that the brackets 143 and 145 are urged toward each other.

During the expansion and contraction of the leg portion (9a, 9b, or 9c), a combination of the mount 111, the outer sleeve 112, the worm guide 113, and the slide bracket 145 is in a state where they are substantially fixed to the bottom cover 20B of the main body unit 20. Thus, the combination of the mount 111, the outer sleeve 112, the worm guide 113, and the slide bracket 145 is called a fixed side 114. On the other hand, a combination of the inner sleeve 115, the worm 116, and the wheel 200 is called a movable side 117. The fixed side 114 and the movable side 117 can partially overlap each other in the direction of the axis P.

Figure 39:
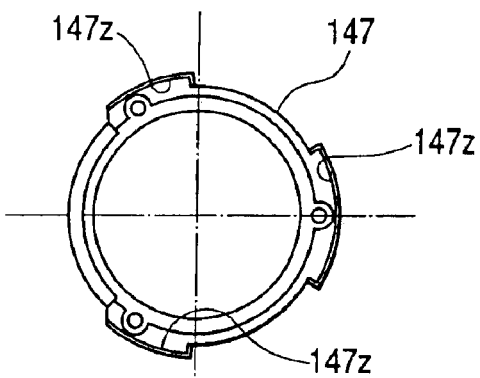
FIG. 39 is a top view of a sleeve cap in FIG. 30.

The inner sleeve 115 is an essential member of the leg portion (9a, 9b, or 9c). In FIG. 30, a sleeve cap 147 having an approximately ring shape is fixed to the upper end of the inner sleeve 115. As best shown in FIG. 39, the outer circumferential surfaces of the sleeve cap 147 have three outward projections 147z spaced at equal angular intervals.

Figure 40:
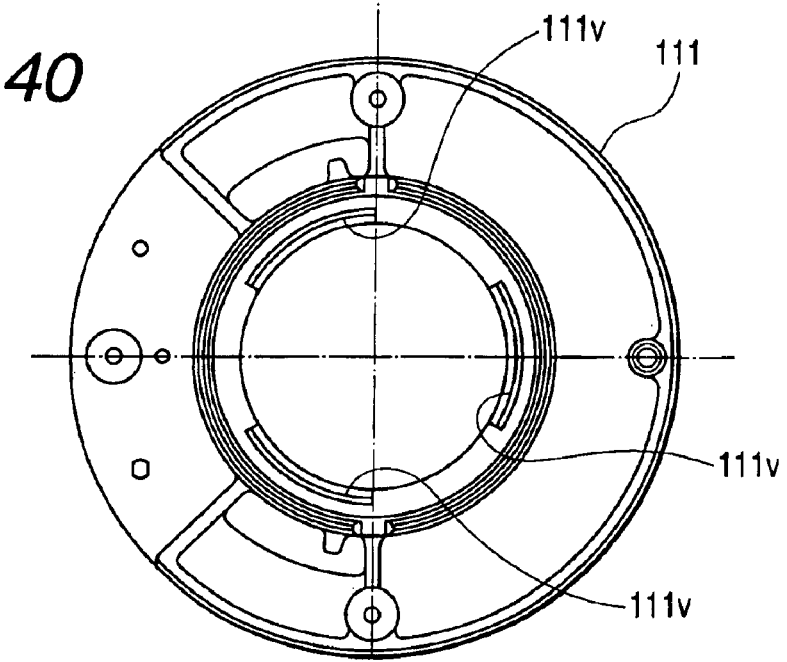
FIG. 40 is a top view of a mount in FIG. 30.

As best shown in FIG. 40, the inner circumferential surfaces of the mount 111 have three recesses 111v spaced at equal angular intervals. The recesses 111v axially align with the projections 147z on the sleeve cap 147, respectively.

Figure 41:
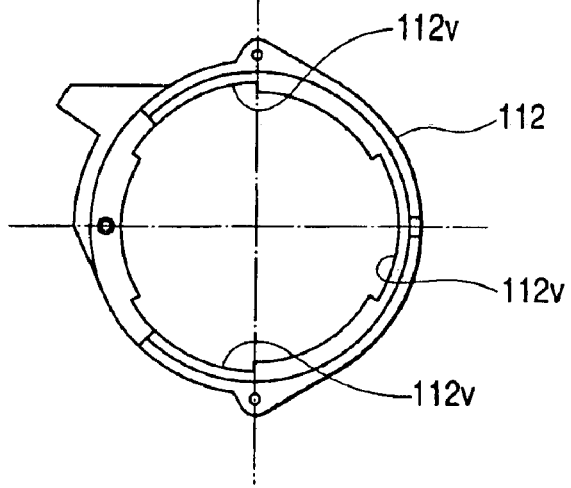
FIG. 41 is a top view of an outer sleeve in FIG. 30.

As best shown in FIG. 41, the inner circumferential surfaces of the outer sleeve 112 have three recesses 112v spaced at equal angular intervals. The recesses 112v axially align with the projections 147z on the sleeve cap 147, respectively.

The projections 147z on the sleeve cap 147 fit in the respective recesses 112v of the outer sleeve 112, thereby limiting the position of the inner sleeve 115 relative to the outer sleeve 112 in the circumferential direction. Therefore, the inner sleeve 115 can slide relative to the outer sleeve 112 in the direction of the axis P while being inhibited from circumferentially rotating relative to the outer sleeve 112.

The projections 147z on the sleeve cap 147 fit in the respective recesses 111v of the mount 111, thereby limiting the position of the inner sleeve 115 relative to the mount 111 in the circumferential direction. Therefore, the inner sleeve 115 can slide relative to the mount 111 in the direction of the axis P while being inhibited from circumferentially rotating relative to the mount 111.

Figure 34:
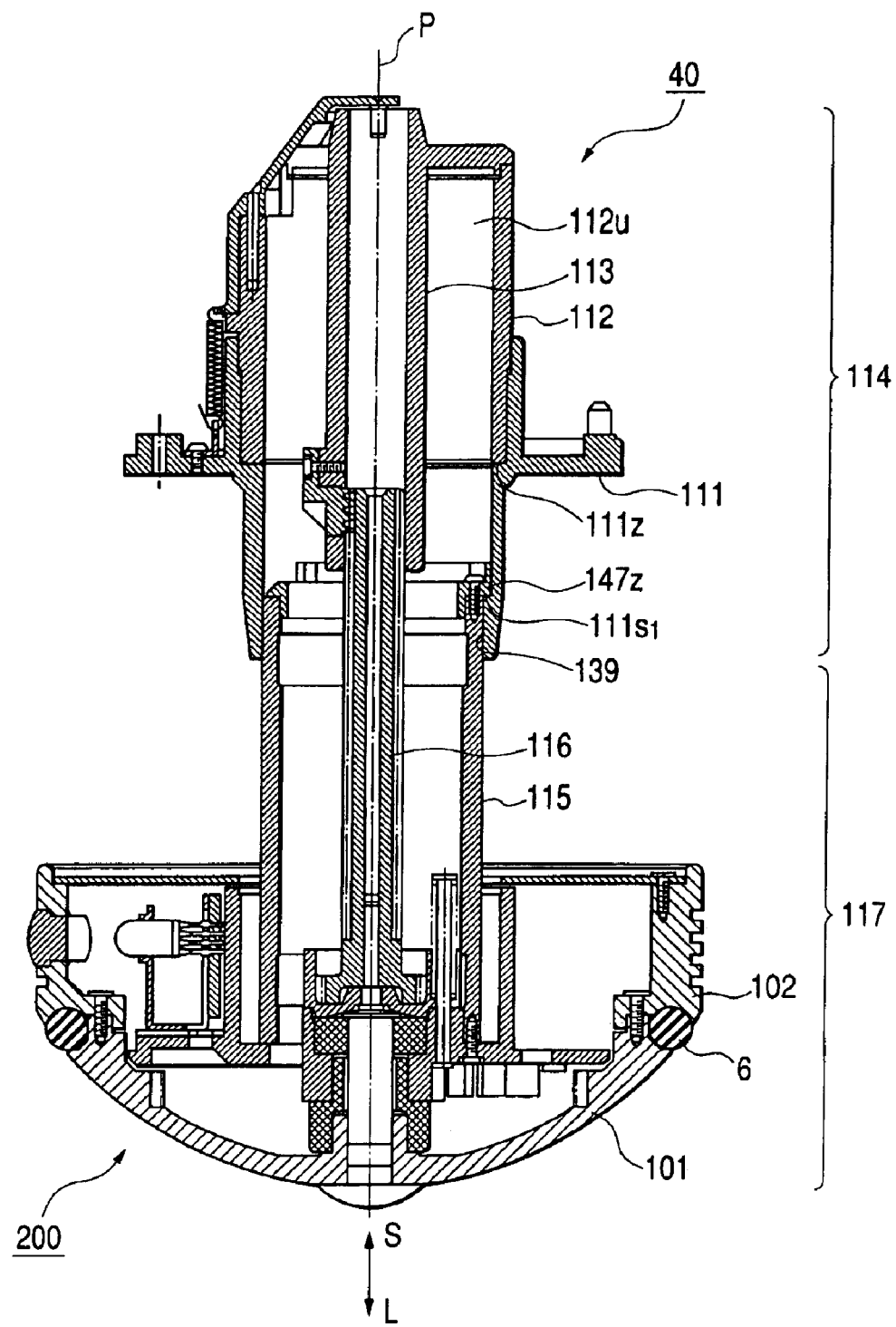
FIG. 34 is a sectional view of the wheel unit in the fourth embodiment of this invention which is in a third state.
Figure 35:
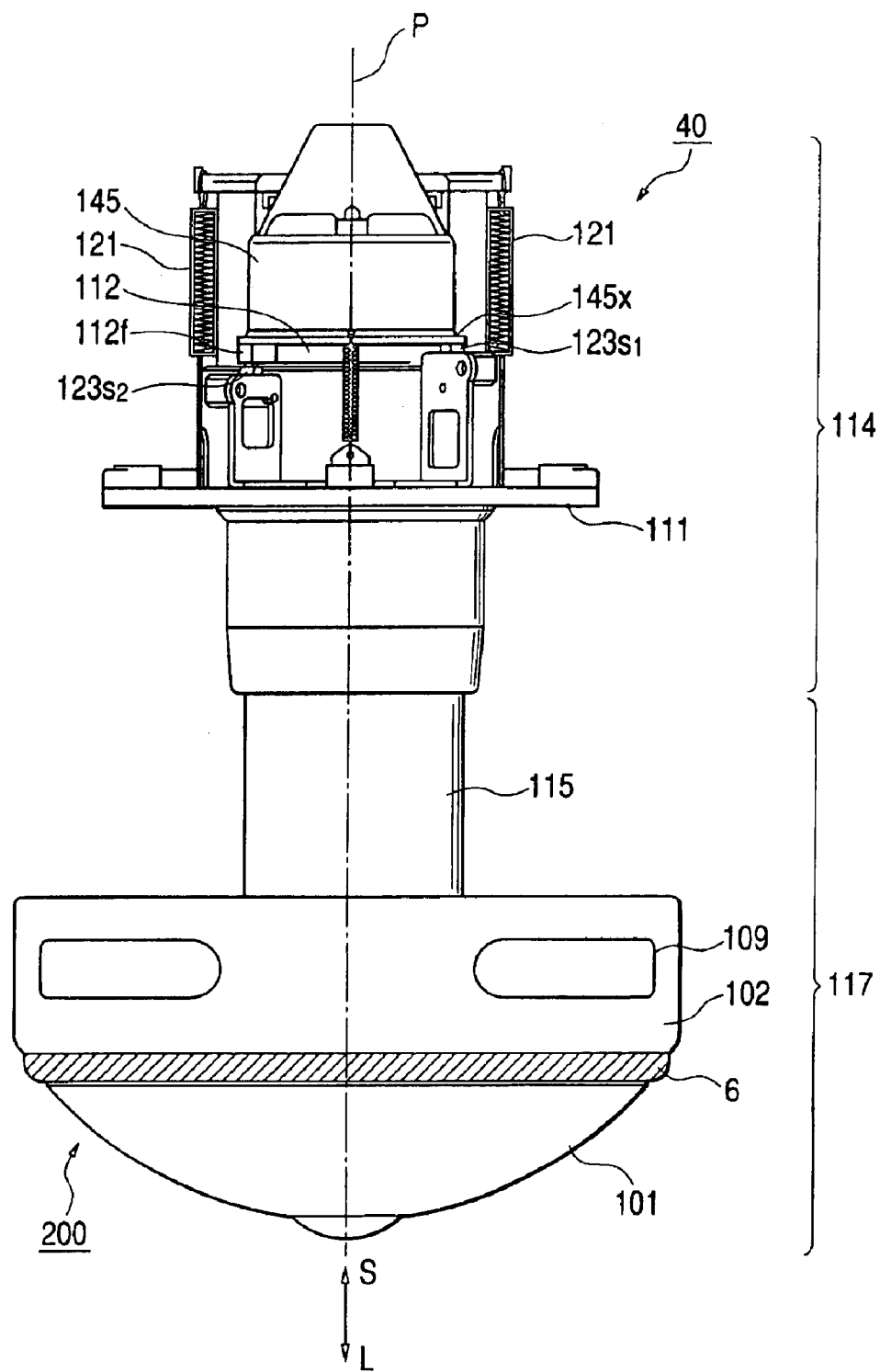
FIG. 35 is a side view of the wheel unit in FIG. 34.
Figure 36:
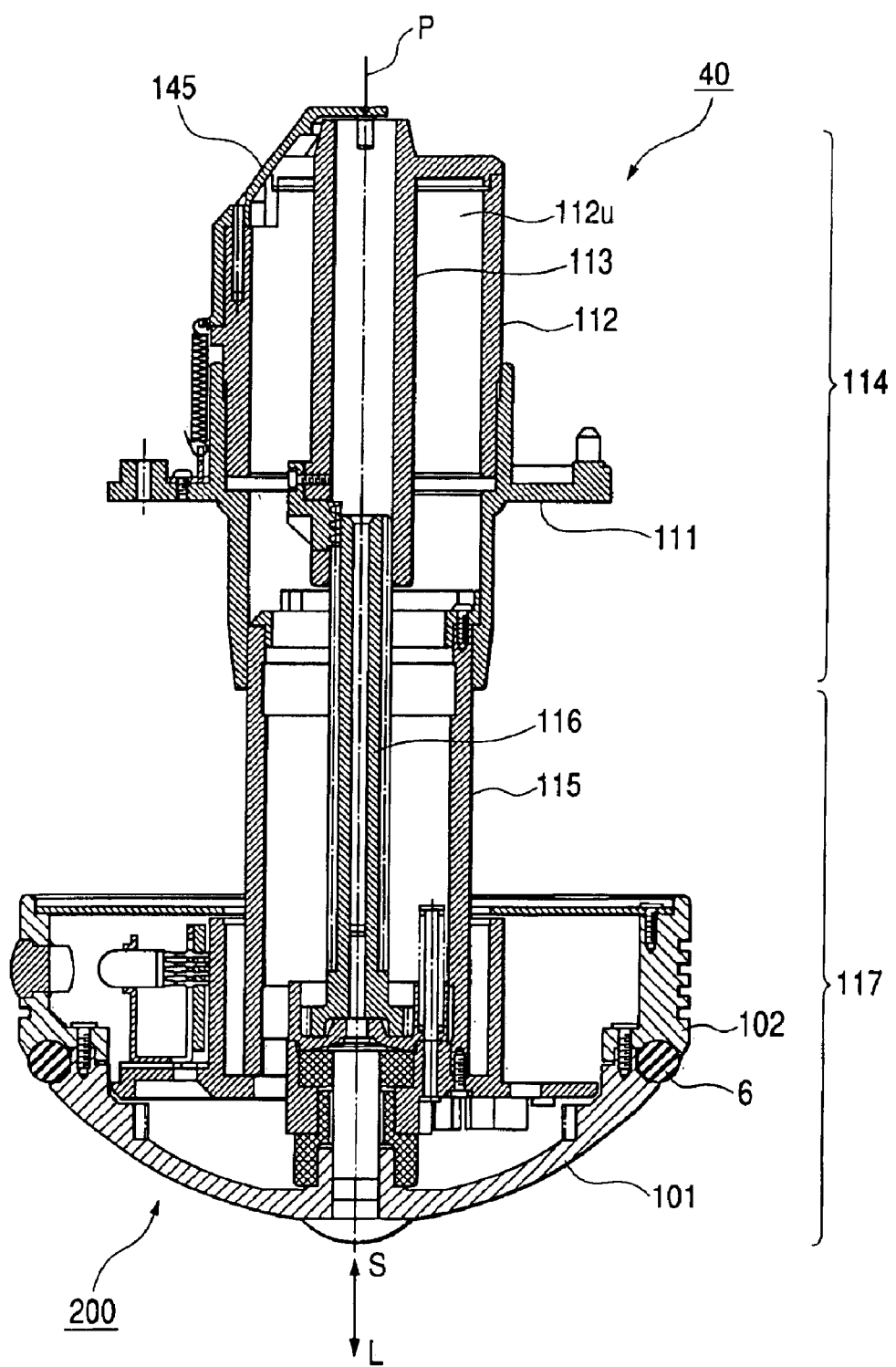
FIG. 36 is a sectional view of the wheel unit in the fourth embodiment of this invention which is in a fourth state.

With reference to FIG. 34, as the inner sleeve 115 slides relative to the mount 111 in a downward direction L from its uppermost position, the projections 147z on the sleeve cap 147 encounter a first stopper 111s1 formed by a step along the boundary between the recesses 111v of the mount 111 and a lower part of the second fitting portion 139 thereof. In this way, the downward movement of the inner sleeve 115 relative to the mount 111, that is, the expansion of the leg portion (9a, 9b, or 9c), is limited.

As shown in FIGS. 30, 32, 42, 43, and 44, a motor base 104 is fixed to the lower end of the inner sleeve 115 by screws 155. A central portion of the motor base 104 has a bearing holder 104z with an approximately cylindrical shape coaxial with respect to the axis P. The motor base 104 has a cylindrical cover 104y coaxial with and larger in diameter than the bearing holder 104z. The cover 104y fits on a lower part of the mount 111. The lower end of the cover 104y has an annular flange 104x extending radially outward.

Two bearings 105 and 106 are retained by the bearing holder 104z. The wheel 200 has an approximately hemispherical shell 101 called a thrust wheel 101. The thrust wheel 101 has an inwardly-extending cylindrical boss 101z coaxial with respect to the axis P. A shaft 149 is coaxially fixed to the boss 101z. The shaft 149 coaxially extends through the bearings 105 and 106. The bearings 105 and 106 rotatably supports the shaft 149 with respect to the motor base 104. Therefore, the thrust wheel 101 is rotatably supported on the motor base 104 and the inner sleeve 115.

The upper end of the shaft 149 has an axially-extending threaded hole for accommodating a screw 181 having a head with an outside diameter greater than the inside diameter of the bearings 105 and 106. The head of the screw 181 engages the bearing 105.

Figure 42:
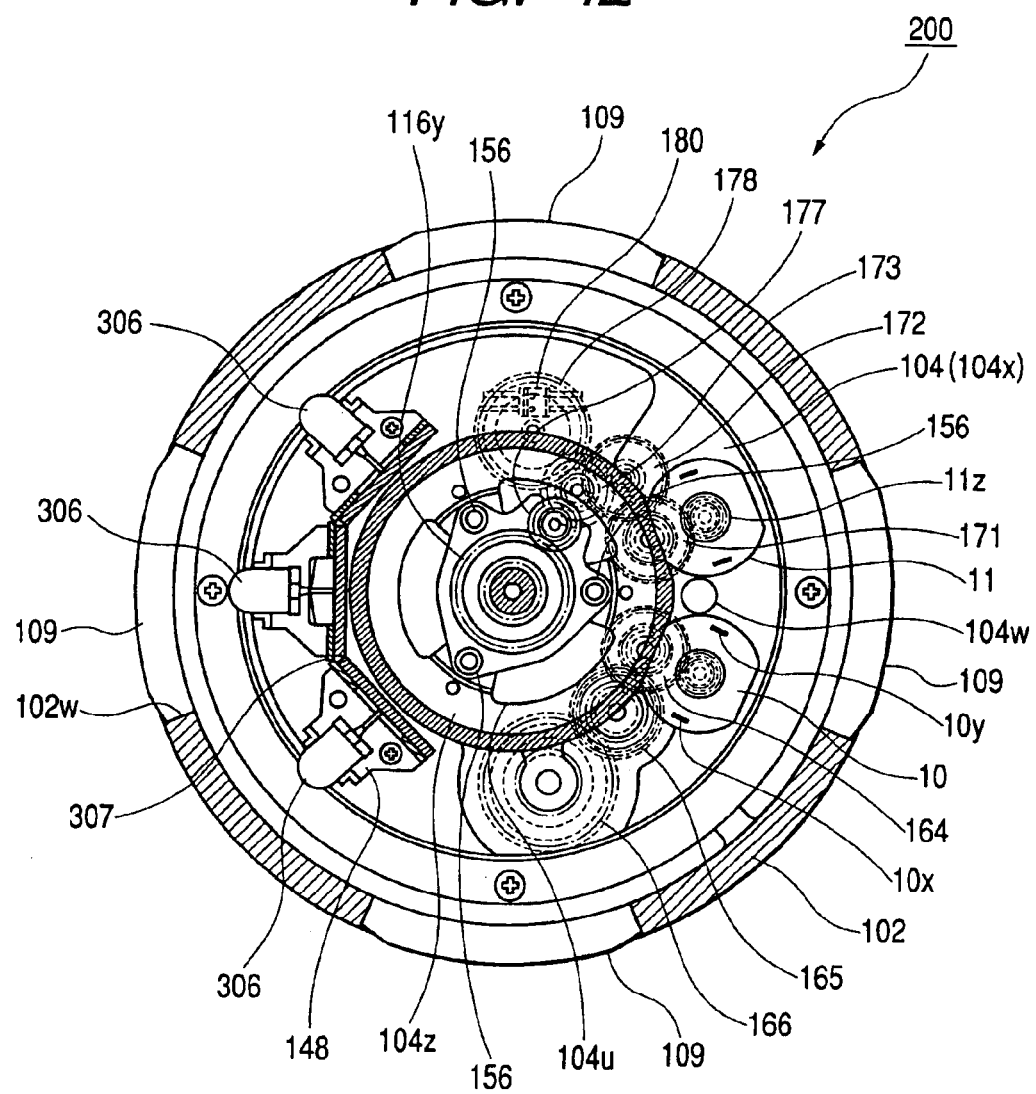
FIG. 42 is a cross-section view of the wheel unit in the fourth embodiment of this invention.

As shown in FIGS. 30 and 42, the bearing holder 104z of the motor base 104 have three axial holes into which three limiter shafts 156 are pressed respectively. The limiter shafts 156 are fixed to the bearing holder 104z. The limiter shafts 156 project axially from the bearing holder 104z into the interior of the inner sleeve 115. The limiter shafts 156 are parallel with the axis P. The limiter shafts 156 are circumferentially spaced at angular intervals of 120 degrees.

Figure 43:
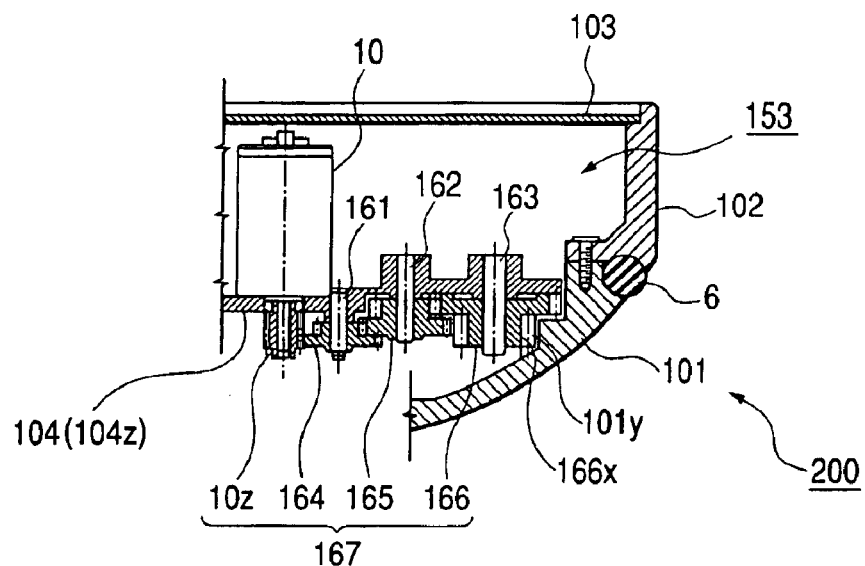
FIG. 43 is a sectional view of a first portion of a wheel in FIG. 30.
Figure 44:
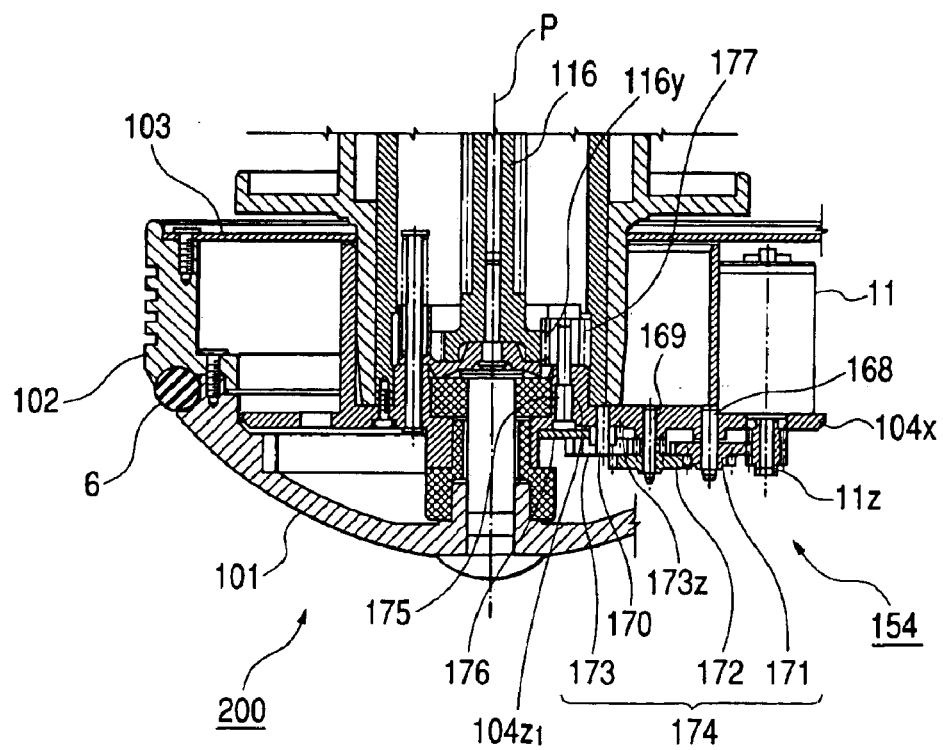
FIG. 44 is a sectional view of a second portion of the wheel in FIG. 30.

An LED bracket 148 is attached to the flange 104x of the motor base 104. The LED bracket 148 supports an in-wheel drive control device 307 and three LEDs 306. The in-wheel drive control device 307 corresponds to the in-wheel drive control device 307a, 307b, or 307c. The LEDs 306 correspond to the light emitting device 306a, 306b, or 306c. The LEDs 306 are spaced in the circumferential direction. As shown in FIGS. 42, 43, and 44, the body of a rotation drive motor 10 and the body of a linear-movement drive motor 11 are attached to an area of the flange 104x of the motor base 104 which is diametrically opposed to the position of the LED bracket 148 with respect to the axis P. The rotation drive motor 10 corresponds to the rotation drive motor 10a, 10b, or 10c. The rotation drive motor 10 acts to rotate the wheel 200. The linear-movement drive motor 11 corresponds to the linear-movement drive motor 11a, 11b, or 11c. The linear-movement drive motor 11 acts to expand and contract the movable side 117. The in-wheel drive control device 307, the LEDs 306, the rotation drive motor 10, and the linear-movement drive motor 11 are electrically connected by, for example, cables (not shown).

The thrust wheel 101, a radial wheel 102, and a wheel cover 103 are three major parts of the wheel 200. As previously mentioned, the shaft 149 is coaxially fixed to the thrust wheel 101. The radial wheel 102 corresponds to the cylindrical portion 102a, 102b, or 102c. The radial wheel 102 is coaxially connected to the upper end of the thrust wheel 101. Specifically, the thrust wheel 101 and the radial wheel 102 are fixed together by screws 151. A resin ring 6 is sandwiched between the thrust wheel 101 and the radial wheel 102. The resin ring 6 extends along an annular area where the thrust wheel 101 and the radial wheel 102 are connected. The resin ring 6 is partially exposed at the outer surfaces of the wheel 200. The resin ring 6 corresponds to the contact portion 6a, 6b, or 6c.

The resin ring 6 is made of material (resin) which causes sufficient friction between the resin ring 6 and the floor surface 8 in order to generate an adequate thrust applied to the robot 10B, and which enables the resin ring 6 to slide on the floor surface 8 while the resin ring 6 remains stationary or rotates. For example, the material for the resin ring 6 is POM (polyacetal). The material for the resin ring 6 may differ from resin. Preferably, the material for the resin ring 6 is chosen in consideration of the physical and chemical characteristics of the floor surface 8. The most preferable material for the resin ring 6 causes the coefficient of friction between the resin ring 6 and the floor surface 8 to be in the range of 0.1 to 0.8. The most preferable material for the resin ring 6 enables the robot 10B to stably move regardless of the material for the floor surface 8.

As shown in FIGS. 30 and 42, the walls of the radial wheel 102 have circumferentially-extending openings 102w. Transparent or semitransparent members fill the openings 102w to form windows 109. The windows 109 correspond to the windows 109a, 109b, or 109c. The windows 109 are similar in axial position to the LEDs 306. In other words, the windows 109 approximately correspond in axial position to the LEDs 306. Therefore, the light generated by the LEDs 306 can be seen or monitored via the windows 109 from a region external with respect to the wheel 200.

As shown in FIGS. 30 and 43, the wheel cover 103 is of an approximate disk shape having a central opening through which the mount 111 extends. The wheel cover 103 is coaxially fixed to the upper end of the radial wheel 102 by screws 152. The wheel cover 103 conceals the upper end of the radial wheel 102.

The inner sleeve 115, the motor base 104, and the wheel 200 are assembled as follows. First, the bearings 105 and 106 are connected to the motor base 104. Then, a rotation drive mechanism 153 is assembled. The rotation drive mechanism 153 has a structure shown in FIG. 43. The rotation drive motor 10 and the rotation drive mechanism 153 are combined. The combination of the rotation drive motor 10 and the rotation drive mechanism 153 is mounted on the motor base 104. A linear-movement drive mechanism 154 is assembled. The linear-movement drive mechanism 154 has a structure shown in FIG. 44. The linear-movement drive motor 11 and the linear-movement drive mechanism 154 are combined. The combination of the linear-movement drive motor 11 and the linear-movement drive mechanism 154 is mounted on the motor base 104. The LED bracket 148 holding the LEDs 306 is mounted on the motor base 104.

Subsequently, the motor base 104 is attached to the inner sleeve 115 by the screws 155. The radial wheel 102 is connected with the thrust wheel 101. Thereafter, the shaft 149 on the thrust wheel 101 is inserted through the bearings 105 and 106 from below. The screw 181 is attached to the upper end of the shaft 149. As previously mentioned, the screw 181 has a head with an outside diameter greater than the inside diameters of the bearings 105 and 106. Therefore, the screw 181 prevents the shaft 149 from moving out of the bearings 105 and 106. The shaft 149 is rotatably supported by the bearings 105 and 106.

Finally, the wheel cover 103 is attached to the radial wheel 102 by the screws 152.

After the above-mentioned assembly has been completed, there is only a very small gap or clearance between the outer circumferential surfaces of the flange 104x of the motor base 104 and the inner surfaces of the thrust wheel 101.

As a result of the above-mentioned assembly, the shaft 149 and the boss 101z of the thrust wheel 101 in the wheel 200 are rotatably supported by the bearings 105 and 106. The thrust wheel 101, the radial wheel 102, and the wheel cover 103 in the wheel 200 can rotate together relative to the motor base 104. The wheel 200 has a substantially airtight inner space defined by the thrust wheel 101, the radial wheel 102, the wheel cover 103, and the flange 104x and the cover 104y on the motor base 104. The rotation drive mechanism 153 and the linear-movement drive mechanism 154 are disposed in the substantially airtight inner space of the wheel 200. Thus, dust and foreign substances are prevented from reaching the rotation drive mechanism 153 and the linear-movement drive mechanism 154. Accordingly, the rotation drive mechanism 153 and the linear-movement drive mechanism 154 can be kept in good conditions for a long term.

As previously mentioned, the worm 116 has the worm gear teeth 116z and the spur gear teeth 116y. A thrust bracket 157 engages the lower end of the worm 116. A thrust shaft 158 is pressed into the guide hole 116x in the worm 116, being secured to the worm 116. The lower end of the thrust shaft 158 has a head. A central portion of the thrust bracket 157 is sandwiched between the head of the thrust shaft 158 and the lower end face of the worm 116. Thereby, the thrust bracket 157 is rotatably supported on the lower end of the worm 116.

The thrust bracket 157 has axially-extending cylindrical walls formed with three axially-extending holes 157h. These holes 157h are circumferentially spaced at angular intervals of 120 degrees. The limiter shafts 156 are pressed into the axial holes in the motor base 104 respectively, being secured to the motor base 104. The limiter shafts 156 axially extend through the holes 157h in the thrust bracket 157. The walls of the thrust bearing 157 form steps 157h1 at the lower ends of the holes 157h respectively. Screws 160 are attached to the upper ends of the limiter shafts 156, respectively. The screws 160 have heads with a diameter greater than that of the limiter shafts 156. Compression springs 159 are provided between the heads of the screws 160 and the steps 157h1 on the thrust bracket 157, respectively.

The worm 116 and the thrust bracket 157 can move relative to the motor base 104 in the direction of the axis P. The compression springs 159 urge the thrust bracket 157 and the worm 116 toward the motor base 104. As previously mentioned, the worm gear teeth 116z on the worm 116 mesh with the helical rack gear teeth 118z on the helical rack 118.

As shown in FIGS. 42 and 44, the spur gear teeth 116y on the worm 116 mesh with the teeth of a second relay gear 177 forming a part of the linear-movement drive mechanism 154. As the second relay gear 177 rotates, the worm 116 rotates about the axis P. The mesh between the worm gear teeth 116z and the helical rack gear teeth 118z converts the rotation of the worm 116 into linear movement thereof along the direction of the axis P. Thus, the movable side 117 expands and contracts in the direction of the axis P in accordance with the linear movement of the worm 116.

The rotation drive mechanism 153 in the wheel 200 is designed as follows. With reference to FIGS. 42 and 43, a first drive gear 10z is mounted on the rotary shaft (the output shaft) of the rotation drive motor 10 by a pressing process. The body of the rotation drive motor 10 is fixed to the flange 104x of the motor base 104. The flange 104x has holes into which a first drive shaft 161, a second drive shaft 162, and a third drive shaft 163 are pressed. The first, second, and third drive shafts 161, 162, and 163 are secured to the flange 104x. A second drive gear 164, a third drive gear 165, and a fourth drive gear 166 are rotatably connected with the first drive shaft 161, the second drive shaft 162, and the third drive shaft 163, respectively. The first drive gear 10z meshes with the second drive gear 164. The second drive gear 164 meshes with the third drive gear 165. The third drive gear 165 meshes with the fourth drive gear 166. The first, second, third, and fourth drive gears 10z, 164, 165, and 166 constitute a speed reduction mechanism 167.

The inner surfaces of the thrust wheel 101 are integrally formed with gear teeth 101y arranged in a ring configuration and facing inward. Specifically, the gear teeth 101y face the axis P, and are arranged along a circumference or a circumferential plane coaxial with respect to the axis P. The gear teeth 101y are integral with the walls of the thrust wheel 101. The fourth drive gear 166 has final-stage gear teeth 166x in mesh with the gear teeth 101y of the thrust wheel 101. Thus, the speed reduction mechanism 167 is coupled with the thrust wheel 101. A rotational force generated by the rotation drive motor 10 is transmitted from the output shaft of the rotation drive motor 10 to the thrust wheel 101 via the speed reduction mechanism 167. Therefore, the thrust wheel 101 and the wheel 200 are rotated by the rotation drive motor 10. The axis of the rotation of the thrust wheel 101 and the wheel 200 coincides with the axis P.

The wheel cover 103 is provided with a pulse generator for producing pulses in accordance with the rotation of the wheel 200. The wheel 200 includes a sensor for detecting the pulses produced by the pulse generator, and generating an electric signal (a rotation speed signal) representing the speed of the rotation of the wheel 200. Specifically, the generated electric signal has a frequency depending on the speed of the rotation of the wheel 200. The sensor and the pulse generator constitute the frequency generator (FG) 304a, 304b, or 304c. The frequency generator sends the rotation speed signal to the related drive controller 301a, 301b, or 301c. The drive controller controls the rotation drive motor 10 in response to the rotation speed signal on a feedback basis so that the wheel 200 will be rotated at a desired speed. Accordingly, the robot 10B can stably move.

Since the rotation drive mechanism 153 is disposed in the substantially airtight space within the wheel 200 as previously mentioned, dust and other foreign substances hardly reach the rotation drive mechanism 153. Accordingly, the rotation drive mechanism 153 can stably and smoothly operate without maintenance for a long term. In addition, noise caused by the motions of the gears in the speed reduction mechanism 167 is effectively prevented from leaking to a region outside the robot 10B. Therefore, the robot 10B can move silently.

The rotation drive mechanism 153 is independently provided in the movable side 117 of the wheel unit 40. Thus, the rotation drive mechanism 153 can operate to rotate and drive the thrust wheel 101 (the wheel 200) independently of the expansion and contraction of the related leg portion 9a, 9b, or 9c (the inner sleeve 115).

The rotation and drive of the wheel 200 is basically controlled by the system-related controller 13B. The rotation of the wheel 200 can be changed between the clockwise direction and the counterclockwise direction by inverting the polarity of the electric power fed to the rotation drive motor 10 from the related drive circuit.

The thrust wheel 101 and the radial wheel 102 compose a casing of the wheel 200. The rotational force is transmitted from the rotation drive motor 10 to the thrust wheel 101 and the radial wheel 102 via the speed reduction mechanism 167. Thus, the speed reduction mechanism 167 acts as a rotational force transmission device. The speed reduction mechanism 167 may be replaced by a rotational force transmission device of another type. The speed reduction mechanism 167 may be omitted. The output shaft of the rotation drive motor 10 and the casing of the wheel 200 may be directly coupled with each other. In this case, the speed reduction mechanism 167 is omitted.

The drive controller 301a, 301b, or 301c adjusts the rotation drive motor 10 via the related drive circuit 303a, 303b, or 303c, and thereby controls the rotation and drive of the wheel 200. The rotation of the wheel 200 can be changed between the clockwise direction and the counterclockwise direction by inverting the polarity of the electric power fed to the rotation drive motor 10 from the related drive circuit.

The linear-movement drive mechanism 154 in the movable side 117 is designed as follows. With reference to FIGS. 42 and 44, the linear-movement drive motor 11 has a rotary shaft (an output shaft) on which a first stretch gear 11z is mounted by a press fitting process. The body of the linear-movement drive motor 11 is fixed to the flange 104x of the motor base 104. The flange 104x has holes into which a first stretch shaft 168, a second stretch shaft 169, and a third stretch shaft 170 are pressed. The first, second, and third stretch shafts 168, 169, and 170 are secured to the flange 104x. A second stretch gear 171, a third stretch gear 172, and a fourth stretch gear 173 are rotatably connected with the first stretch shaft 168, the second stretch shaft 169, and the third stretch shaft 170, respectively. The first stretch gear 11z meshes with the second stretch gear 171. The second stretch gear 171 meshes with the third stretch gear 172. The third stretch gear 172 meshes with the fourth stretch gear 173. The first, second, third, and fourth stretch gears 11z, 171, 172, and 173 constitute a speed reduction mechanism 174.

The bearing holder 104z of the motor base 104 has a hole 104z1 through which a relay shaft 175 extends. The relay shaft 175 is rotatably supported by the bearing holder 104z. A first relay gear 176 is securely mounted on a lower end of the relay shaft 175. The second relay gear 177 is securely mounted on an upper end of the relay shaft 175. The first relay shaft 175, the first relay gear 176, and the second relay gear 177 rotate together. The first relay gear 176 meshes with final-stage gear teeth 173z on the fourth stretch gear 173. The second relay gear 177 meshes with the spur gear teeth 116y on the worm 116.

A rotational force generated by the linear-movement drive motor 11 is transmitted from the output shaft of the linear-movement drive motor 11 to the worm 116 via the speed reduction mechanism 174 and the first and second relay gears 176 and 177 so that the worm 116 rotates about the axis P. The mesh between the worm gear teeth 116z and the helical rack gear teeth 118z converts the rotation of the worm 116 into linear movement thereof along the direction of the axis P, that is, axial movement with respect to the axis P. Thus, the movable side 117 expands and contracts in the axial direction (the direction of the axis P) in accordance with the linear movement of the worm 116. The axis of the rotation of the worm 116 coincides with the axis P. Accordingly, the movable side 117 can stably and smoothly expand and contract in the axial direction.

The encoder 12a, 12b, or 12c includes an encoder gear 178 and a sensor 180 (see FIG. 42). The encoder gear 178 meshes with the final-stage gear teeth 173z on the fourth stretch gear 173. Thus, the encoder gear 178 rotates as the fourth stretch gear 173 rotates. The encoder gear 178 is provided with a pulse generator for producing pulses in accordance with the rotation of the encoder gear 178. The sensor 180 detects the pulses produced by the pulse generator, and generates an electric signal (a rotational position signal) depending on the rotation of the encoder gear 178. The rotational position signal is transmitted from the sensor 180 to the in-wheel drive control device 307. Preferably, the rotational position signal is further transmitted from the in-wheel drive control device 307 to the in-body drive control device 135 and the system-related controller 13B. The rotation of the encoder gear 178 is synchronized with the rotation of the worm 116. The worm 116 and the wheel 200 move axially in accordance with the rotation of the worm 116. Accordingly, the rotational position signal represents the axial position of the worm 116, that is, the axial position of the wheel 200 or the axial length of the related leg portion (9a, 9b, or 9c).

Cables or flexible boards are connected with the in-wheel drive control device 307. The cables include a pair of power feed lines and a pair of two-way communication lines. As shown in FIG. 42, the motor base 104 has a circular hole 104w. The bearing holder 104z of the motor base 104 has an elongated hole 104u. The cables which are connected with the in-wheel drive control device 307 extend from the upper side of the motor base 104 to the lower side thereof through the circular hole 104w and lie in the lower side of the motor base 104 for a predetermined extent, passing through the elongated hole 104u and reaching the upper side of the motor base 104. Then, the cables extend through the interior 115z of the inner sleeve 115 and the interior 112u of the outer sleeve 112 (see FIGS. 18, 32, 34, and 36), and pass through a hole 113x (see FIG. 38) in the flange 113 and hence reach a region external with respect to the wheel unit 40. Finally, the cables are connected with the in-body drive control device 135.

When the leg portion (9a, 9b, or 9c) is in its fully contracted state, the cables are slack in an upper space in the in-body drive control device 135 or the interior 115z of the inner sleeve 115. The number of the cables is relatively small. Thus, it is easy to connect the cables with the in-wheel drive control device 307 and the in-body drive control device 135. During the expansion and contraction of the leg portion (9a, 9b, or 9c), the cables apply only a negligible load to the leg portion. Thus, the leg portion can smoothly expand and contract.

The movable side 117 can assume a first fully contracted state and a second fully contracted state. The first fully contracted state of the movable side 117 is decided as follows. In the case where the movable side 117 is requested to assume its first fully contracted state, a corresponding command signal is transmitted from the system-related controller 13B to the drive controller 301a, 301b, or 301c via the motion-related controller 300. The drive controller activates and rotates the linear-movement drive motor 11 via the related drive circuit (305a, 305b, or 305c) in accordance with the command signal. A rotational force is transmitted from the output shaft of the linear-movement drive motor 11 to the worm 116. Therefore, the worm 116 rotates. The worm 116 moves axially in accordance with the rotation thereof. Thus, the worm 116 and the thrust bracket 157 move in the upward direction S in FIGS. 30 and 32 against the forces of the compression springs 159. The slide bracket 145 move upward together with the worm 116. As the slide bracket 145 moves upward, the flange 145x of the slide bracket 145 separates from the control of the first detection switch 123s1 so that the first detection switch 123s1 falls into its OFF state. Accordingly, the first detection switch 123s1 sends an OFF signal to the motion-related controller 300. Upon the reception of the OFF signal, the motion-related controller 300 feeds the related drive controller 301a, 301b, or 301c with a stop signal. The drive controller accesses the linear-movement drive motor 11 via the related drive circuit, and suspends the rotation of the linear-movement drive motor 11 in response to the stop signal. As a result, the movable side 117 assumes its first fully contracted state shown in FIGS. 30 and 31.

While the movable side 117 is in its first fully contracted state, the mesh between the worm gear teeth 116z and the helical rack gear teeth 118z holds the thrust bracket 157 and the worm 116 in their positions where the thrust bracket 157 and the worm 116 are separate or floated from the motor base 104. Thus, the worm 116 and the thrust bracket 157 are substantially secured relative to the fixed side 114. At this time, the compression springs 159 which connect with the limiter shafts 156 via the screws 169 urge the limiter shafts 156 and the movable side 117 in the upward direction S. Therefore, as shown in FIG. 30, the motor base 104 contacts a second stopper 111s2 formed by the lower end of the second fitting portion 139 of the mount 111 so that the movable side 117 is properly located in the direction of the axis P. It is assumed that user's hand forces the movable side 117 along the downward direction L. When user's hand separates from the movable side 117, the compression springs 159 return the movable side 117 to its original position where the motor base 104 is in contact with the second stopper 111s2. Thus, it is possible to prevent wrong operation of the robot 10B from being caused by an error in the positional detection related to the movable side 117. Since the movable side 117 is urged by the compression springs 159, the movable side 117 is held in position without play.

In the case where the movable side 117 is requested to expand from its first fully contracted state, a corresponding command signal is transmitted from the system-related controller 13B to the drive controller 301a, 301b, or 301c via the motion-related controller 300. The drive controller activates and rotates the linear-movement drive motor 11 via the related drive circuit (305a, 305b, or 305c) in accordance with the command signal. A rotational force is transmitted from the output shaft of the linear-movement drive motor 11 to the worm 116. Therefore, the worm 116 rotates. The worm 116 moves axially in accordance with the rotation thereof. Specifically, the worm 116 moves in the downward direction L. The tension spring 146 causes the slide bracket 145 to move in the downward direction L together with the worm 116. As the slide bracket 145 moves downward, the flange 145x on the slide bracket 145 meets the control arm of the first detection switch 123s1 so that the first detection switch 123s1 falls into its ON state. Accordingly, the first detection switch 123s1 sends an ON signal to the motion-related controller 300. The motion-related controller 300 may pass the ON signal to the system-related controller 13B. Upon the reception of the ON signal, the motion-related controller 300 or the system-related controller 13B starts counting pulses in the rotational position signal related to the encoder gear 178. The motion-related controller 300 or the system-related controller 13B decides whether or not the number of counted pulses reaches a reference value given by, for example, user's request. When the counted pulse number reaches the reference value, the motion-related controller 300 feeds the related drive controller 301a, 301b, or 301c with a stop signal. Alternatively, the system-related controller 13B may send a stop signal to the drive controller via the motion-related controller 300. The drive controller accesses the linear-movement drive motor 11 via the related drive circuit, and suspends the rotation of the linear-movement drive motor 11 in response to the stop signal. As a result, the movable side 117 assumes an expanded state which differs from its first fully contracted state, and which corresponds to the reference value for the counted pulse number.

The movable side 117 can assume first and second fully expanded states. The movable side 117 can move between its first fully contracted state and its second fully expanded state through its second fully contracted state and its first fully expanded state.

In the case where the movable side 117 is requested to assume its first fully expanded state from a contracted state range, a corresponding command signal is transmitted from the system-related controller 13B to the drive controller 301a, 301b, or 301c via the motion-related controller 300. The drive controller activates and rotates the linear-movement drive motor 11 via the related drive circuit (305a, 305b, or 305c) in accordance with the command signal. A rotational force is transmitted from the output shaft of the linear-movement drive motor 11 to the worm 116. Therefore, the worm 116 rotates. The worm 116 moves axially in accordance with the rotation thereof. Specifically, the worm 116 moves in the downward direction L. The movable side 117 expands in accordance with the downward movement of the worm 116. The inner sleeve 115 and the sleeve cap 147 move downward together with the worm 116. The inner sleeve 115 and the sleeve cap 147 continue to move downward until the projections 147z on the sleeve cap 147 encounter the first stopper 111s1 on the mount 111. When the projections 147z encounter the first stopper 111s1, the movable side 117 reaches its first fully expanded state shown in FIGS. 34 and 35.

Figure 37:
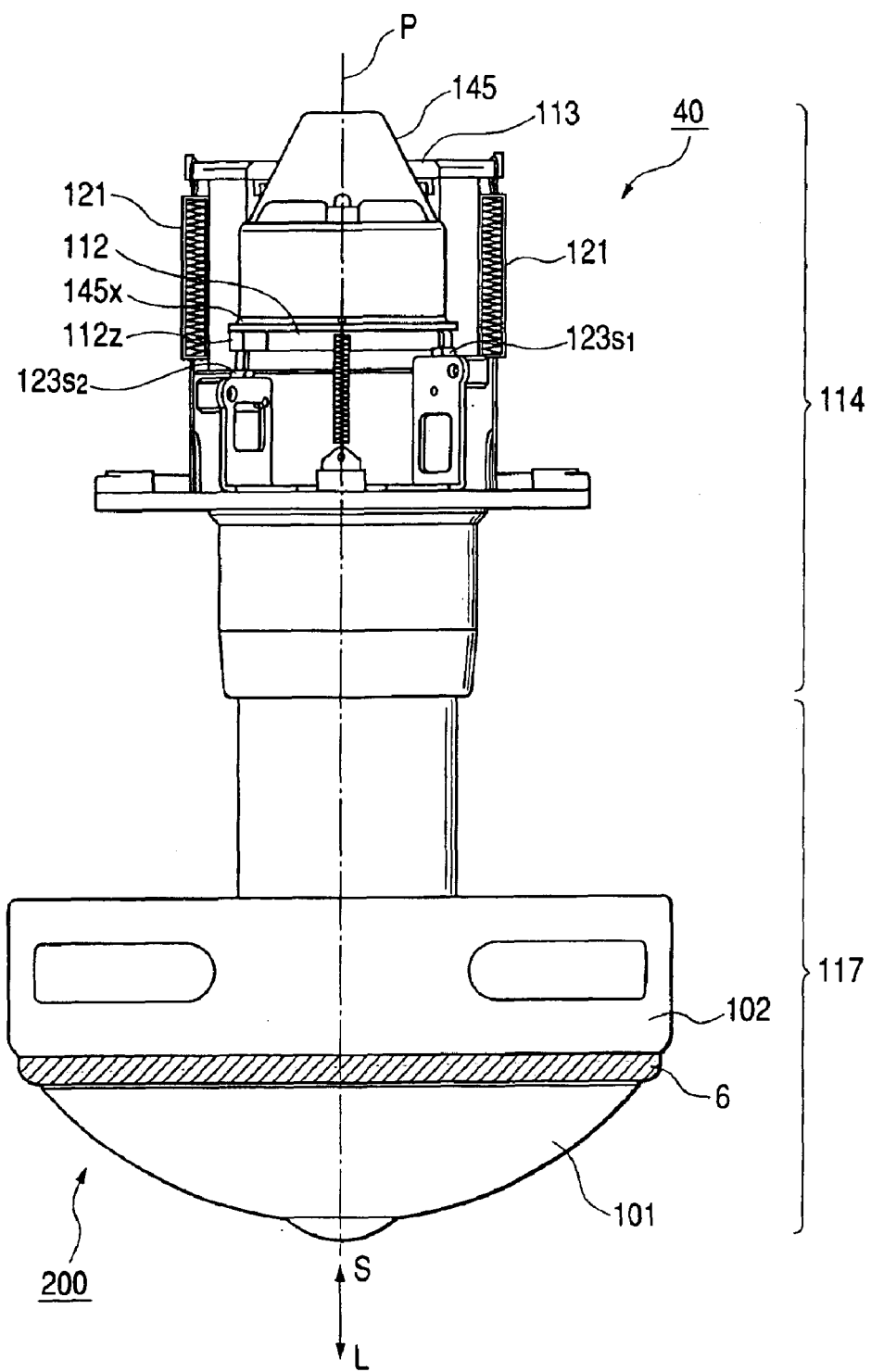
FIG. 37 is a side view of the wheel unit in FIG. 36.

In the case where the linear-movement drive motor 11 remains rotated in the same direction after the movable side 117 reaches its first fully expanded state, the worm 116 continues to rotate in accordance with the rotation of the linear-movement drive motor 11. Since the contact between the projections 147z and the first stopper 111s1 prevents the inner sleeve 115 to further move downward, an axial force generated by the rotation of the worm 116 moves the worm guide 113 in the upward direction S. Thus, the worm guide 113 and the outer sleeve 112 move upward against the forces of the tension springs 121. As the outer sleeve 112 moves upward, the flange 112z thereon separates from the control arm of the second detection switch 123s2 so that the second detection switch 123s2 falls into its OFF state. Accordingly, the second detection switch 123s2 sends an OFF signal to the motion-related controller 300. Upon the reception of the OFF signal, the motion-related controller 300 feeds the related drive controller 301a, 301b, or 301c with a stop signal. The drive controller accesses the linear-movement drive motor 11 via the related drive circuit, and suspends the rotation of the linear-movement drive motor 11 in response to the stop signal. As a result, the movable side 117 assumes its second expanded position shown in FIGS. 36 and 37.

While the movable side 117 is in its second expanded position, the movable side 117 inclusive of the worm 116, the worm guide 113, and the outer sleeve 112 are connected in substantially a single body. The tension springs 121 press the single body against the first stopper 111s1 on the fixed side 114. Therefore, the single body is continuously held in position. It is assumed that user's hand forces the movable side 117 along the upward direction S. When user's hand separates from the movable side 117, the tension springs 121 return the movable side 117 to its original position (its second fully expanded state). Thus, it is possible to prevent wrong operation of the robot 10B from being caused by an error in the positional detection related to the movable side 117. Since the movable side 117 is urged by the tension springs 121, the movable side 117 is held in position without play.

When the robot 10B moves over roughness on the floor surface 8, the tension springs 121 act as buffers or suspensions for absorbing shock and vibration caused by the roughness. Therefore, the tension springs 121 protect the external condition sensors 14, the output device 15, and the recording and reproducing device 16, and other parts from the shock and vibration.

Preferably, dampers having viscosity-based damping effects are provided between the hooks 113y of the worm guide 113 and the hooks of the mount 111 in parallel with the tension springs 121. The dampers quickly attenuate the shock and vibration caused by the roughness on the floor surface 8. Therefore, the dampers protect the internal parts of the robot 10B against the shock and vibration.

In the case where the movable side 117 is requested to move out of its second fully expanded state, a corresponding command signal is transmitted from the system-related controller 13B to the drive controller 301a, 301b, or 301c via the motion-related controller 300. The drive controller activates and rotates the linear-movement drive motor 11 via the related drive circuit (305a, 305b, or 305c) in accordance with the command signal. A rotational force is transmitted from the output shaft of the linear-movement drive motor 11 to the worm 116. Therefore, the worm 116 rotates. An axial force is generated by the rotation of the worm 116. The generated axial force moves the movable side 117 in the upward direction S while moving the outer sleeve 112 in the downward direction L. The outer sleeve 112 continues to move downward until meeting the step 111z on the mount 111. As the outer sleeve 112 moves downward, the flange 112f thereon meets the control arm of the second detection switch 123s2 so that the second detection switch 123s2 falls into its ON state. Accordingly, the second detection switch 123s2 sends an ON signal to the motion-related controller 300. At this time, the movable side 117 reaches the first fully expanded state. The motion-related controller 300 may pass the ON signal to the system-related controller 13B. Upon the reception of the ON signal, the motion-related controller 300 or the system-related controller 13B starts counting pulses in the rotational position signal related to the encoder gear 178. It is assumed that the linear-movement drive motor 11 continues to be rotated in the same direction. The motion-related controller 300 or the system-related controller 13B decides whether or not the number of counted pulses reaches a reference value given by, for example, user's request. When the counted pulse number reaches the reference value, the motion-related controller 300 feeds the related drive controller 301a, 301b, or 301c with a stop signal. Alternatively, the system-related controller 13B may send a stop signal to the drive controller via the motion-related controller 300. The drive controller accesses the linear-movement drive motor 11 via the related drive circuit, and suspends the rotation of the linear-movement drive motor 11 in response to the stop signal. As a result, the movable side 117 assumes a partially expanded state which differs from its first fully expanded state, and which corresponds to the reference value for the counted pulse number.

In the case where the movable side 117 is requested to assume its second fully contracted state from an expanded state range, a corresponding command signal is transmitted from the system-related controller 13B to the drive controller 301a, 301b, or 301c via the motion-related controller 300. The drive controller activates and rotates the linear-movement drive motor 11 via the related drive circuit (305a, 305b, or 305c) in accordance with the command signal. A rotational force is transmitted from the output shaft of the linear-movement drive motor 11 to the worm 116. Therefore, the worm 116 rotates. The worm 116 moves axially in accordance with the rotation thereof. Specifically, the worm 116 moves in the upward direction S. The motor base 104 moves upward together with the worm 116. The movable side 117 contracts in accordance with the upward movement of the worm 116. The movable side 117 continues to contract until the motor base 104 meets the second stopper 111s2 on the mount 111. When the motor base 104 meets the second stopper 111s2, the movable side 117 reaches its second fully contracted state shown in FIGS. 32 and 33.

In the case where the linear-movement drive motor 11 remains rotated in the same direction after the movable side 117 reaches its second fully contracted state, the worm 116 continues to rotate in accordance with the rotation of the linear-movement drive motor 11. The rotation of the worm 116 forces the movable side 117 into its first fully contracted state shown in FIGS. 30 and 31.

The speed reduction mechanism 174 functions as a rotational force transmission device. The worm 116 and the helical rack 118 compose a motion converting device. The rotational force transmission device and the motion converting device are connected to transmit a force from the linear-movement drive motor 11 to the inner sleeve 115 in the leg portion 9a, 9b, or 9c. The rotational force transmission device may be of a structure different from the previously-mentioned structure. The rotational force transmission device may be of a type without the speed reduction mechanism 174. The motion converting device may be of a structure different from the previously-mentioned structure.

The linear-movement drive motor 11 may be directly coupled with the worm 116 to implement direct drive thereof.

Fifth Embodiment

A fifth embodiment of this invention is similar to one of the first to fourth embodiments thereof except for the following design change. In the fifth embodiment of this invention, rotation axes 3a, 3b, and 3c intersect at a point which is separate from the center O of the approximately spherical casing of the main body unit 2 or 20, and which is on a vertical line V passing through the center O and being perpendicular to the floor surface 8 (see FIGS. 2 and 18). Preferably, the angles between the rotation axes 3a, 3b, and 3c are substantially equal.

Sixth Embodiment

A sixth embodiment of this invention is similar to one of the first to fifth embodiments thereof except for the following design change. In the sixth embodiment of this invention, a robot has four or more wheel units extending coaxially with rotation axes respectively.

Seventh Embodiment

A seventh embodiment of this invention is similar to one of the first to sixth embodiments thereof except for the following design change. In the seventh embodiment of this invention, rotation axes do not intersect regardless of its number. Preferably, lines projected onto the movement plane (the floor surface 8) and originating from the rotation axes are spaced at substantially equal angular intervals.

Eighth Embodiment

An eighth embodiment of this invention is similar to one of the first to fourth embodiments thereof except for the following design change. In the eighth embodiment of this invention, all of rotation axes 3a, 3b, and 3c are not on a common plane, and at most two among the rotation axes 3a, 3b, and 3c are on a common plane. The main body unit 2 or 20 can be sufficiently separated from the movement plane (the floor surface 8) without significantly increasing the diameter of the wheel units. Therefore, the robot 1, 10, 10A, or 10B can easily move over an obstacle on the floor surface 8.

Ninth Embodiment

A ninth embodiment of this invention is similar to one of the first to fourth embodiments thereof except for the following design change. In the ninth embodiment of this invention, the shell portions 101a, 101b, and 101c have a shape different from the exact or approximate partial sphere.

Tenth Embodiment

A tenth embodiment of this invention is similar to one of the first to fourth embodiments thereof except for the following design changes. In the tenth embodiment of this invention, the main body unit 2 or 20 of the robot 1, 10, 10A, or 10B has a shape different from the approximately spherical shape. All of the rotation axes 3a, 3b, and 3c are not on a common plane. Lines projected onto the movement plane (the floor surface 8) and originating from the rotation axes 3a, 3b, and 3c are spaced at substantially equal angular intervals.

For example, the main body unit 2 or 20 has a capsule-like shape, an approximately cylindrical shape, a potbellied shape, or a polygonal shape. The shape of the main body unit 2 or 20 may be symmetrical or non-symmetrical.

Preferably, the centroid of the robot 1, 10, 10A, or 10B is on a vertical line including a point at which the rotation axes 3a, 3b, and 3c intersect. Here, the vertical line means a line perpendicular to the floor surface 8.

Eleventh Embodiment

An eleventh embodiment of this invention is similar to one of the first to fourth embodiments thereof except for the following design change. The health-care-related sensors 14b or the weather-related sensors 14c are omitted from the eleventh embodiment of this invention. The robot 1, 10, 10A, or 10B in the eleventh embodiment of this invention is designed exclusively for health care or weather forecasts.

Twelfth Embodiment

A twelfth embodiment of this invention is similar to one of the first to fourth embodiments thereof except for the following design change. At least one among the sensors in the control-related sensors 14a, the health-care-related sensors 14b, and the weather-related sensors 14c is omitted from the twelfth embodiment of this invention.

Thirteenth Embodiment

A thirteenth embodiment of this invention is similar to the fourth embodiment thereof except for the following design changes. The thirteenth embodiment of this invention includes a combination of pulleys and a belt instead of the rotation drive mechanism 153. In addition, the thirteenth embodiment of this invention includes another combination of pulleys and a belt instead of the linear-movement drive mechanism 154.

Fourteenth Embodiment

A fourteenth embodiment of this invention is similar to the fourth embodiment thereof except for the following design change. In the fourteenth embodiment of this invention, the thrust wheel 101 is formed or provided with a gear having outwardly-facing teeth instead of the inwardly-facing gear teeth 101y. The outwardly-facing teeth mean those arranged along a convex circumferential plane. The gear with the outwardly-facing teeth extends into the interior of the thrust wheel 101, and is coaxial with respect to the axis P. The outwardly-facing teeth mesh with the final-stage gear teeth 166x.

Fifteenth Embodiment

A fifteenth embodiment of this invention is similar to one of the first to fourth embodiments thereof except for the following design change. In the fifteenth embodiment of this invention, each of the light emitting devices is of a planar type including an LCD panel, an organic EL panel, or an inorganic EL panel.

Sixteenth Embodiment

A sixteenth embodiment of this invention is similar to the fourth embodiment thereof except for the following design changes. According to the sixteenth embodiment of this invention, the materials for the top cover 20T, the bottom cover 20B, the radial wheel 102, the motor base 104, the worm guide 113, the helical rack 118, and the drive gears 164, 165, and 166 are chosen in view of the shapes and functions thereof. Preferably, the materials are selected from aluminum, other metal, FRP (fiberglass reinforced plastic), POM (polyacetal), and other resin.

Seventeenth Embodiment

A seventeenth embodiment of this invention is similar to the fourth embodiment thereof except for the following design changes. According to the seventeenth embodiment of this invention, the system control boards 125y and 125z are attached to the top cover 20T rather than the bottom cover 20B. The top cover 20T and parts supported thereon are combined into a control unit including an output device and a controller. On the other hand, the bottom cover 20B and parts supported thereon are combined into a drive unit including a casing and three wheel units. The control unit and the drive unit are detachably connected with each other. A connection device such as a connector is provided between the control unit and the drive unit. The connection device allows signals to be transmitted between the control unit and the drive unit.

Control units having different functions may be prepared. In this case, one is selected from the control units, and the selected control unit is connected with the drive unit. The drive unit can be used in common to the control units. This design provides an inexpensive robot having a function selectable from different functions. The number of parts of each control unit is relatively small. Thus, it is possible to provide an inexpensive robot.

The external condition sensors 14 may be combined into a sensor unit. Also, the output device 15 may be designed as an output device unit. In this case, the control unit includes a combination of the sensor unit and the output device unit. Preferably, each of the sensor unit and the output device unit has a cylindrical shape.

Eighteenth Embodiment

Figure 45:
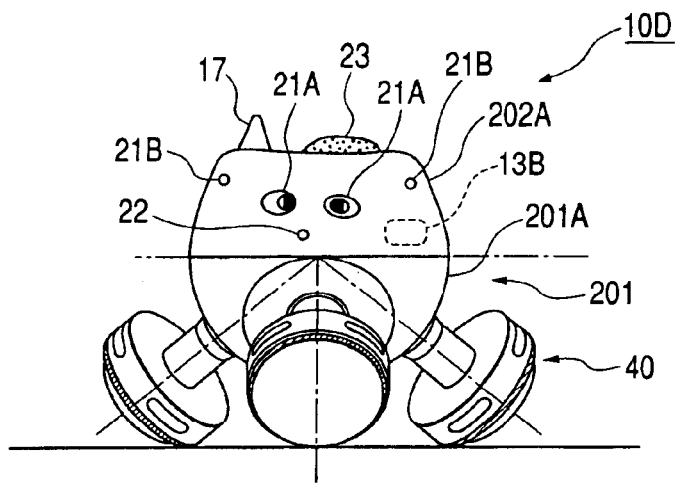
FIG. 45 is a front view of a movable robot according to an eighteenth embodiment of this invention.

FIG. 45 shows a movable robot 10D according to an eighteenth embodiment of this invention. The robot 10D is similar to that in the seventeenth embodiment of this invention except for the following design changes.

The robot 10D includes a drive unit 201 and a control unit 202A detachably connected with each other. The drive unit 201 includes three wheel units 40 and a casing 201A supporting the wheel units 40. The control unit 202A includes control-related sensors 14a, a communication interface 17, and a system-related controller 13B. The control-related sensors 14a are a CCD camera 21A, a microphone 21B, a distance sensor 22, and a touch sensor 23.

Nineteenth Embodiment

Figure 46:
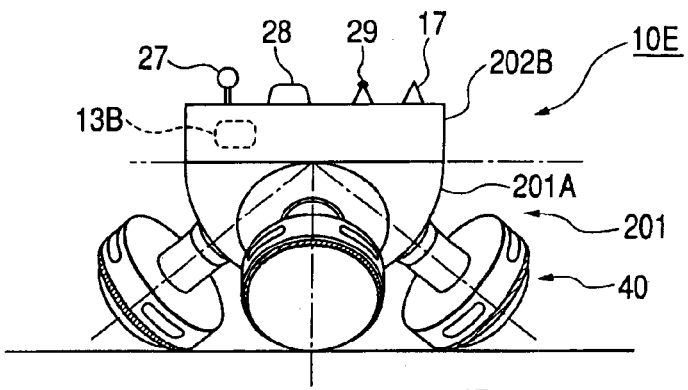
FIG. 46 is a front view of a movable robot according to a nineteenth embodiment of this invention.

FIG. 46 shows a movable robot 10E according to a nineteenth embodiment of this invention. The robot 10E is similar to that in the seventeenth embodiment of this invention except for the following design changes.

The robot 10E includes a drive unit 201 and a control unit 202B detachably connected with each other. The drive unit 201 includes three wheel units 40 and a casing 201A supporting the wheel units 40. The control unit 202B includes weather-related sensors 14c, a communication interface 17, and a system-related controller 13B. The weather-related sensors 14c are a barometer 27, a hygrometer 28, and a thermometer 29.

Twentieth Embodiment

Figure 47:
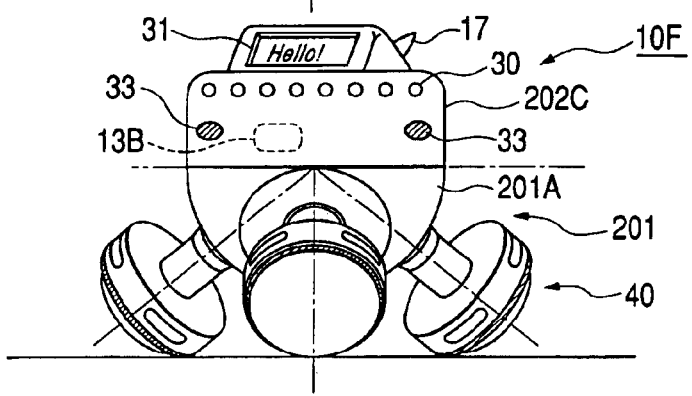
FIG. 47 is a front view of a movable robot according to a twentieth embodiment of this invention.

FIG. 47 shows a movable robot 10F according to a twentieth embodiment of this invention. The robot 10F is similar to that in the seventeenth embodiment of this invention except for the following design changes.

The robot 10F includes a drive unit 201 and a control unit 202C detachably connected with each other. The drive unit 201 includes three wheel units 40 and a casing 201A supporting the wheel units 40. The control unit 202C includes an output device 15, a communication interface 17, and a system-related controller 13B. The output device 15 contains an LED 30, a monitor 31, and a loudspeaker 33.

Twenty-first Embodiment

Figure 48:
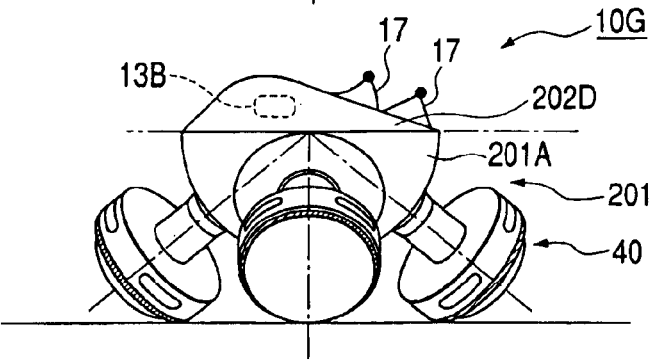
FIG. 48 is a front view of a movable robot according to a twenty-first embodiment of this invention.

FIG. 48 shows a movable robot 10G according to a twenty-first embodiment of this invention. The robot 10G is similar to that in the seventeenth embodiment of this invention except for the following design changes.

The robot 10G includes a drive unit 201 and a control unit 202D detachably connected with each other. The drive unit 201 includes three wheel units 40 and a casing 201A supporting the wheel units 40. The control unit 202D includes a communication interface 17 and a system-related controller 13B.

The robot 10G operates in response to control signals fed from an external device. Basically, the robot 10G is of a non-autonomous type.

Twenty-second Embodiment

Figure 49:
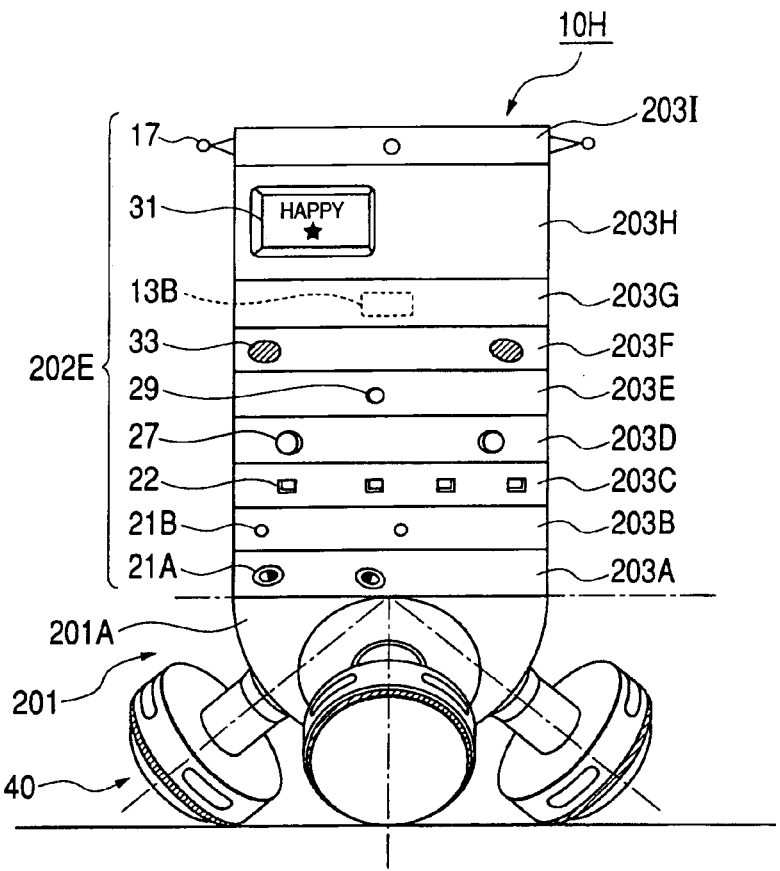
FIG. 49 is a front view of a movable robot according to a twenty-second embodiment of this invention.

FIG. 49 shows a movable robot 10H according to a twenty-second embodiment of this invention. The robot 10H is similar to that in the seventeenth embodiment of this invention except for the following design changes.

The robot 10H includes a drive unit 201 and a control unit 202E detachably connected with each other. The drive unit 201 includes three wheel units 40 and a casing 201A supporting the wheel units 40. The control unit 202E includes sub units 203A, 203B, 203C, 203D, 203E, 203F, 203G, 203H, and 203I combined by connection devices on a stack basis. The sub unit 203A has a CCD camera 21A. The sub unit 203B has a microphone 21B. The sub unit 203C has a distance sensor 22. The sub unit 203D has a barometer 27. The sub unit 203E has a thermometer 29. The sub unit 203F has a loudspeaker 33. The sub unit 203G has a system-related controller 13B. The sub unit 203H has a monitor 31. The sub unit 203I has a communication interface 17.

The order in which the sub units 203A–203I are arranged may be changed arbitrarily. One or more sub units may be omitted from the control unit 202E.

Twenty-third Embodiment

Figure 50:
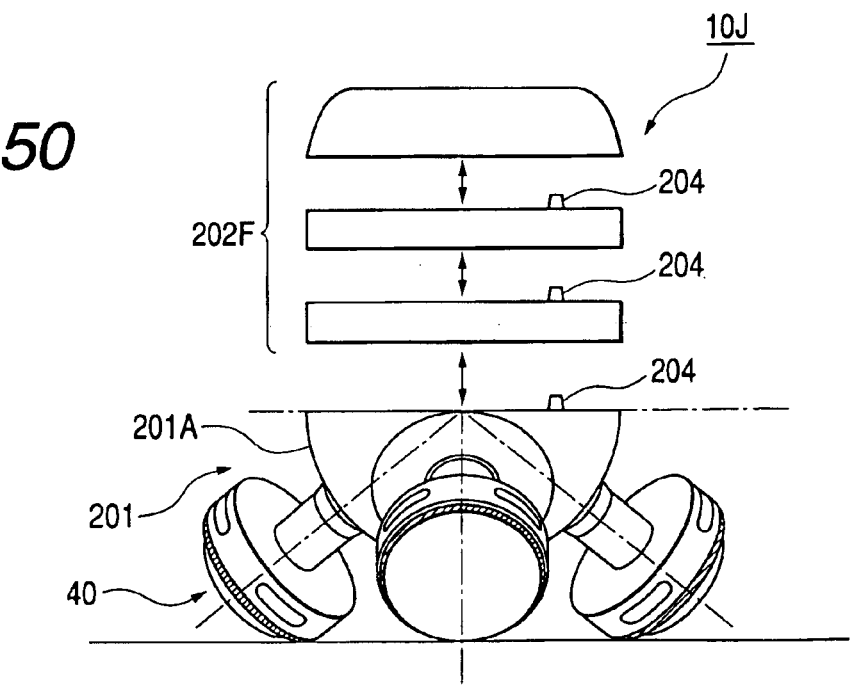
FIG. 50 is an exploded view of a movable robot according to a twenty-third embodiment of this invention.

FIG. 50 shows a movable robot 10J according to a twenty-third embodiment of this invention. The robot 10J is similar to the robot 10H (see FIG. 49) except for the following design change.

The robot 10J includes a drive unit 201 and a control unit 202F detachably connected with each other. Sub units composing the control unit 202F are combined by connection devices 204.

Advantages Provided by the Invention

The robot (the movable robot) has a simple structure. The number of parts composing the robot is small. Wheel units in the robot can use ones having a same structure. Sensors in the robot can use general ones. Therefore, the robot can be inexpensive, and small in size and light in weight. The robot is suited for home use.

The robot hardly falls down. Thus, an algorithm related to control of the robot is simple. It is unnecessary to equip the robot with a special computer. The size of a control program for the robot is remarkably limited. Therefore, a small-capacity memory suffices for storing the control program. Thus, the memory can use inexpensive one.

The robot has only a very small chance of falling down when accidentally meeting an obstacle or receiving a disturbance. Thus, the robot is safe to a user.

Although the main body unit of the robot is spherical, the robot can easily maintain its posture or easily move in a desired way even when it is on a sloping floor. When the wheel units keep stopped, the robot is prevented from spontaneously moving down along a sloping floor.

Only narrow areas on the contact portions of the wheel units are in contact with the floor surface. Accordingly, the outer surfaces of the main body unit are prevented from becoming dirty and flawed as a result of long-term use of the robot.

The centroid of the robot is on a straight line being vertical with respect to the floor surface and passing through a point at which all the rotation axes of the wheel units intersect. Thus, all the wheel units are in equal conditions of contact with the floor surface. Therefore, the wheel units can be held in stabler contact states. The wheel units are equal in transmission of a drive force to the floor surface. Accordingly, the robot can move more stably.

The robot can freely make a forward movement, a backward movement, a leftward movement, a rightward movement, a meandering movement, and a rotation on its own axis with the robot center remaining at a same point. In addition, the robot can make a more complicated movement provided by a combination of two or more of the above-indicated different movements. Thus, the robot has excellent performances.

The robot has the external condition sensors for detecting conditions outside the robot, and the output device for outputting information to an external device. The robot can show its feelings on a personification basis. The robot can smoothly communicate with the user.

The main body unit is provided with the communication interface for radio communications with an external device. Therefore, it is possible to implement two-way communications between the robot and a person in a site remote therefrom.

The rotation drive motor, the linear-movement drive motor, and the mechanisms for transmitting forces from the rotation drive motor and the linear-movement drive motor are disposed in the interior of each of the wheels. Thus, the interior of the main body unit can be effectively used. For example, the battery, the sensors, and the controller are located in the main body unit.

Each of the wheels has an approximately airtight inner space in which the drive devices are disposed. Therefore, dust and other foreign substances are prevented from reaching the drive devices, and smooth operation of the drive devices can last for a long term.

Each of the wheels contains the LEDs. Each of the wheels has the windows through which the light generated by the LEDs can be seen or monitored from a region external with respect to the wheel. The activation and deactivation of the LEDs can be used to show robot's feelings on a personification basis. The conditions of the light generation by the LEDs can be used to notify the user of an action which the robot will take next. The robot can smoothly communicate with the user. The robot can be highly entertaining.

In the case where each of the leg portions is in the fully contracted state or the fully expanded state, each of the wheels holds located at the predetermined limit position while being urged by the springs. Therefore, the posture of the robot is stabler. Furthermore, the robot can smoothly move. When each of the wheels is in the predetermined limit position, the urge by the springs causes the wheel to be free from play. Thus, the robot is higher in quality. It is assumed that the user forces one of the wheels out of the predetermined limit position. In this case, the urge by the springs returns the wheel to the predetermined limit position after the user separates from the robot. This is advantageous in preventing wrong operation of the robot.

The directions of the axes of the expandible and contractible leg portions coincide with the directions of the forces to expand and contact the leg portions. Therefore, non-axial forces are prevented from occurring so that the leg portions can smoothly expand and contract.

The springs for locating and holding the wheels can also act as suspensions. Thus, the springs protect the controller and other devices in the main body unit from the shock and vibration which is caused when the robot is moving over roughness on the floor surface. The dampers provided in parallel with the springs quickly attenuate the shock and vibration caused by the roughness on the floor surface. Therefore, the dampers protect the internal parts of the main body unit against the shock and vibration. The robot can move fast.

The battery is located at the central part of the interior of the main body unit. The centroid of the robot may exist approximately at the center of the main body unit. In this case, the robot can smoothly make the various movements with a good balance.

The processing steps and the control steps implemented in and by the robot are allotted among a plurality of the controllers. Thus, the processing rate is high. Furthermore, the robot can quickly respond to a change in the conditions of the surroundings thereof. Each of the controllers consumes electric power at a reduced rate. Therefore, each of the controllers generates heat at a low rate.

Each of the wheels contains the controller for the rotation drive motor, the linear-movement drive motor, and the light emitting device. Thus, it is sufficient to provide the power feed lines and the signal transmission lines in the cable-based electrical connection between the wheel and the main body unit. Accordingly, the cable-based electrical connection is simple. Furthermore, the cable-based electrical connection hardly interferes with the expansion and contraction of the related leg portion. The robot can smoothly operate.

Each of the wheels contains the rotation drive motor, the device for detecting the rotational speed of the rotation drive motor, and the controller for governing the rotation drive motor in response to the output signal from the rotation speed detecting device. Therefore, a completed drive control system for the rotation drive motor is provided in the wheel. It is easy to control the rotational speed of the rotation drive motor.

Each of the wheels contains the linear-movement drive motor for expanding and contracting the related leg portion, the device for detecting the length of the leg portion, and the controller for governing the linear-movement drive motor in response to the output signal from the length detecting device. Therefore, a completed drive control system for the linear-movement drive motor is provided in the wheel. It is easy to control the length of the leg portion.

What is claimed is:

1. A movable robot comprising:

a main body unit; and at least three wheel units connected with the main body unit and having respective contact portions for contact with a floor surface, the contact portions being rotatable about respective axes;

wherein the main body unit moves along the floor surface as the contact portions rotate, and wherein lines projected onto the floor surface and originating from the axes of rotation of the contact portions are spaced at substantially equal angular intervals, and at most two of the axes are on a common plane;

wherein each of the wheel units comprises:

1) a motor base;

2) a rotation drive motor supported on the motor base;

3) a casing being rotatable relative to the motor base about related one of the axes and having related one of the contact portions; and 4) a rotational force transmission device connected between the rotation drive motor and the casing for transmitting a rotational force generated by the rotation drive motor to the casing.

2. A movable robot as recited in claim 1, wherein the rotational force transmission device comprises a first gear connected with an output shaft of the rotation drive motor, and a second gear meshing with the first gear and being integral with the casing.

3. A movable robot as recited in claim 2, wherein each of the wheel units further comprises a wheel including the motor base and the casing, and a leg connecting the wheel and the main body unit and being expandible and contractible in a direction of related one of the axes.

4. A movable robot as recited in claim 3, wherein each of the wheel units further comprises a leg drive motor supported on the motor base, and a motion converting device connected between the leg drive motor and the leg for converting a rotational force generated by the leg drive motor into a linear force and applying the linear force to the leg to expand and contract the leg.

5. A movable robot as recited in claim 1, wherein the main body unit comprises:

an external condition sensor for detecting a condition of a region external with respect to the main body unit;

an output device for outputting information to an external device;

a memory storing a control program for implementing prescribed processing in response to the external condition detected by the external condition sensor; and a controller for deciding contents of information to be outputted from the output device and also contents of control of the rotation drive motor on the basis of the control program and the external condition detected by the external condition sensor, and for controlling the output device and the rotation drive motor in accordance with the decided contents of information to be outputted from the output device and also the decided contents of control of the rotation drive motor.

6. A movable robot as recited in claim 4, wherein the main body unit comprises:

an external condition sensor for detecting a condition of a region external with respect to the main body unit;

an output device for outputting information to an external device;

a memory storing a control program for implementing prescribed processing in response to the external condition detected by the external condition sensor; and a controller for deciding contents of information to be outputted from the output device and also contents of control of the leg drive motor on the basis of the control program and the external condition detected by the external condition sensor, and for controlling the output device and the leg drive motor in accordance with the decided contents of information to be outputted from the output device and also the decided contents of control of the leg drive motor.

7. A movable robot as recited in claim 5, wherein the controller comprises a first sub controller for deciding contents of control of the rotation drive motor on the basis of the control program and the external condition detected by the external condition sensor, and a second sub controller for controlling the rotation drive motor in accordance with the decided contents of control of the rotation drive motor.

8. A movable robot as recited in claim 6, wherein the controller comprises a first sub controller for deciding contents of control of the leg drive motor on the basis of the control program and the external condition detected by the external condition sensor, and a second sub controller for controlling the leg drive motor in accordance with the decided contents of control of the leg drive motor.

* * * * *